(12) United States Patent
Karaoguz et al.

(10) Patent No.: US 8,854,531 B2
(45) Date of Patent: Oct. 7, 2014

(54) MULTIPLE REMOTE CONTROLLERS THAT EACH SIMULTANEOUSLY CONTROLS A DIFFERENT VISUAL PRESENTATION OF A 2D/3D DISPLAY

(75) Inventors: Jeyhan Karaoguz, Irvine, CA (US);
James D. Bennett, Hroznetin (CZ);
Nambirajan Seshadri, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 690 days.

(21) Appl. No.: 12/982,078

(22) Filed: Dec. 30, 2010

(65) Prior Publication Data

US 2011/0159929 A1 Jun. 30, 2011

Related U.S. Application Data

(63) Continuation-in-part of application No. 12/845,461, filed on Jul. 28, 2010.

(60) Provisional application No. 61/303,119, filed on Feb. 10, 2010, provisional application No. 61/291,818, filed on Dec. 31, 2009.

(51) Int. Cl.
*H04N 7/18* (2006.01)
*H04N 13/04* (2006.01)

(52) U.S. Cl.
CPC ....... *H04N 13/0497* (2013.01); *H04N 13/0404* (2013.01); *H04N 13/0409* (2013.01)
USPC ............................................ 348/348; 348/58

(58) Field of Classification Search
CPC .......... H04N 13/0497; H04N 13/0404; H04N 13/0409
USPC ........................................................ 348/42–60
See application file for complete search history.

(56) References Cited

U.S. PATENT DOCUMENTS

| | | | |
|---|---|---|---|
| 4,829,365 | A | 5/1989 | Eichenlaub |
| 5,615,046 | A | 3/1997 | Gilchrist |

(Continued)

FOREIGN PATENT DOCUMENTS

| | | |
|---|---|---|
| EP | 0833183 A1 | 4/1998 |
| EP | 1662808 A1 | 5/2006 |

(Continued)

OTHER PUBLICATIONS

"How browsers work", retrieved from <http://taligarsiel.com/Projects/howbrowserswork1.htm> on Oct. 21, 2010, 54 pages.

(Continued)

*Primary Examiner* — Andy Rao
(74) *Attorney, Agent, or Firm* — Fiala & Weaver P.L.L.C.

(57) ABSTRACT

Remote control devices that can be used to independently modify multiple visual presentations that are simultaneously displayed by a screen assembly are described, wherein at least one of the visual presentations is observable by a first viewer but not a second viewer. The remote control devices can also be used to independently select media content upon which each of the multiple visual presentations is based and to control the manner in which such media content is delivered to the screen assembly. In accordance with certain embodiments, at least one of the visual presentations comprises a three-dimensional visual presentation. Display systems that include such remote control devices and methods of operating the same are also described.

23 Claims, 26 Drawing Sheets

(56) References Cited

U.S. PATENT DOCUMENTS

| | | |
|---|---|---|
| 5,855,425 A | 1/1999 | Hamagishi |
| 5,945,965 A | 8/1999 | Inoguchi et al. |
| 5,959,597 A | 9/1999 | Yamada et al. |
| 5,969,850 A | 10/1999 | Harrold et al. |
| 5,990,975 A | 11/1999 | Nan et al. |
| 6,023,277 A | 2/2000 | Osaka et al. |
| 6,049,424 A | 4/2000 | Hamagishi |
| 6,094,216 A | 7/2000 | Taniguchi et al. |
| 6,144,375 A | 11/2000 | Jain et al. |
| 6,188,442 B1 | 2/2001 | Narayanaswami |
| 6,285,368 B1 | 9/2001 | Sudo |
| 6,697,687 B1 | 2/2004 | Kasahara et al. |
| 6,710,920 B1 | 3/2004 | Mashitani et al. |
| 6,909,555 B2 | 6/2005 | Wohlstadter |
| 7,030,903 B2 | 4/2006 | Sudo |
| 7,038,698 B1 | 5/2006 | Palm et al. |
| 7,091,471 B2 | 8/2006 | Wenstrand et al. |
| 7,123,213 B2 | 10/2006 | Yamazaki et al. |
| 7,190,518 B1 | 3/2007 | Kleinberger et al. |
| 7,359,105 B2 | 4/2008 | Jacobs et al. |
| 7,440,193 B2 | 10/2008 | Gunasekaran et al. |
| 7,511,774 B2 | 3/2009 | Lee et al. |
| 7,626,644 B2 | 12/2009 | Shestak et al. |
| 7,646,451 B2 | 1/2010 | Vogel et al. |
| 7,692,859 B2 | 4/2010 | Redert et al. |
| 7,885,079 B2 | 2/2011 | Chen et al. |
| 7,954,967 B2 | 6/2011 | Kashiwagi et al. |
| 7,997,783 B2 | 8/2011 | Song et al. |
| 8,040,952 B2 | 10/2011 | Park et al. |
| 8,049,710 B2 | 11/2011 | Shestak et al. |
| 8,139,024 B2 | 3/2012 | Daiku |
| 8,154,686 B2 | 4/2012 | Mather et al. |
| 8,154,799 B2 | 4/2012 | Kim et al. |
| 8,174,564 B2 | 5/2012 | Kim et al. |
| 8,209,396 B1 | 6/2012 | Raman et al. |
| 8,233,034 B2 | 7/2012 | Sharp et al. |
| 8,284,119 B2 | 10/2012 | Kim et al. |
| 8,310,527 B2 | 11/2012 | Ko et al. |
| 8,334,933 B2 | 12/2012 | Tsukada et al. |
| 8,363,928 B1 | 1/2013 | Sharp |
| 8,368,745 B2 | 2/2013 | Nam et al. |
| 8,384,774 B2 * | 2/2013 | Gallagher ................ 348/60 |
| 8,400,392 B2 | 3/2013 | Kimura et al. |
| 8,411,746 B2 | 4/2013 | Chen et al. |
| 8,441,430 B2 | 5/2013 | Lee |
| 8,466,869 B2 | 6/2013 | Kobayashi et al. |
| 8,487,863 B2 | 7/2013 | Park et al. |
| 8,525,942 B2 | 9/2013 | Robinson et al. |
| 8,587,642 B2 | 11/2013 | Shestak et al. |
| 8,587,736 B2 | 11/2013 | Kang |
| 8,605,136 B2 | 12/2013 | Yu et al. |
| 8,687,042 B2 | 4/2014 | Karaoguz et al. |
| 2002/0010798 A1 | 1/2002 | Ben-Shaul et al. |
| 2002/0037037 A1 | 3/2002 | Van Der Schaar |
| 2002/0167862 A1 | 11/2002 | Tomasi et al. |
| 2002/0171666 A1 | 11/2002 | Endo et al. |
| 2003/0012425 A1 | 1/2003 | Suzuki et al. |
| 2003/0103165 A1 | 6/2003 | Bullinger et al. |
| 2003/0137506 A1 | 7/2003 | Efran et al. |
| 2003/0154261 A1 | 8/2003 | Doyle et al. |
| 2003/0223499 A1 | 12/2003 | Routhier et al. |
| 2004/0027452 A1 | 2/2004 | Yun et al. |
| 2004/0036763 A1 | 2/2004 | Swift et al. |
| 2004/0041747 A1 | 3/2004 | Uehara et al. |
| 2004/0109093 A1 | 6/2004 | Small-Stryker |
| 2004/0141237 A1 | 7/2004 | Wohlstadter |
| 2004/0164292 A1 | 8/2004 | Tung et al. |
| 2004/0239231 A1 | 12/2004 | Miyagawa et al. |
| 2004/0252187 A1 | 12/2004 | Alden |
| 2005/0073472 A1 | 4/2005 | Kim et al. |
| 2005/0128353 A1 | 6/2005 | Young et al. |
| 2005/0237487 A1 | 10/2005 | Chang |
| 2005/0248561 A1 | 11/2005 | Ito et al. |
| 2005/0259147 A1 | 11/2005 | Nam et al. |
| 2006/0050785 A1 | 3/2006 | Watanabe et al. |
| 2006/0109242 A1 | 5/2006 | Simpkins |
| 2006/0139448 A1 | 6/2006 | Ha et al. |
| 2006/0139490 A1 | 6/2006 | Fekkes et al. |
| 2006/0244918 A1 | 11/2006 | Cossairt et al. |
| 2006/0256136 A1 | 11/2006 | O'Donnell et al. |
| 2006/0256302 A1 | 11/2006 | Hsu |
| 2006/0271791 A1 | 11/2006 | Novack et al. |
| 2007/0002041 A1 | 1/2007 | Kim et al. |
| 2007/0008406 A1 | 1/2007 | Shestak et al. |
| 2007/0008620 A1 | 1/2007 | Shestak et al. |
| 2007/0052807 A1 | 3/2007 | Zhou et al. |
| 2007/0072674 A1 | 3/2007 | Ohta et al. |
| 2007/0085814 A1 | 4/2007 | Ijzerman et al. |
| 2007/0096125 A1 | 5/2007 | Vogel et al. |
| 2007/0097103 A1 | 5/2007 | Yoshioka et al. |
| 2007/0097208 A1 | 5/2007 | Takemoto et al. |
| 2007/0139371 A1 | 6/2007 | Harsham et al. |
| 2007/0146267 A1 | 6/2007 | Jang et al. |
| 2007/0147827 A1 | 6/2007 | Sheynman et al. |
| 2007/0153916 A1 | 7/2007 | Demircin et al. |
| 2007/0162392 A1 | 7/2007 | McEnroe et al. |
| 2007/0258140 A1 | 11/2007 | Shestak et al. |
| 2007/0270218 A1 | 11/2007 | Yoshida et al. |
| 2007/0296874 A1 | 12/2007 | Yoshimoto et al. |
| 2008/0025390 A1 | 1/2008 | Shi et al. |
| 2008/0037120 A1 | 2/2008 | Koo et al. |
| 2008/0043096 A1 | 2/2008 | Vetro et al. |
| 2008/0043644 A1 | 2/2008 | Barkley et al. |
| 2008/0068329 A1 | 3/2008 | Shestak et al. |
| 2008/0126557 A1 | 5/2008 | Motoyama et al. |
| 2008/0133122 A1 | 6/2008 | Mashitani et al. |
| 2008/0150853 A1 | 6/2008 | Peng et al. |
| 2008/0165176 A1 | 7/2008 | Archer et al. |
| 2008/0168129 A1 | 7/2008 | Robbin et al. |
| 2008/0184301 A1 | 7/2008 | Boylan et al. |
| 2008/0191964 A1 | 8/2008 | Spengler |
| 2008/0192112 A1 | 8/2008 | Hiramatsu et al. |
| 2008/0246757 A1 | 10/2008 | Ito |
| 2008/0259233 A1 | 10/2008 | Krijn et al. |
| 2008/0273242 A1 | 11/2008 | Woodgate et al. |
| 2008/0284844 A1 | 11/2008 | Woodgate et al. |
| 2008/0303832 A1 | 12/2008 | Kim et al. |
| 2009/0002178 A1 | 1/2009 | Guday et al. |
| 2009/0010264 A1 | 1/2009 | Zhang |
| 2009/0051759 A1 | 2/2009 | Adkins et al. |
| 2009/0052164 A1 | 2/2009 | Kashiwagi et al. |
| 2009/0058845 A1 | 3/2009 | Fukuda et al. |
| 2009/0102915 A1 | 4/2009 | Arsenich |
| 2009/0115783 A1 | 5/2009 | Eichenlaub |
| 2009/0115800 A1 | 5/2009 | Berretty et al. |
| 2009/0133051 A1 | 5/2009 | Hildreth |
| 2009/0138805 A1 | 5/2009 | Hildreth |
| 2009/0141182 A1 | 6/2009 | Miyashita et al. |
| 2009/0167639 A1 | 7/2009 | Casner et al. |
| 2009/0174700 A1 | 7/2009 | Daiku |
| 2009/0232202 A1 | 9/2009 | Chen et al. |
| 2009/0238378 A1 | 9/2009 | Kikinis et al. |
| 2009/0244262 A1 | 10/2009 | Masuda et al. |
| 2009/0268816 A1 | 10/2009 | Pandit et al. |
| 2009/0319625 A1 | 12/2009 | Kouhi |
| 2010/0007582 A1 | 1/2010 | Zalewski |
| 2010/0066850 A1 | 3/2010 | Wilson et al. |
| 2010/0070987 A1 | 3/2010 | Amento et al. |
| 2010/0071015 A1 | 3/2010 | Tomioka et al. |
| 2010/0079374 A1 | 4/2010 | Cortenraad et al. |
| 2010/0097525 A1 | 4/2010 | Mino |
| 2010/0107184 A1 | 4/2010 | Shintani |
| 2010/0128112 A1 | 5/2010 | Marti et al. |
| 2010/0135640 A1 | 6/2010 | Zucker et al. |
| 2010/0182407 A1 | 7/2010 | Ko et al. |
| 2010/0208042 A1 | 8/2010 | Ikeda et al. |
| 2010/0215343 A1 | 8/2010 | Ikeda et al. |
| 2010/0225576 A1 | 9/2010 | Morad et al. |
| 2010/0231511 A1 | 9/2010 | Henty et al. |
| 2010/0238274 A1 | 9/2010 | Kim et al. |
| 2010/0238367 A1 | 9/2010 | Montgomery et al. |
| 2010/0245548 A1 | 9/2010 | Sasaki et al. |
| 2010/0272174 A1 | 10/2010 | Toma et al. |
| 2010/0302461 A1 | 12/2010 | Lim et al. |

(56) References Cited

U.S. PATENT DOCUMENTS

| | | |
|---|---|---|
| 2010/0306800 A1 | 12/2010 | Jung et al. |
| 2010/0309290 A1 | 12/2010 | Myers |
| 2011/0016004 A1 | 1/2011 | Loyall et al. |
| 2011/0043475 A1 | 2/2011 | Rigazio et al. |
| 2011/0050687 A1 | 3/2011 | Alyshev et al. |
| 2011/0063289 A1 | 3/2011 | Gantz |
| 2011/0090233 A1 | 4/2011 | Shahraray et al. |
| 2011/0090413 A1 | 4/2011 | Liou |
| 2011/0093882 A1 | 4/2011 | Candelore et al. |
| 2011/0109964 A1 | 5/2011 | Kim et al. |
| 2011/0113343 A1 | 5/2011 | Trauth |
| 2011/0122944 A1 | 5/2011 | Gupta et al. |
| 2011/0149026 A1 | 6/2011 | Luthra |
| 2011/0157167 A1 | 6/2011 | Bennett et al. |
| 2011/0157168 A1 | 6/2011 | Bennett et al. |
| 2011/0157169 A1 | 6/2011 | Bennett et al. |
| 2011/0157170 A1 | 6/2011 | Bennett et al. |
| 2011/0157172 A1 | 6/2011 | Bennett et al. |
| 2011/0157257 A1 | 6/2011 | Bennett et al. |
| 2011/0157264 A1 | 6/2011 | Seshadri et al. |
| 2011/0157309 A1 | 6/2011 | Bennett et al. |
| 2011/0157315 A1 | 6/2011 | Bennett et al. |
| 2011/0157322 A1 | 6/2011 | Bennett et al. |
| 2011/0157326 A1 | 6/2011 | Karaoguz et al. |
| 2011/0157327 A1 | 6/2011 | Seshadri et al. |
| 2011/0157330 A1 | 6/2011 | Bennett et al. |
| 2011/0157336 A1 | 6/2011 | Bennett et al. |
| 2011/0157339 A1 | 6/2011 | Bennett et al. |
| 2011/0157471 A1 | 6/2011 | Seshadri et al. |
| 2011/0157696 A1 | 6/2011 | Bennett et al. |
| 2011/0157697 A1 | 6/2011 | Bennett et al. |
| 2011/0161843 A1 | 6/2011 | Bennett et al. |
| 2011/0164034 A1 | 7/2011 | Bennett et al. |
| 2011/0164111 A1 | 7/2011 | Karaoguz et al. |
| 2011/0164115 A1 | 7/2011 | Bennett et al. |
| 2011/0164188 A1 | 7/2011 | Karaoguz et al. |
| 2011/0169913 A1 | 7/2011 | Karaoguz et al. |
| 2011/0169919 A1 | 7/2011 | Karaoguz et al. |
| 2011/0169930 A1 | 7/2011 | Bennett et al. |
| 2011/0199469 A1 | 8/2011 | Gallagher |
| 2011/0234754 A1 | 9/2011 | Newton et al. |
| 2011/0254698 A1 | 10/2011 | Eberl et al. |
| 2011/0268177 A1* | 11/2011 | Tian et al. ................ 375/240.01 |
| 2011/0282631 A1 | 11/2011 | Poling et al. |
| 2012/0016917 A1 | 1/2012 | Priddle et al. |
| 2012/0081515 A1 | 4/2012 | Jang |
| 2012/0212414 A1 | 8/2012 | Osterhout et al. |
| 2012/0235900 A1 | 9/2012 | Border et al. |
| 2012/0308208 A1 | 12/2012 | Karaoguz et al. |
| 2013/0127980 A1 | 5/2013 | Haddick et al. |

FOREIGN PATENT DOCUMENTS

| | | |
|---|---|---|
| EP | 1816510 A1 | 8/2007 |
| EP | 1993294 A2 | 11/2008 |
| WO | 2005/045488 A1 | 5/2005 |
| WO | 2007/024118 A1 | 3/2007 |
| WO | 2009/098622 A2 | 8/2009 |

OTHER PUBLICATIONS

IEEE 100 The Authoritative Dictionary of IEEE Standards Terms Seventh Edition, entry for "engine", IEEE 100-2000, 2000, pp. 349-411.

IEEE 100 The Authoritative Dictionary of IEEE Standards Terms Seventh Edition, entry for "Web page", IEEE 100-2000, 2000, pp. 1269-1287.

Wikipedia entry on "Scripting language", available online at <http://en.wikipedia.org/wiki/Scripting_language>, retrieved on Aug. 16, 2012, 4 pages.

Shan et al., "Principles and Evaluation of Autostereoscopic Photogrammetric Measurement", Photogrammetric Engineering and Remote Sensing, Journal of the American Society for Photogrammetry and Remote Sensing, vol. 72, No. 4, Apr. 2006, pp. 365-372.

Peterka, Thomas, "Dynallax: Dynamic Parallax Barrier Autostereoscopic Display", PH.D. Dissertation, University of Illinois at Chicago, 2007, 134 pages.

Yanagisawa et al., "A Focus Distance Controlled 3D TV", Proc. SPIE 3012, Stereoscopic Displays and Virtual Reality Systems IV, May 15, 1997, pp. 256-261.

EPO Communication received for European Patent Application No. 10016055.5, dated Apr. 5, 2013, 6 pages.

European search Report received for European Patent application No. 10016055.5, mailed on Apr. 12, 2011, 3 pages.

European Search Report received for European Patent application No. 10015984.7, mailed on May 3, 2011, 3 pages.

Yanaka, Kazuhisa, "Stereoscopic Display Technique for Web3D Images", SIGGRAPH 2009, New Orleans, Louisiana, Aug. 3-7, 2009, 1 page.

Kumar, et al., "Eye Point: Practical Pointing and Selection Using Gaze and Keyboard", Apr. 28-May 3, 2007, 10 pages.

Fono, et al., "EyeWindows: Evaluation of Eye-Controlled Zooming Windows for Focus Selection", Apr. 2-7, 2005, pp. 151-160.

"Displaying Stereoscopic 3D (S3D) with Intel HD Graphics Processors for Software Developers", Intel, Aug. 2011, pp. 1-10.

Liao, et al., "The Design and Application of High-Resolution 3D Stereoscopic graphics Display on PC", Purdue University School of Science, 2000, 7 pages.

Ruddarraju, et al., "Perceptual User Interfaces using Vision-based Eye Tracking", ICMI, Nov. 2003, pp. 1-7.

Ko, et al., "Facial Feature Tracking and Head Orientation-based Gaze Tracking", ETRI, 2000, pp. 1-4.

* cited by examiner

MULTIPLE REMOTE CONTROLLERS THAT EACH SIMULTANEOUSLY CONTROLS A DIFFERENT VISUAL PRESENTATION OF A 2D/3D DISPLAY

CROSS-REFERENCE TO RELATED APPLICATIONS

This application claims the benefit of U.S. Provisional Patent Application No. 61/291,818, filed on Dec. 31, 2009, and U.S. Provisional Patent Application No. 61/303,119, filed on Feb. 10, 2010. The entirety of each of these applications is incorporated by reference herein.

This application is also a continuation-in-part of U.S. patent application Ser. No. 12/845,461, filed on Jul. 28, 2010, and entitled "Display Supporting Multiple Simultaneous 3D Views," the entirety of which is incorporated by reference herein.

This application is also related to the following U.S. patent applications, each of which also claims the benefit of U.S. Provisional Patent Application Nos. 61/291,818 and 61/303,119 and each of which is incorporated by reference herein:

U.S. patent application Ser. No. 12/774,225, filed on May 5, 2010 and entitled "Controlling a Pixel Array to Support an Adaptable Light Manipulator";

U.S. patent application Ser. No. 12/774,307, filed on May 5, 2010 and entitled "Display with Elastic Light Manipulator";

U.S. patent application Ser. No. 12/845,409, filed on Jul. 28, 2010, and entitled "Display with Adaptable Parallax Barrier";

U.S. patent application Ser. No. 12/845,440, filed on Jul. 28, 2010, and entitled "Adaptable Parallax Barrier Supporting Mixed 2D and Stereoscopic 3D Display Regions";

U.S. patent application Ser. No. 12/1982,020, filed on even date herewith and entitled "Backlighting Array Supporting Adaptable Parallax Barrier";

U.S. patent application Ser. No. 12/982,031, filed on even date herewith and entitled "Coordinated Driving of Adaptable Light Manipulator, Backlighting and Pixel Array in Support of Adaptable 2D and 3D Displays";

U.S. patent application Ser. No. 12/982,062, filed on even date herewith and entitled "Set-top Box Circuitry Supporting 2D and 3D Content Reductions to Accommodate Viewing Environment Constraints";

U.S. patent application Ser. No. 12/982,069, filed on even date herewith and entitled "Three-Dimensional Display System With Adaptation Based on Viewing Reference of Viewer(s)"; and U.S. patent application Ser. No. 12/982,362, filed on even date herewith and entitled "Independent Viewer Tailoring of Same Media Source Content via a Common 2D-3D Display."

BACKGROUND OF THE INVENTION

1. Field of the Invention

The present invention generally relates to displays systems that enable viewers to view images in three dimensions and interfaces for controlling the same.

2. Background Art

Images may be generated for display in various forms. For instance, television (TV) is a widely used telecommunication medium for transmitting and displaying images in monochromatic ("black and white") or color form. Conventionally, images are provided in analog form and are displayed by display devices in two-dimensions. More recently, images are being provided in digital form for display in two-dimensions on display devices having improved resolution (e.g., "high definition" or "HD"). Even more recently, images capable of being displayed in three-dimensions are being generated.

Conventional displays may use a variety of techniques to achieve three-dimensional image viewing functionality. For example, various types of glasses have been developed that may be worn by users to view three-dimensional images displayed by a conventional display. Examples of such glasses include glasses that utilize color filters or polarized filters. In each case, the lenses of the glasses pass two-dimensional images of differing perspective to the user's left and right eyes. The images are combined in the visual center of the brain of the user to be perceived as a three-dimensional image. In another example, synchronized left eye, right eye LCD (liquid crystal display) shutter glasses may be used with conventional two-dimensional displays to create a three-dimensional viewing illusion. In still another example, LCD display glasses are being used to display three-dimensional images to a user. The lenses of the LCD display glasses include corresponding displays that provide images of differing perspective to the user's eyes, to be perceived by the user as three-dimensional.

Problems exist with such techniques for viewing three-dimensional images. For instance, persons that use such displays and systems to view three-dimensional images may suffer from headaches, eyestrain, and/or nausea after long exposure. Furthermore, some content, such as two-dimensional text, may be more difficult to read and interpret when displayed three-dimensionally. To address these problems, some manufacturers have created display devices that may be toggled between three-dimensional viewing and two-dimensional viewing. A display device of this type may be switched to a three-dimensional mode for viewing of three-dimensional images, and may be switched to a two-dimensional mode for viewing of two-dimensional images (and/or to provide a respite from the viewing of three-dimensional images).

A parallax barrier is another example of a device that enables images to be displayed in three-dimensions. A parallax barrier includes of a layer of material with a series of precision slits. The parallax barrier is placed proximal to a display so that a user's eyes each see a different set of pixels to create a sense of depth through parallax. A disadvantage of parallax barriers is that the viewer must be positioned in a well-defined location in order to experience the three-dimensional effect. If the viewer moves his/her eyes away from this "sweet spot," image flipping and/or exacerbation of the eyestrain, headaches and nausea that may be associated with prolonged three-dimensional image viewing may result. Conventional three-dimensional displays that utilize parallax barriers are also constrained in that the displays must be entirely in a two-dimensional image mode or a three-dimensional image mode at any time.

BRIEF SUMMARY OF THE INVENTION

Remote control devices that can be used to independently modify multiple visual presentations that are simultaneously displayed by a screen assembly are described herein, wherein at least one of the visual presentations is observable by a first viewer but not a second viewer. The remote control devices can also be used to independently select media content upon which each of the multiple visual presentations is based and to control the manner in which such media content is delivered to the screen assembly. In accordance with certain embodiments, at least one of the visual presentations comprises a three-dimensional visual presentation. Display systems that include such remote control devices and methods of operating the same are also described. The remote control devices, display systems and methods are substantially as shown in and/or described herein in connection with at least one of the figures, as set forth more completely in the claims.

BRIEF DESCRIPTION OF THE
DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 19:
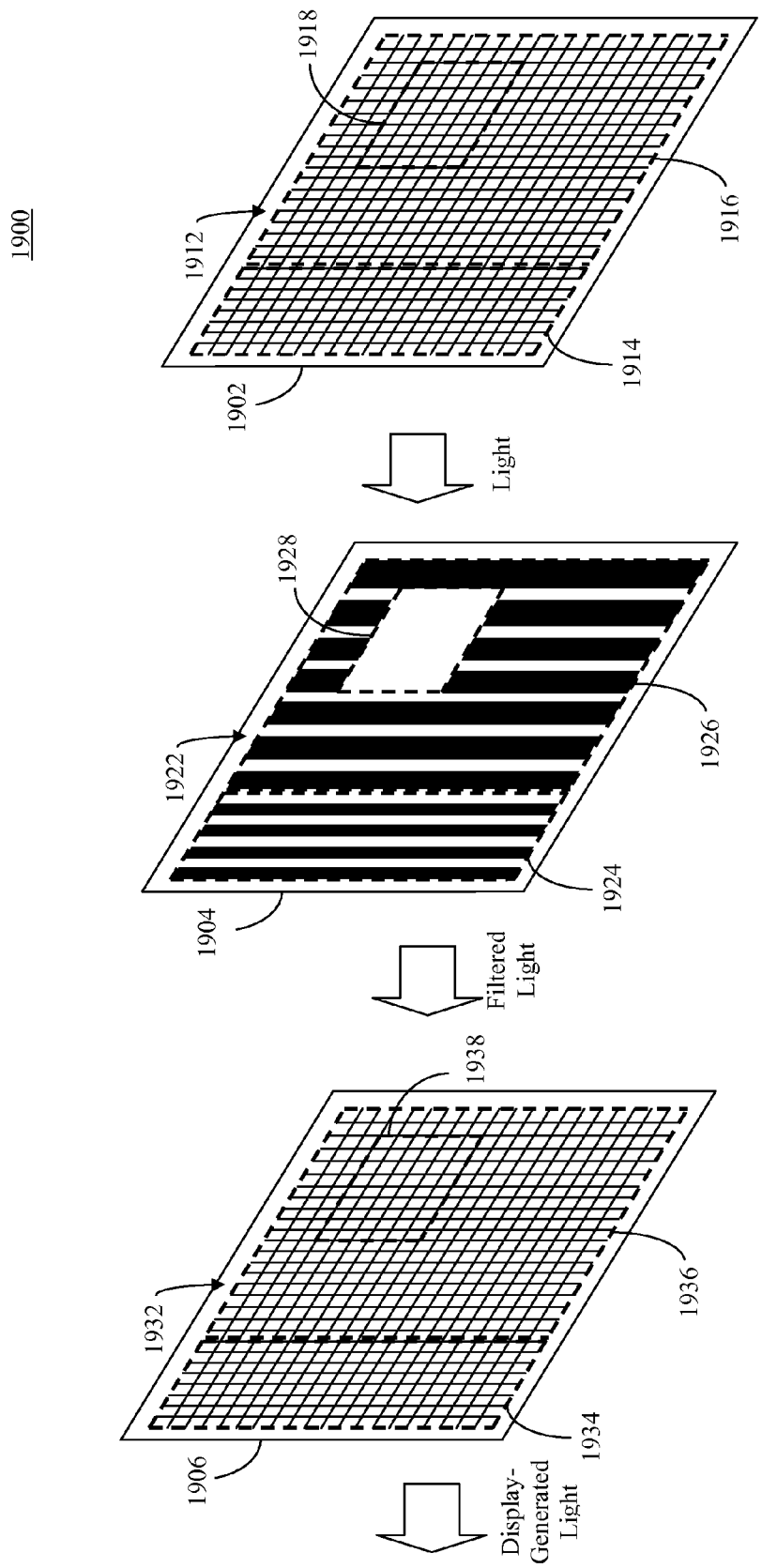

FIG. 19 provides an exploded view of a display system that utilizes a controllable backlight array to provide regional luminosity control in accordance with an embodiment.

Figure 20:
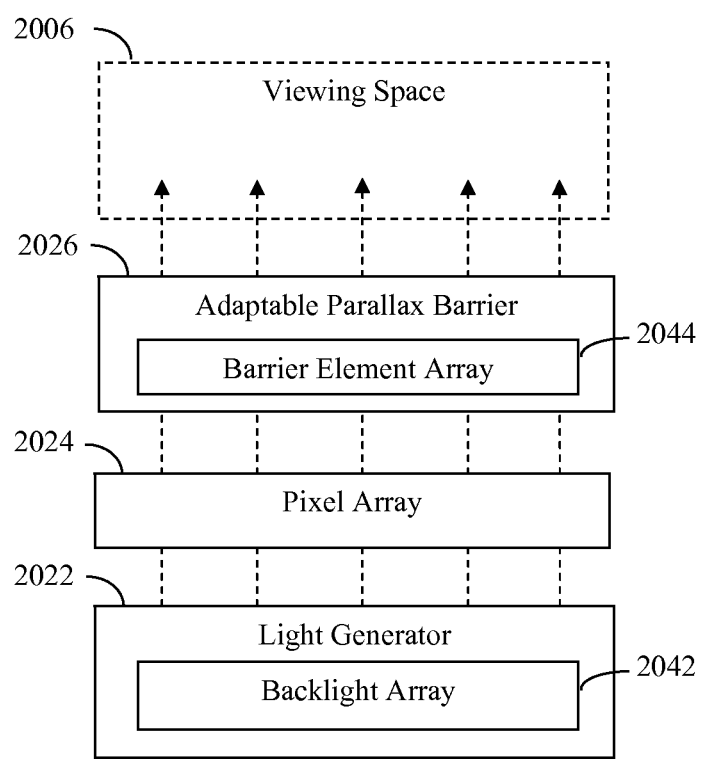

FIG. 20 is a block diagram of a display system that includes a pixel array disposed between a light generator and an adaptable parallax barrier in accordance with an embodiment.

Figure 21:
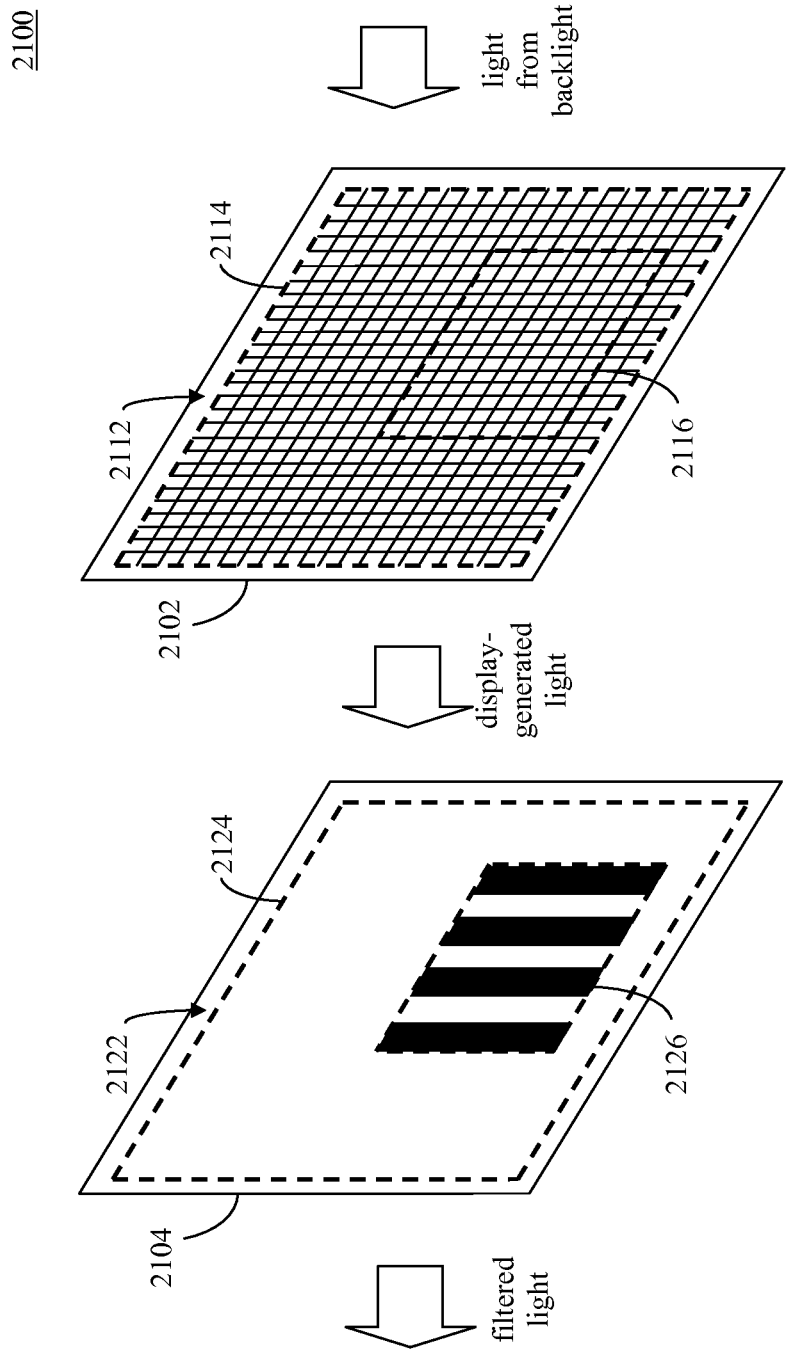

FIG. 21 provides an exploded view of a display system that implements a regional brightness control scheme based on pixel intensity in accordance with an embodiment.

Figure 22:
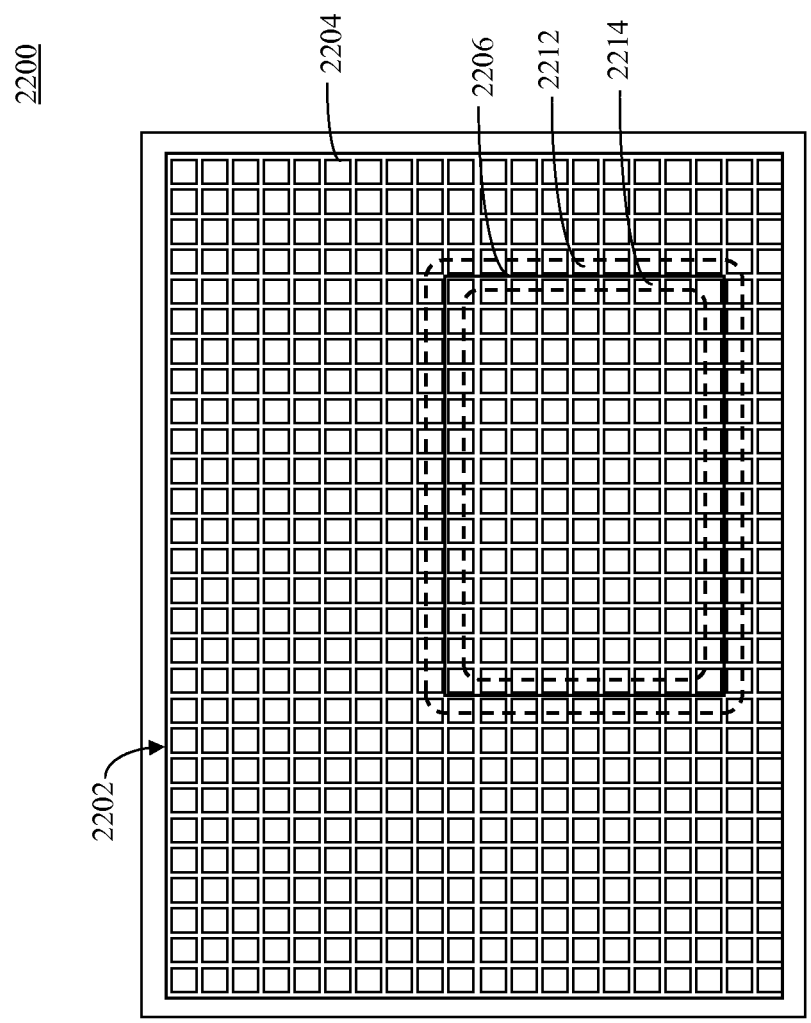

FIG. 22 illustrates a front perspective view of a display panel of a display system in accordance with an embodiment.

Figure 23:
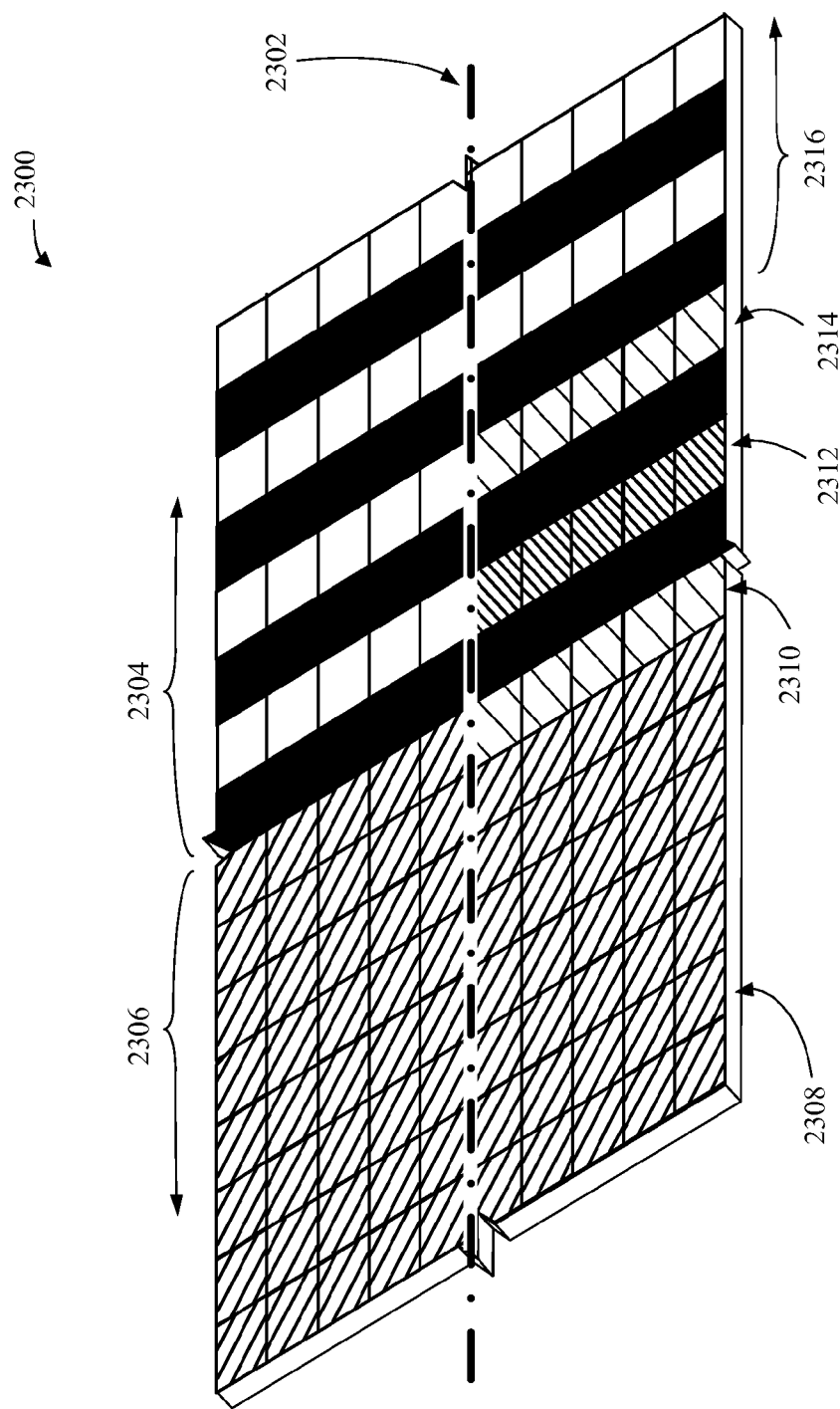

FIG. 23 illustrates two exemplary configurations of an adaptable light manipulator that includes a parallax barrier and a brightness regulation overlay in accordance with an embodiment.

Figure 24:
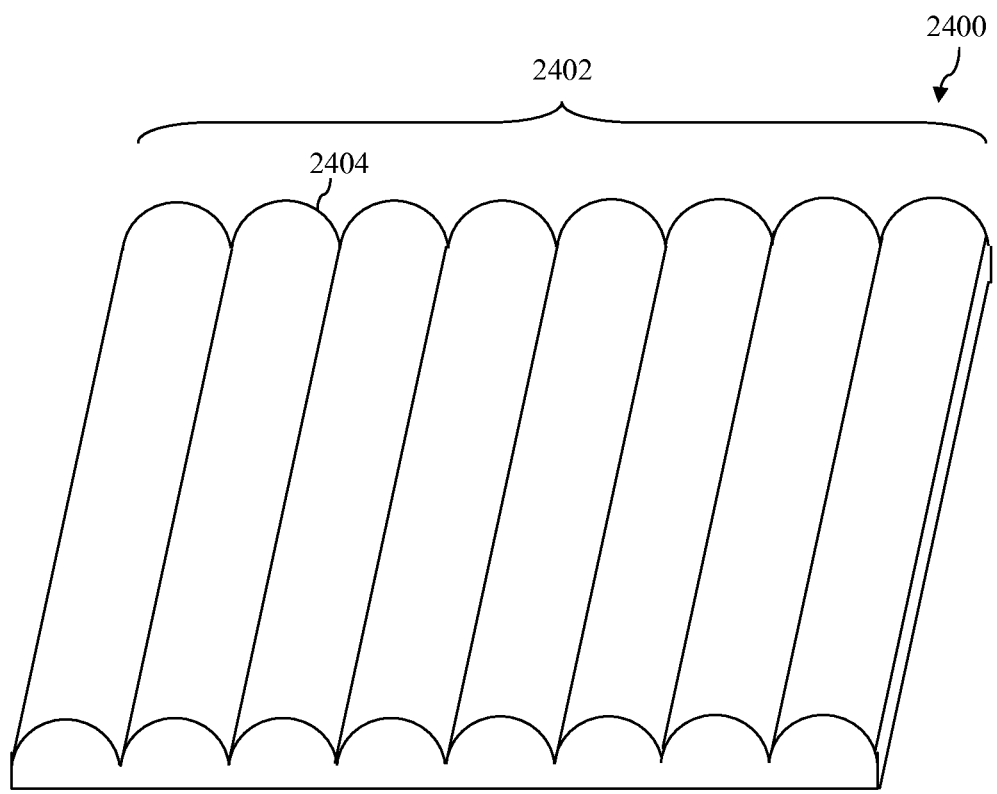

FIG. 24 shows a perspective view of an adaptable lenticular lens that may be used in a displays system in accordance with an embodiment.

Figure 25:
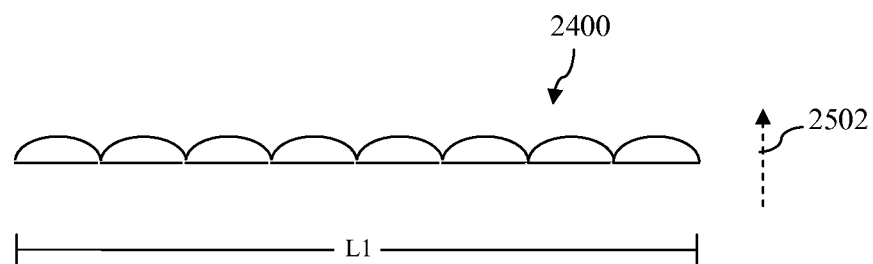

FIG. 25 shows a side view of the adaptable lenticular lens of FIG. 24.

Figure 26:
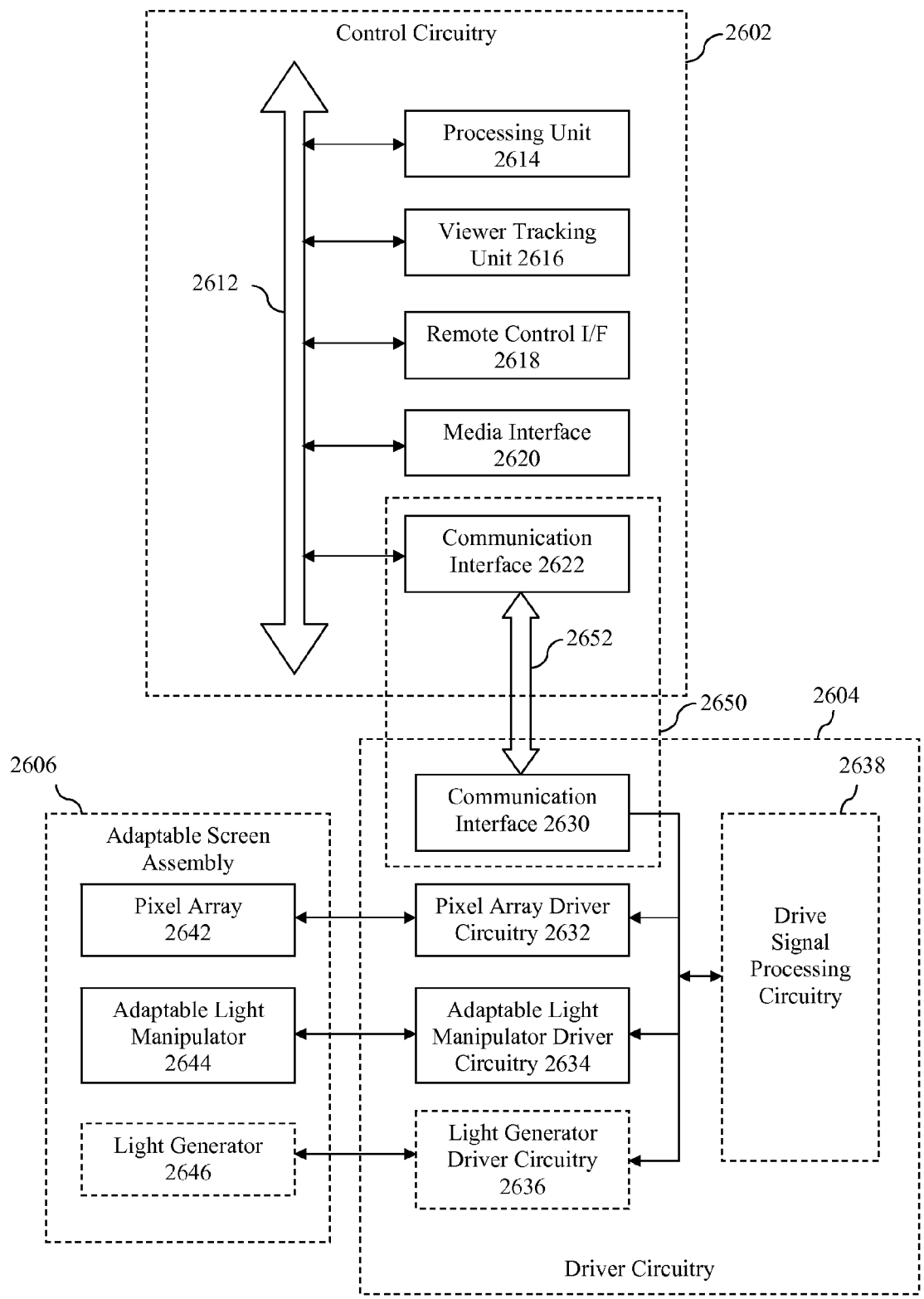

FIG. 26 is a block diagram of an example implementation of a display system that includes an adaptable screen assembly that supports the simultaneous display of multiple visual presentations in accordance with an embodiment.

Figure 27:
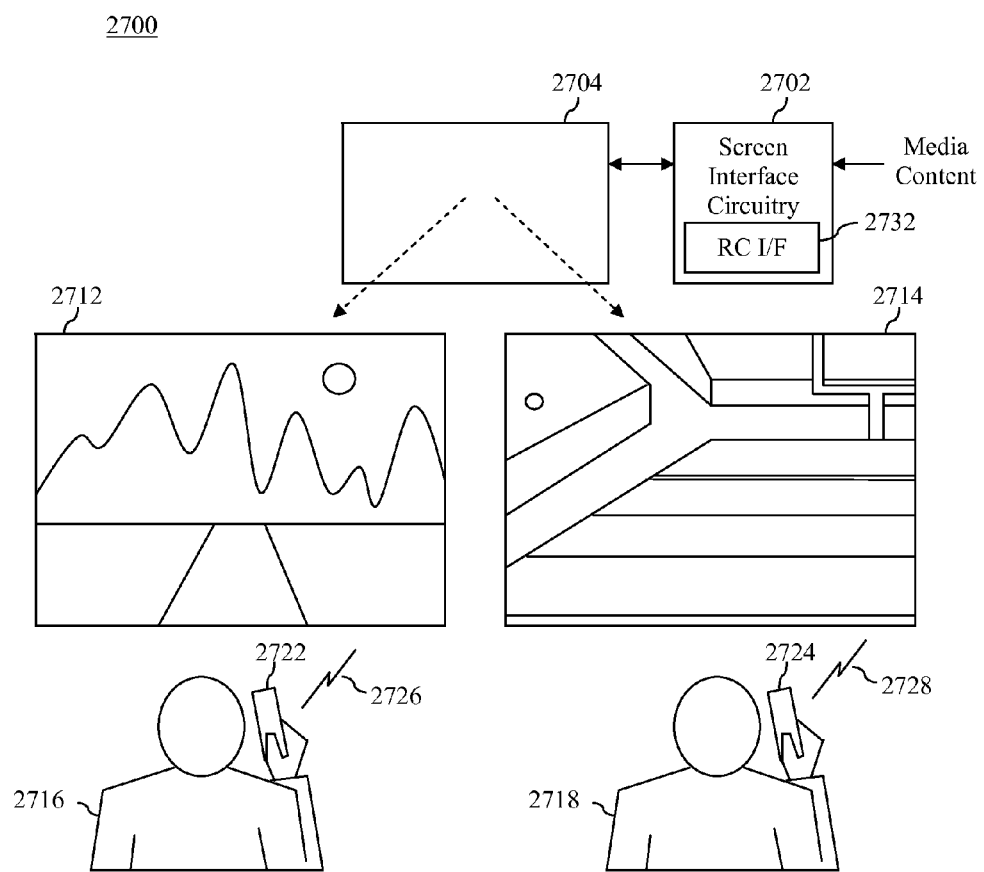

FIG. 27 depicts a display system that includes a screen assembly and remote control devices that can be used to independently modify multiple visual presentations that are simultaneously displayed by the screen assembly in accordance with an embodiment.

Figure 28:
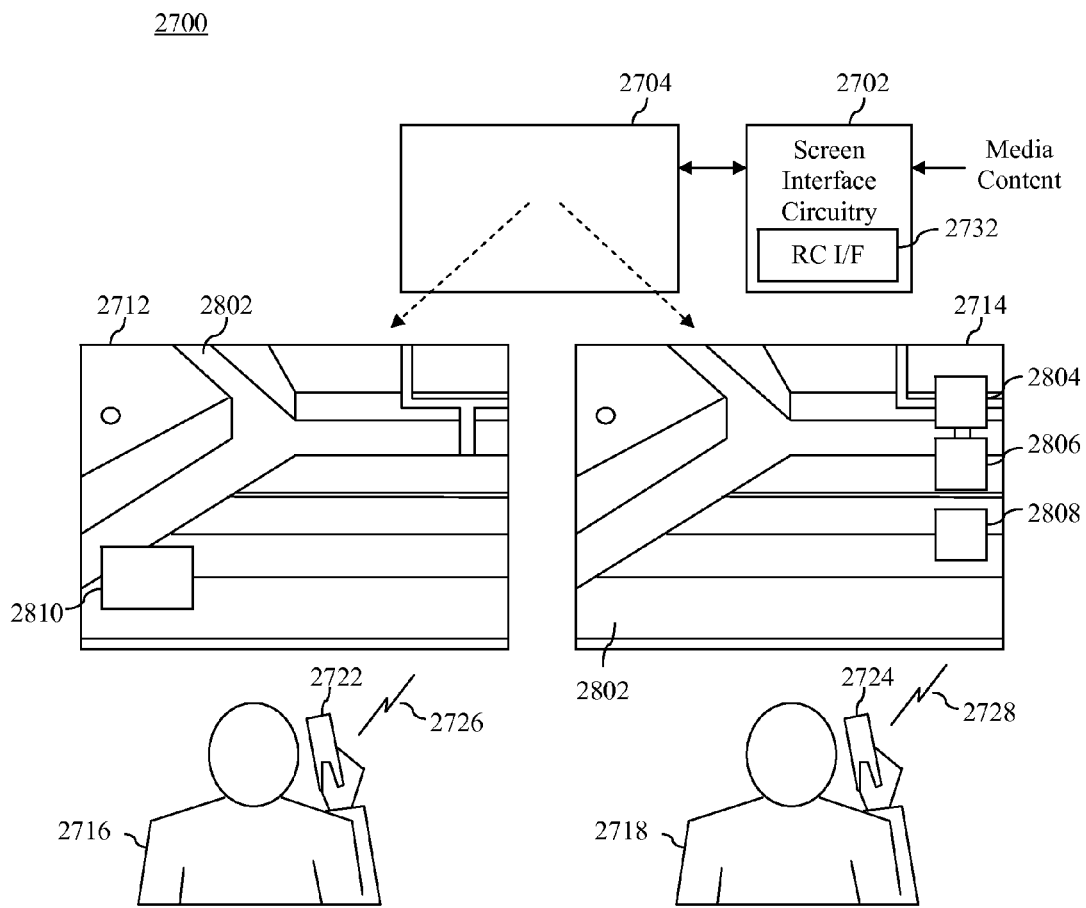

FIG. 28 depicts the display system of FIG. 27, wherein the screen assembly has a different configuration than that shown in FIG. 27.

Figure 29:
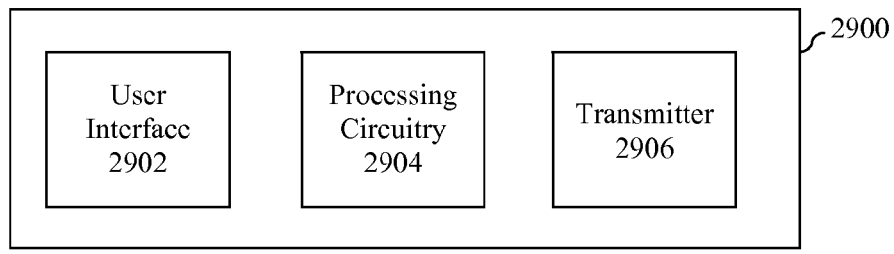

FIG. 29 is a block diagram of a remote control device that can be used to independently control one of multiple visual presentations simultaneously displayed by a screen assembly in accordance with an embodiment.

Figure 30:
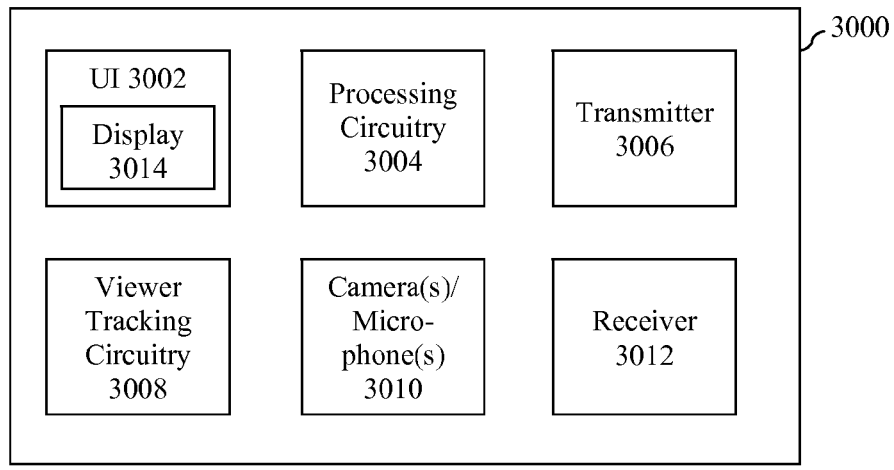

FIG. 30 is a block diagram of a remote control device that can be used to independently control one of multiple visual presentations simultaneously displayed by a screen assembly in accordance with an alternative embodiment.

Figure 31:
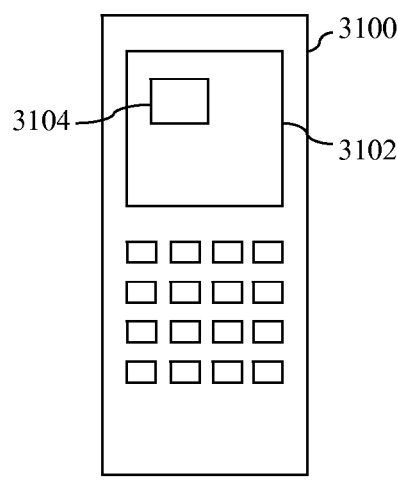

FIG. 31 depicts an example remote control device that provides preview functionality in accordance with an embodiment.

Figure 32:
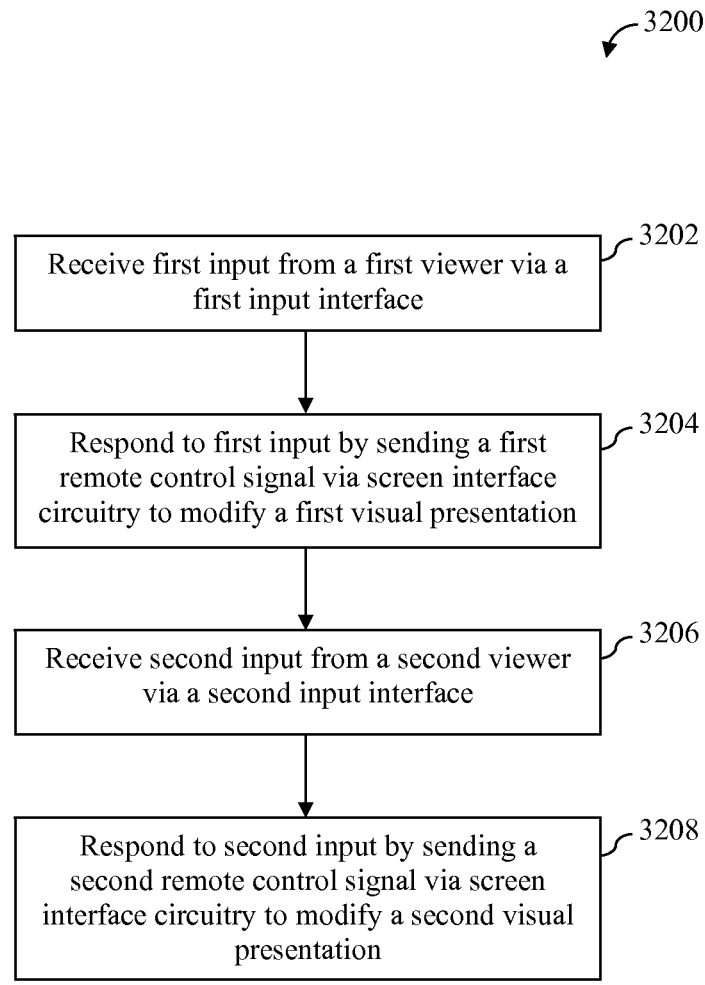

FIG. 32 depicts a flowchart of a method for modifying visual presentations simultaneously displayed by a screen assembly in accordance with an embodiment.

Figure 33:
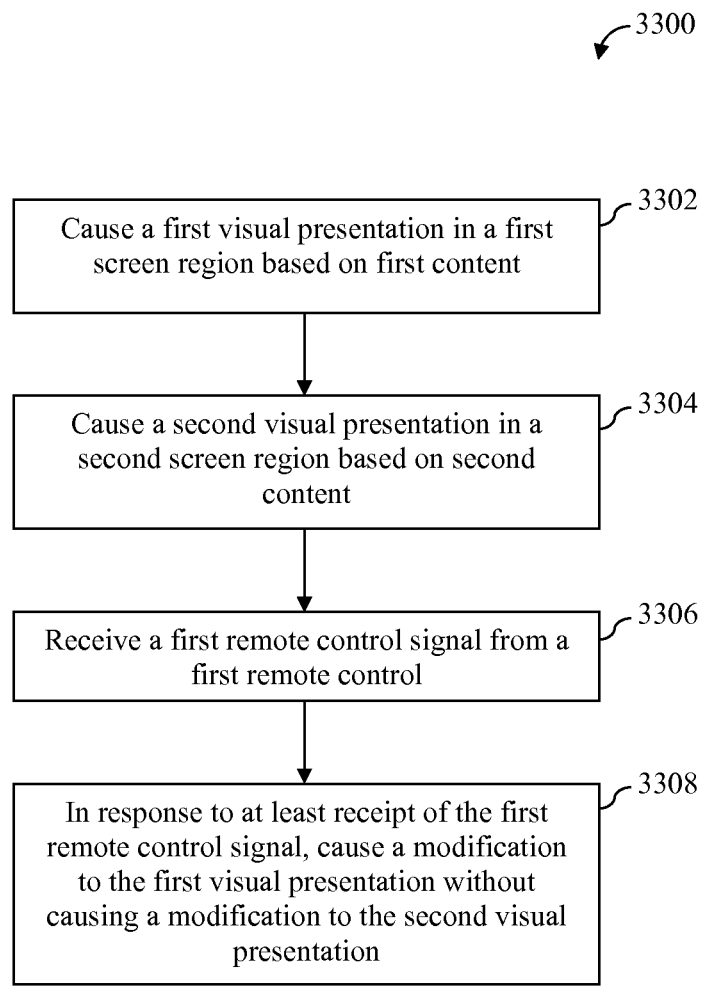

FIG. 33 depicts a flowchart of a method of operation of a display system that includes a screen assembly operable to simultaneously present first media content via a first screen region and second media content via a second screen region in accordance with an embodiment.

Figure 34:
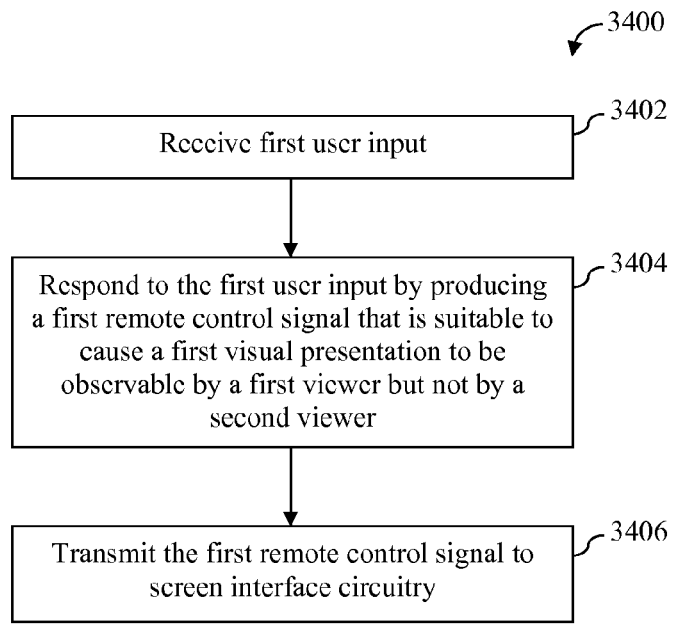

FIG. 34 depicts a flowchart of a method of operation of a remote control unit in accordance with an embodiment.

Figure 35:
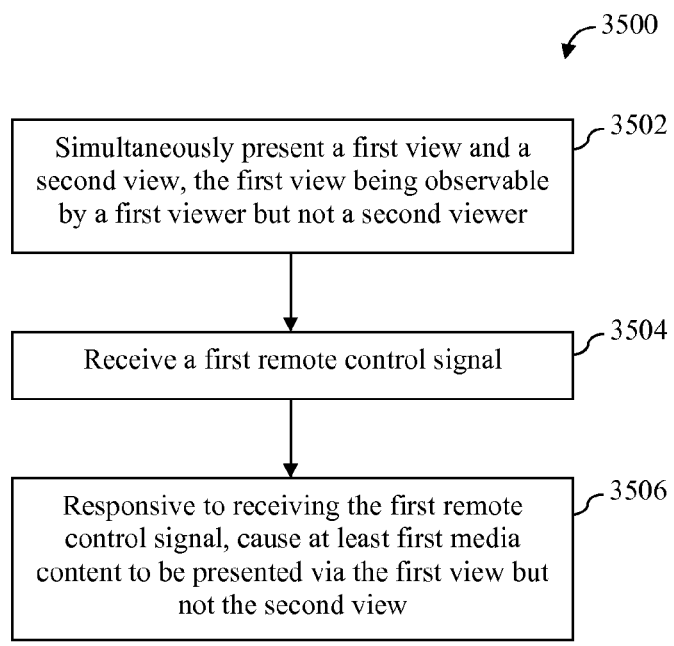

FIG. 35 depicts a flowchart of a method of operation of a display system that includes a screen assembly operable to simultaneously present multiple views and at least one remote control in accordance with an embodiment.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

I. Introduction

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

Remote control devices that can be used to independently modify multiple visual presentations that are simultaneously displayed by a screen assembly are described herein, wherein at least one of the visual presentations is observable by a first viewer but not a second viewer. The remote control devices can also be used to independently select media content upon which each of the multiple visual presentations is based and to control the manner in which such media content is delivered to the screen assembly. In accordance with certain embodiments, at least one of the visual presentations comprises a three-dimensional visual presentation. Display systems that include such remote control devices and methods of operating the same are also described.

Figure 1:
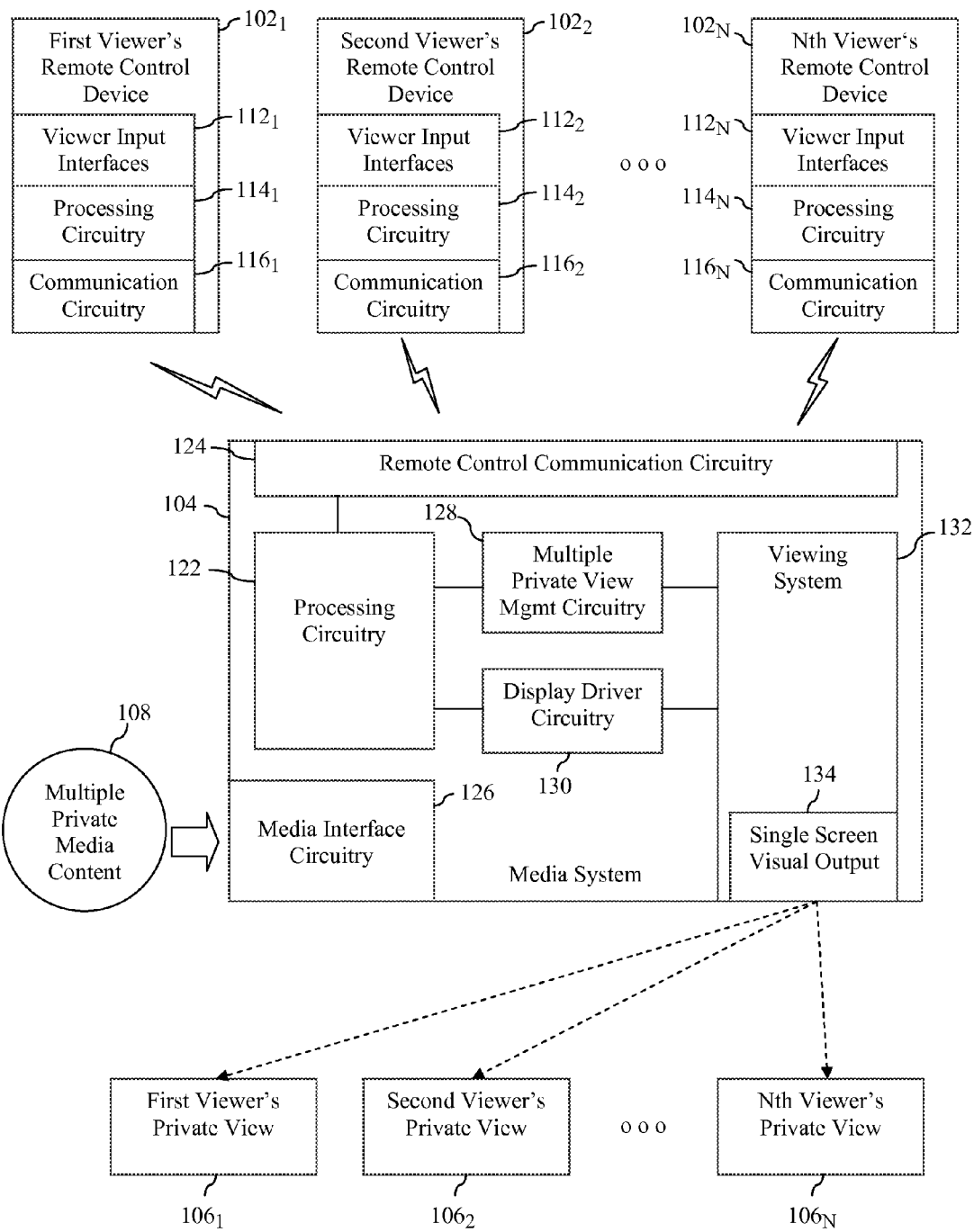
FIG. 1 depicts an exemplary display system that includes multiple remote control devices that can be used to independently select and control media content simultaneously delivered to multiple corresponding viewers via a single display screen in accordance with an embodiment.

FIG. 1 depicts an exemplary display system 100 that includes multiple remote control devices that can be used to independently select and control media content that is simultaneously delivered to multiple corresponding viewers via a single display screen in accordance with one embodiment. As shown in FIG. 1, display system 100 includes a media system 104 and a plurality of remote control devices $102_1$-$102_N$ connected thereto.

Generally speaking, media system 104 is capable of receiving multiple private media content 108 from one or more media sources and simultaneously displaying such multiple private media content via a viewing system 132 that includes a single display screen. Viewing system 132 is capable of simultaneously displaying the multiple private media content in a manner that allows each of a plurality of viewers to view their own private media content without being able to observe the private media content that is simultaneously being displayed to the other viewers. Thus, as shown in FIG. 1, media system 104 simultaneously delivers a private view $106_1$ to a first viewer, a private view $106_2$ to a second viewer, and so on and so forth, up to a private view $106_N$ which is delivered to an Nth viewer, all via the same single screen visual output 134.

As shown in FIG. 1, media system 104 includes media interface circuitry 126 that receives multiple private media content 108 and processing circuitry 122 that controls display driver circuitry 130 to generate the necessary drive signals to cause such multiple private media content 108 to be simultaneously displayed by the single screen of viewing system 132.

As further shown in FIG. 1, media system 104 includes remote control communication circuitry 124 for wirelessly receiving remote control signals from each of a plurality of remote control devices $102_1$-$102_N$. Each remote control device may be associated with a particular viewer among the aforementioned plurality of viewers. Thus, for example, the first viewer may utilize remote control device $102_1$, the second viewer may utilize $102_2$, and the Nth viewer may utilize remote control device $102_N$. Each viewer may utilize his/her own remote control device to select his/her own private media content for delivery to the display screen of viewing system 132 and to control the manner in which such private media content is presented by the display screen and/or delivered thereto. Each viewer may implement such control functions by providing input to a corresponding viewer input interface $112_1$-$112_N$ of a respective remote control device $102_1$-$102_N$. Processing circuitry $114_1$-$114_N$ of each remote control device operates to generate suitably-formatted commands based on such input and communication circuitry $116_1$-$116_N$ operates to wirelessly transmit such commands to remote control communication circuitry 124.

Commands so received by remote control communication circuitry 124 are processed by processing circuitry 122. The processing of such commands may lead to a change in one or more private views associated with each viewer as managed by multiple private view management circuitry 128. The processing of such commands may also lead to a change in a configuration of viewing system 132 and/or the content delivered thereto wherein such change may be implemented via controlled delivery of drive signals from display driver circuitry 130.

Figure 2:
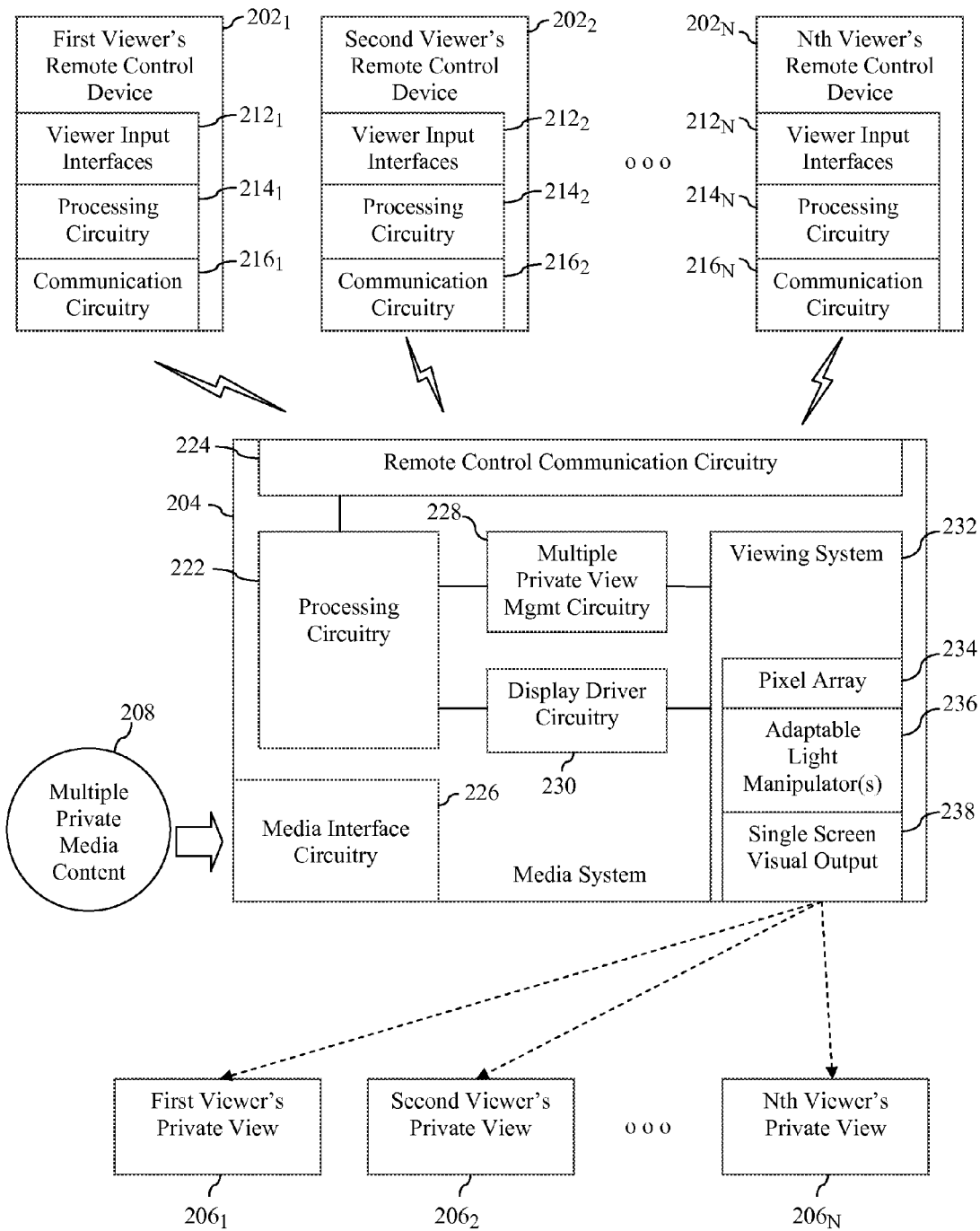
FIG. 2 depicts an exemplary display system that includes multiple remote control devices that can be used to independently select and control media content simultaneously delivered to multiple corresponding viewers via a single display screen implemented with one or more adaptable light manipulators in accordance with one embodiment.

FIG. 2 depicts an exemplary display system 200 that includes multiple remote control devices that can be used to independently select and control media content simultaneously delivered to multiple corresponding viewers via a single display screen implemented with one or more adaptable light manipulators in accordance with one embodiment. Display system 200 may be thought of as one embodiment of display system 100 of FIG. 1.

As shown in FIG. 2, display system 200 includes a media system 204 and a plurality of remote control devices $202_1$-$202_N$ connected thereto. Generally speaking, media system 204 is capable of receiving multiple private media content 208 from one or more media sources and simultaneously displaying such multiple private media content via a viewing system 232 that includes a single display screen. Viewing system 232 is capable of simultaneously displaying the multiple private media content in a manner that allows each of a plurality of viewers to view their own private media content without being able to observe the private media content that is simultaneously being displayed to the other viewers. Thus, as shown in FIG. 2, media system 204 simultaneously delivers a private view $206_1$ to a first viewer, a private view $206_2$ to a second viewer, and so on and so forth, up to a private view $206_N$ which is delivered to an Nth viewer, all via the same single screen visual output 238. To achieve this, viewing system 232 includes one or more adaptable light manipulators 236 that operate to filter light generated by a pixel array 234. More details concerning a viewing system that utilizes adaptable light manipulator(s) to simultaneously deliver multiple different private views to multiple different viewers will be described in Section II below.

As shown in FIG. 2, media system 204 includes media interface circuitry 226 that receives multiple private media content 208 and processing circuitry 222 that controls display driver circuitry 230 to generate the necessary drive signals to cause such multiple private media content 208 to be simultaneously displayed by the single screen of viewing system 232.

As further shown in FIG. 2, media system 204 includes remote control communication circuitry 224 for wirelessly receiving remote control signals from each of a plurality of remote control devices $202_1$-$202_N$. Each remote control device may be associated with a particular viewer among the aforementioned plurality of viewers. Thus, for example, the first viewer may utilize remote control device $202_1$, the second viewer may utilize $202_2$, and the Nth viewer may utilize remote control device $202_N$. Each viewer may utilize his/her own remote control device to select his/her own private media content for delivery to the display screen of viewing system 232 and to control the manner in which such private media content is presented by the display screen and/or delivered thereto. Each viewer may implement such control functions by providing input to a corresponding viewer input interface $212_1$-$212_N$ of a respective remote control device $202_1$-$202_N$. Processing circuitry $214_1$-$214_N$ of each remote control device operates to generate suitably-formatted commands based on such input and communication circuitry $216_1$-$216_N$ operates to wirelessly transmit such commands to remote control communication circuitry 224.

Commands so received by remote control communication circuitry 224 are processed by processing circuitry 222. The processing of such commands may lead to a change in one or more private views associated with each viewer as managed by multiple private view management circuitry 228. The processing of such commands may also lead to a change in a configuration of viewing system 232 and/or the content delivered thereto wherein such change may be implemented via controlled delivery of drive signals from display driver circuitry 230.

Figure 3:
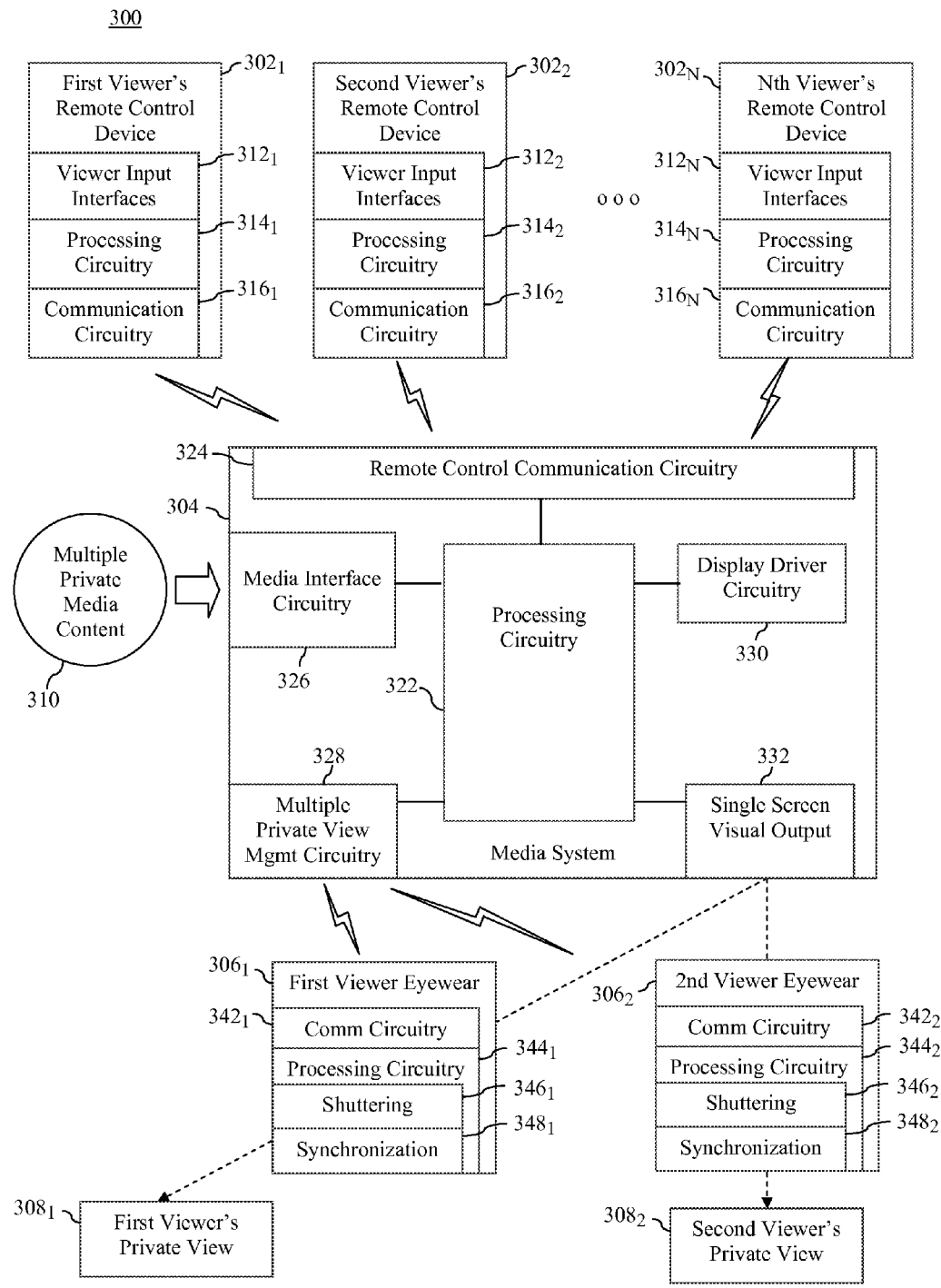
FIG. 3 depicts an exemplary display system that includes multiple remote control devices that can be used to independently select and control media content simultaneously delivered to multiple corresponding viewers via a single display screen used in conjunction with viewer eyewear in accordance with one embodiment.

FIG. 3 depicts an exemplary display system 300 that includes multiple remote control devices that can be used to independently select and control media content simultaneously delivered to multiple corresponding viewers via a single display screen used in conjunction with viewer eyewear in accordance with one embodiment. Display system 300 may be thought of as one embodiment of display system 100 of FIG. 1.

As shown in FIG. 3, display system 300 includes a media system 304 and a plurality of remote control devices $302_1$-$302_N$ connected thereto. Generally speaking, media system 304 is capable of receiving multiple private media content 310 from one or more media sources and simultaneously displaying such multiple private media content via a single screen 332. Single screen 232 is capable of simultaneously displaying the multiple private media content in a manner that allows each of a plurality of viewers wearing associated eyewear to view their own private media content without being able to observe the private media content that is simultaneously being displayed to the other viewers.

In particular, a first viewer may wear first eyewear $306_1$ and a second viewer may wear second eyewear $306_2$. Each eyewear $306_1$ and $306_2$ may comprise shutter glasses, such as LCD shutter glasses, that are synchronized to cause the first viewer to see a private view $308_1$ that is directed to the first viewer and to cause the second viewer to simultaneously see a second private view $308_2$ that is directed to the second viewer. In particular, during periods when a right and/or left shutter lens associated with first viewer eyewear $306_1$ is open, private media content associated with the first viewer is displayed by single screen 332 and the right and left shutter lenses associated with second viewer eyewear $306_2$ are closed. Conversely, when a right and/or left shutter lens associated with second viewer eyewear $306_2$ is open, private media content associated with the second viewer is displayed by single screen 332 and the right and left shutter lenses associated with first viewer eyewear $306_1$ are closed. By alternating displayed media content in synchronization with such shuttering performed by first viewer eyewear $306_1$ and second viewer eyewear $306_2$ in this manner, multiple private views $308_1$ and $308_2$ can be delivered. Thus, as shown in FIG. 3, media system 304 simultaneously delivers private view $308_1$ to the first viewer and private view $308_2$ to the second viewer all via the same single screen visual output 332.

As shown in FIG. 3, media system 304 includes media interface circuitry 326 that receives multiple private media content 310 and processing circuitry 322 that controls display driver circuitry 330 to generate the necessary drive signals to cause such multiple private media content 310 to be simultaneously displayed by the single screen 332.

As further shown in FIG. 3, media system 304 includes remote control communication circuitry 324 for wirelessly receiving remote control signals from each of a plurality of remote control devices $302_1$-$302_N$. Each remote control device may be associated with a particular viewer among the aforementioned plurality of viewers. Thus, for example, the first viewer may utilize remote control device $302_1$, the second viewer may utilize $302_2$, and the Nth viewer may utilize remote control device $302_N$. Each viewer may utilize his/her own remote control device to select his/her own private media content for delivery to single screen 332 and to control the manner in which such private media content is presented by single screen 332 and/or delivered thereto. Each viewer may implement such control functions by providing input to a corresponding viewer input interface $312_1$-$312_N$ of a respective remote control device $302_1$-$302_N$. Processing circuitry $314_1$-$314_N$ of each remote control device operates to generate suitably-formatted commands based on such input and communication circuitry $316_1$-$316_N$ operates to wirelessly transmit such commands to remote control communication circuitry 324.

Commands so received by remote control communication circuitry 324 are processed by processing circuitry 322. The processing of such commands may lead to a change in one or more private views associated with each viewer as managed by multiple private view management circuitry 328. The processing of such commands may also lead to a change in a configuration of screen 332 and/or the content delivered thereto wherein such change may be implemented via controlled delivery of drive signals from display driver circuitry 330.

Multiple private view management circuitry 328 may manage the different private views by communicating wirelessly with first viewer eyewear $306_1$ and/or second viewer eyewear $306_2$. Communication with such equipment may be facilitated by communication circuitry $342_1$ and $342_2$, respectively. Responsive to communication received from multiple private view management circuitry 328, processing circuitry $344_1$ within first viewer eyewear $306_1$ may invoke or implement changes to the configuration of shuttering circuitry $346_1$ and/or synchronization circuitry $348_1$. Likewise, responsive to communication received from multiple private view management circuitry 328, processing circuitry $344_2$ within second viewer eyewear $306_2$ may invoke or implement changes to the configuration of shuttering circuitry $346_2$ and/or synchronization circuitry $348_2$.

II. Exemplary Display Systems that Support Simultaneous Visual Presentations Observable by Different Viewers Before describing example remote control devices that can be used to independently modify multiple visual presentations that are simultaneously displayed by a screen assembly, to select media content upon which such visual presentations are based, and to control the manner of delivery of such media content to the screen assembly, various exemplary display systems that include such screen assemblies will first be described.

A. Example Screen Assemblies Including Adaptable Parallax Barriers

Figure 4:
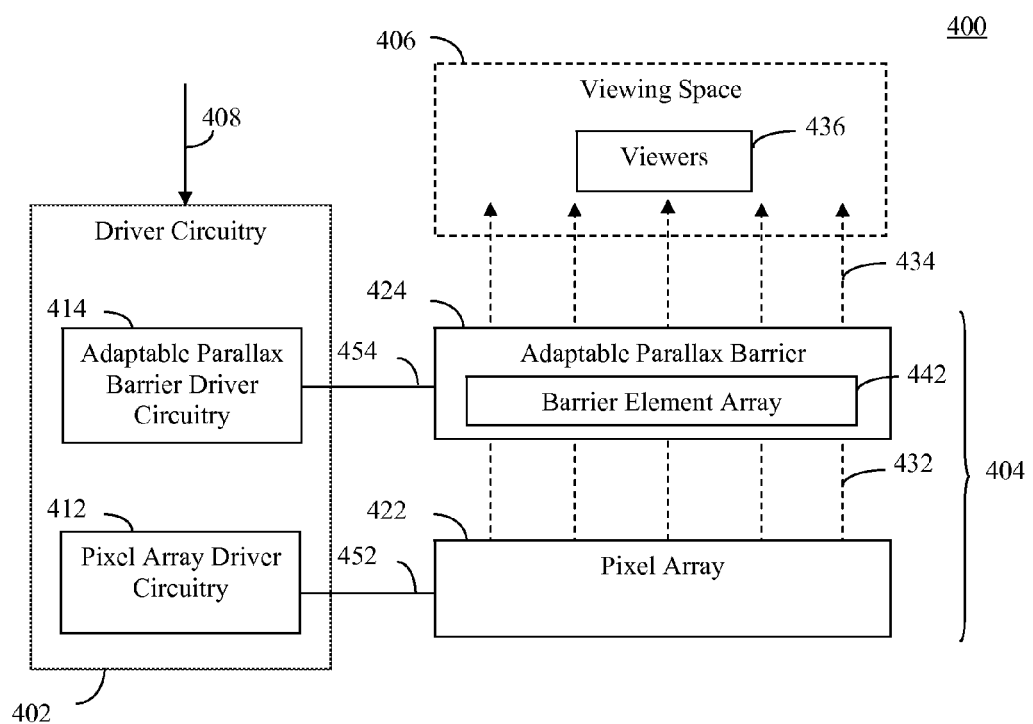
FIG. 4 is a block diagram of a display system that includes a screen assembly that utilizes an adaptable parallax barrier to support the simultaneous display of multiple simultaneous visual presentations in accordance with an embodiment.

FIG. 4 is a block diagram of a display system 400 that includes a screen assembly 404 that utilizes an adaptable parallax barrier to support the simultaneous display of multiple visual presentations in accordance with an embodiment. As shown in FIG. 4, display system 400 includes driver circuitry 402 and a screen assembly 404, wherein screen assembly 404 include a pixel array 422 and an adaptable parallax barrier 424. As further shown in FIG. 4, driver circuitry 402 includes pixel array driver circuitry 412 and adaptable parallax barrier driver circuitry 414.

Pixel array 422 comprises a two-dimensional array of pixels (e.g., arranged as a grid or other distribution) that operates to emit light 432. Pixel array 422 may comprise a self-illuminating or light-generating pixel array such that the pixels of pixel array 422 each emit light included in light 432. Alternatively, each pixel in pixel array 422 may operate to selectively pass light emitted by a backlighting source (not shown in FIG. 4) to produce light 432. Each pixel of pixel array 422 may be individually controllable to vary color and intensity. In an embodiment, each pixel of pixel array 422 may include a plurality of sub-pixels that correspond to separate color channels, such as a trio of red, green, and blue sub-pixels included in each pixel.

Adaptable parallax barrier 424 is positioned proximate to a surface of pixel array 422. Barrier element array 442 is a layer of adaptable parallax barrier 424 that includes a plurality of barrier elements or blocking regions arranged in an array. Each barrier element of the array is configured to be selectively opaque or transparent. Combinations of barrier elements may be configured to be selectively opaque or transparent to enable various effects. For example, the states of the barrier elements of barrier element array 442 may be configured such that light 432 emanating from pixel array 422 is filtered to produce filtered light 434, wherein filtered light 434 includes one or more two-dimensional and/or three-dimensional images that may be viewed by viewers 436 in a viewing space 406.

Depending upon the implementation, each barrier element may have a round, square, or rectangular shape, and barrier element array 442 may have any number of rows of barrier elements that extend a vertical length of barrier element array 442. In another embodiment, each barrier element may have a "band" shape that extends a vertical length of barrier element array 442, such that barrier element array 442 includes a single horizontal row of barrier elements. Each barrier element may include one or more of such bands, and different regions of barrier element array 442 may include barrier elements that include different numbers of such bands.

It is noted that in some embodiments, barrier elements may be capable of being completely transparent or opaque, and in other embodiments, barrier elements may not be capable of being fully transparent or opaque. For instance, such barrier elements may be capable of being 95% transparent when considered to be "transparent" and may be capable of being 5% transparent when considered to be "opaque." "Transparent" and "opaque" as used herein are intended to encompass barrier elements being substantially transparent (e.g., greater than 75% transparent, including completely transparent) and substantially opaque (e.g., less than 25% transparent, including completely opaque), respectively.

Driver circuitry 402 receives control signals 408 from control circuitry (not shown in FIG. 4). The control signals 408 cause driver circuitry 402 to place screen assembly 404 in a selected one of a plurality of different viewing configurations. In particular, based on control signals 408, adaptable parallax barrier driver circuitry 414 transmits drive signals 454 that cause barrier element array 442 to be placed in a state that supports the selected viewing configuration. The selected viewing configuration may be a particular two-dimensional viewing configuration, a particular three-dimensional viewing configuration, or a viewing configuration that supports the simultaneous display of different types of two-dimensional and/or three-dimensional content.

Figure 5:
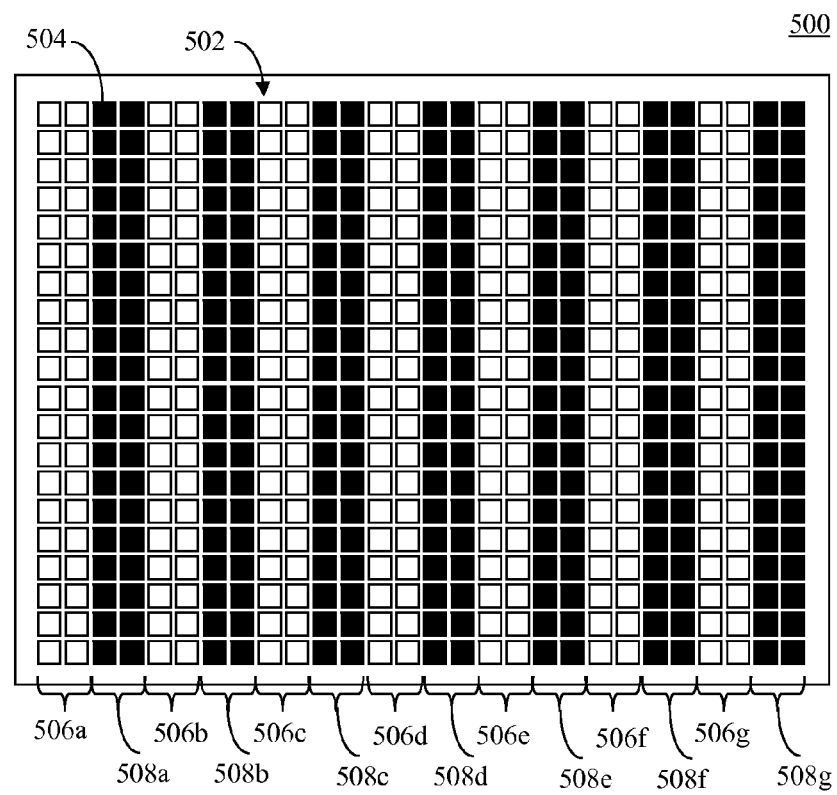
FIG. 5 illustrates an arrangement of an adaptable parallax barrier in accordance with an embodiment that supports a particular three-dimensional viewing configuration.

For example, FIG. 5 shows an arrangement of an adaptable parallax barrier 500 that supports a particular three-dimensional viewing configuration. Adaptable parallax barrier 500 is an example of adaptable parallax barrier 424 of FIG. 1. As shown in FIG. 5, adaptable parallax barrier 500 includes a barrier element array 502, which includes a plurality of barrier elements 504 arranged in a two-dimensional array. Furthermore, as shown in FIG. 5, barrier element array 502 includes a plurality of parallel strips of barrier elements 504 that are selected to be non-blocking to form a plurality of parallel non-blocking strips (or "slits") 506a-506g. As shown in FIG. 5, parallel non-blocking strips 506a-506g (non-blocking slits) are alternated with parallel blocking strips 508a-508g of barrier elements 504 that are selected to be blocking. In the example of FIG. 5, non-blocking strips 506a-506g and blocking strips 508a-508g each have a width (along the x-dimension) of two barrier elements 504, and have lengths that extend along the entire y-dimension (twenty barrier elements 504) of barrier element array 502, although in other embodiments, may have alternative dimensions. Non-blocking strips 506a-506g and blocking strips 508a-508g form a parallax barrier configuration for adaptable parallax barrier 500. The spacing (and number) of parallel non-blocking strips 506 in barrier element array 502 may be selectable by choosing any number and combination of particular strips of barrier elements 504 in barrier element array 502 to be non-blocking, to be alternated with blocking strips 508, as desired. For example, hundreds, thousands, or even larger numbers of non-blocking strips 506 and blocking strips 508 may be present in adaptable parallax barrier 500.

Figure 6:
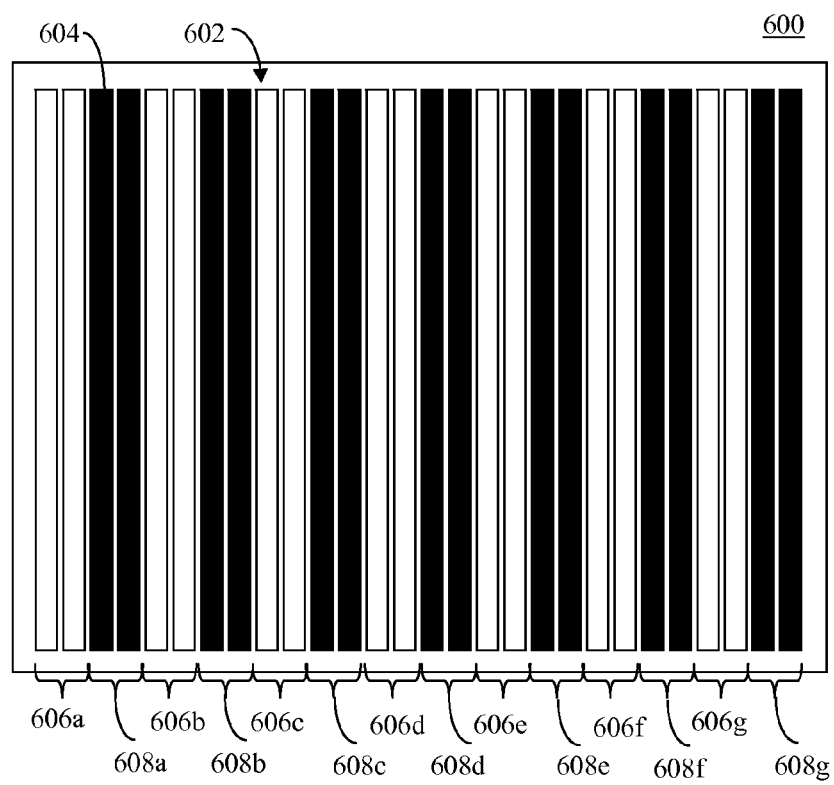
FIG. 6 illustrates an arrangement of an adaptable parallax barrier in accordance with an alternate embodiment that supports a particular three-dimensional viewing configuration.

FIG. 6 shows an alternative example of an adaptable parallax barrier 600 that has also been configured to support a particular three-dimensional viewing configuration. Similarly to adaptable parallax barrier 500 of FIG. 5, adaptable parallax barrier 600 includes a barrier element array 602, which includes a plurality of barrier elements 604 arranged in a two-dimensional array (28×1 array). Barrier elements 604 have widths (along the x-dimension) similar to the widths of barrier elements 504 in FIG. 5, but have lengths that extend along the entire vertical length (y-dimension) of barrier element array 602. As shown in FIG. 6, barrier element array 602 includes parallel non-blocking strips 606a-606g alternated with parallel blocking strips 608a-608g. In the example of FIG. 6, parallel non-blocking strips 606a-606g and parallel blocking strips 608a-608g each have a width (along the x-dimension) of two barrier elements 604, and have lengths that extend along the entire y-dimension (one barrier element 604) of barrier element array 602.

Each of adaptable parallax barriers 500 and 600, configured in the manner shown in FIGS. 5 and 6 respectively, filter light produced or passed by a pixel array to form one or more three-dimensional views in a viewing space, thus supporting a three-dimensional viewing configuration. To achieve a two-dimensional viewing configuration, all of the barrier elements of either adaptable parallax barrier 500 or 600 can simply be placed in a non-blocking state. Additional details concerning how the adaptable parallax barriers operate to support such three-dimensional viewing may be found, for example, in commonly-owned, co-pending U.S. patent application Ser. No. 12/845,409, filed on Jul. 28, 2010, and entitled "Display with Adaptable Parallax Barrier," the entirety of which is incorporated by reference herein.

In the adaptable parallax barrier configurations shown in FIGS. 5 and 6, the entirety of the barrier element array is filled with parallel non-blocking strips to support three-dimensional viewing. In further embodiments, one or more regions of an adaptable parallax barrier may be filled with parallel non-blocking strips to deliver three-dimensional images, and one or more other regions of the adaptable parallax barrier may be rendered transparent to deliver two-dimensional images. Thus, a viewing configuration that mixes two-dimensional and three-dimensional viewing regions may be supported.

Figure 7:
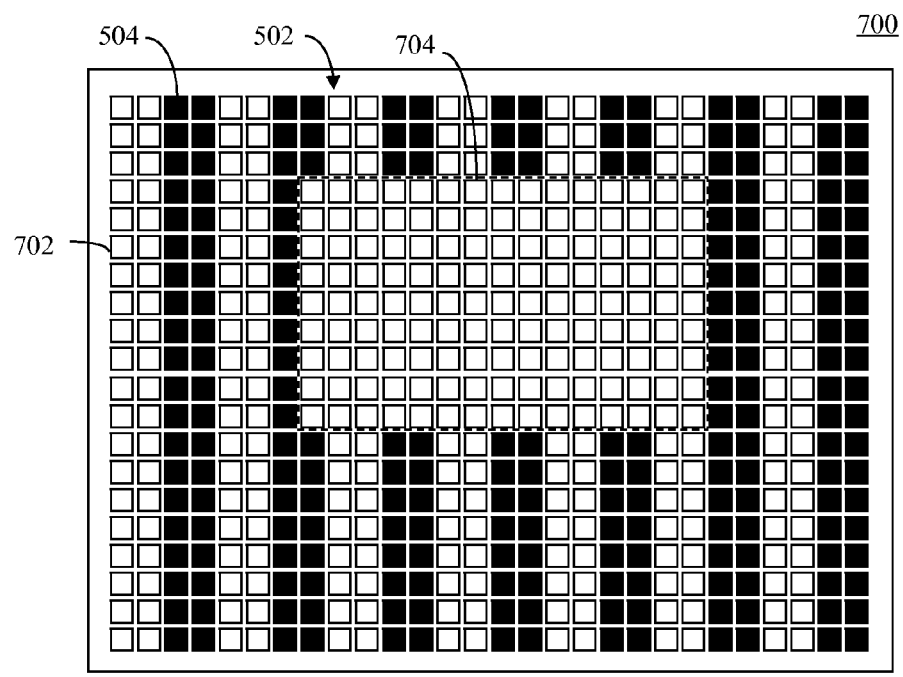
FIG. 7 illustrates an arrangement of an adaptable parallax barrier in accordance with an embodiment that supports a viewing configuration that mixes two-dimensional and three-dimensional viewing regions.

For instance, FIG. 7 shows an arrangement of an adaptable parallax barrier 700 that supports a viewing configuration that mixes two-dimensional and three-dimensional viewing regions according to example embodiments. Adaptable parallax barrier 700 is similar to adaptable parallax barrier 500 of FIG. 5, having barrier element array 502 including a plurality of barrier elements 504 arranged in a two-dimensional array. In FIG. 7, a first region 702 of barrier element array 502 includes a plurality of parallel non-blocking strips alternated with parallel blocking strips that together fill first region 702. A second region 704 of barrier element array 502 is surrounded by first region 702. Second region 704 is a rectangular shaped region of barrier element array 502 that includes a two-dimensional array of barrier elements 504 that are non-blocking. Thus, in FIG. 7, barrier element array 502 is configured to enable a three-dimensional image to be generated by pixels of a pixel array that are adjacent to barrier elements of first region 702, and to enable a two-dimensional image to be generated by pixels of the pixel array that are adjacent to barrier elements inside of second region 704. Note that alternatively, first region 702 may include all non-blocking barrier elements 502 to pass a two-dimensional image, and second region 704 may include parallel non-blocking strips alternated with parallel blocking strips to pass a three-dimensional image. In further embodiments, adaptable parallax barrier 700 may have additional numbers, sizes, and arrangements of regions configured to pass different combinations of two-dimensional images and three-dimensional images.

In still further embodiments, different regions of an adaptable parallax barrier that have parallel non-blocking strips may have the parallel non-blocking strips oriented at different angles to deliver three-dimensional images to viewers that are oriented differently. Thus, a viewing configuration that mixes three-dimensional viewing regions having different viewing orientations may be supported.

Figure 8:
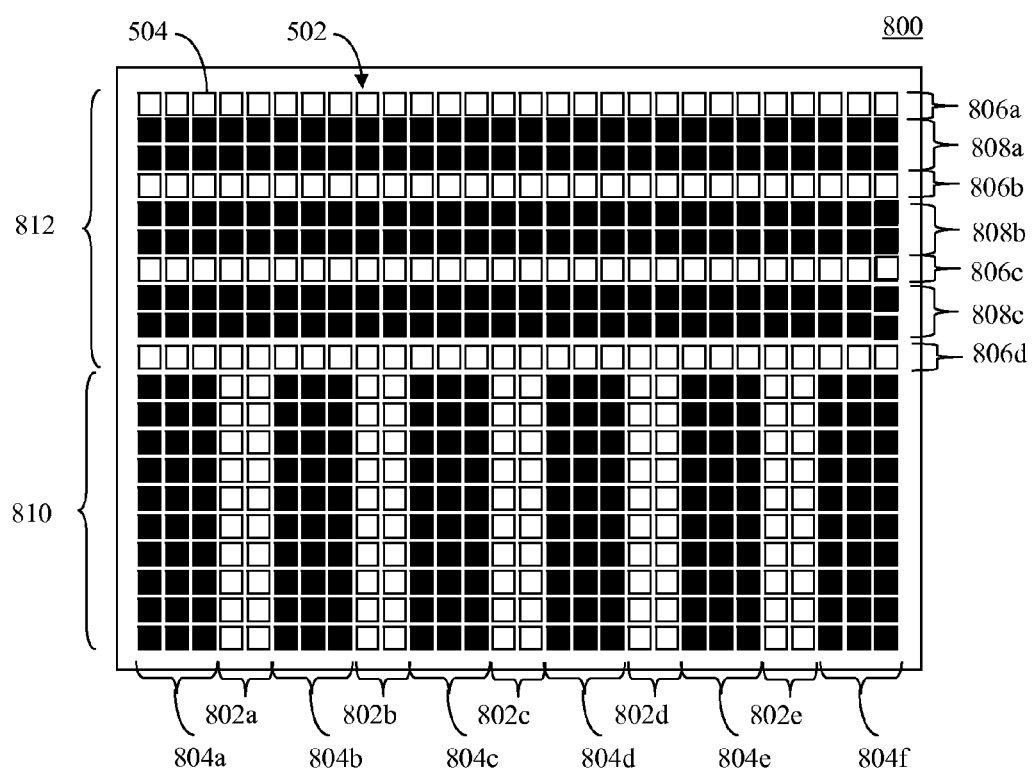
FIG. 8 illustrates an arrangement of an adaptable parallax barrier in accordance with an embodiment in which different orientations of transparent and opaque slits are used to simultaneously support different viewer orientations.

For example, FIG. 8 shows an arrangement of an adaptable parallax barrier 800 in which transparent slits have different orientations, according to an example embodiment. Adaptable parallax barrier 800 is similar to adaptable parallax barrier 500 of FIG. 5, having barrier element array 502 including a plurality of barrier elements 504 arranged in a two-dimensional array. A first region 810 (e.g., a bottom half) of barrier element array 502 includes a first plurality of parallel strips of barrier elements 504 that are selected to be non-blocking to form a first plurality of parallel non-blocking strips 802a-802e (each having a width of two barrier elements 504). As shown in FIG. 8, parallel non-blocking strips 802a-802e are alternated with parallel blocking strips 804a-804f of barrier elements 504 (each having a width of three barrier elements 504). Parallel non-blocking strips 802a-802e are oriented in a first direction (e.g., along a vertical axis).

Furthermore, as shown in FIG. 8, a second region 812 (e.g., a top half) of barrier element array 502 includes a second plurality of parallel strips of barrier elements 504 that are selected to be non-blocking to form a second plurality of parallel non-blocking strips 806a-806d (each having a width of one barrier element 504). As shown in FIG. 8, parallel non-blocking strips 806a-806d are alternated with parallel blocking strips 808a-808c of barrier elements 504 (each having a width of two barrier elements 504). Parallel non-blocking strips 806a-806d are oriented in a second direction (e.g., along a horizontal axis).

As such, in FIG. 8, first and second pluralities of parallel non-blocking strips 802a-802e and 806a-806d are present in barrier element array 502 that are oriented perpendicularly to each other. The region of barrier element array 502 that includes first plurality of parallel non-blocking strips 802a-802e may be configured to deliver a three-dimensional image in a viewing space to be viewable by a user whose body is oriented vertically (e.g., sitting upright or standing up). The region of barrier element array 502 that includes second plurality of parallel non-blocking strips 806a-806d may be configured to deliver a three-dimensional image in a viewing space to be viewable by a user whose body is oriented horizontally (e.g., laying down). In this manner, users who are oriented differently relative to each other can still each be provided with a corresponding three-dimensional image that accommodates their position.

Additional adaptable parallax barrier implementations and arrangements thereof that support mixed two-dimensional and/or three-dimensional viewing regions are described in commonly-owned, co-pending U.S. patent application Ser. No. 12/845,440, filed on Jul. 28, 2010 and entitled "Adaptable Parallax Barrier Supporting Mixed 2D and Stereoscopic 3D Display Regions," the entirety of which is incorporated by reference herein.

Figure 9:
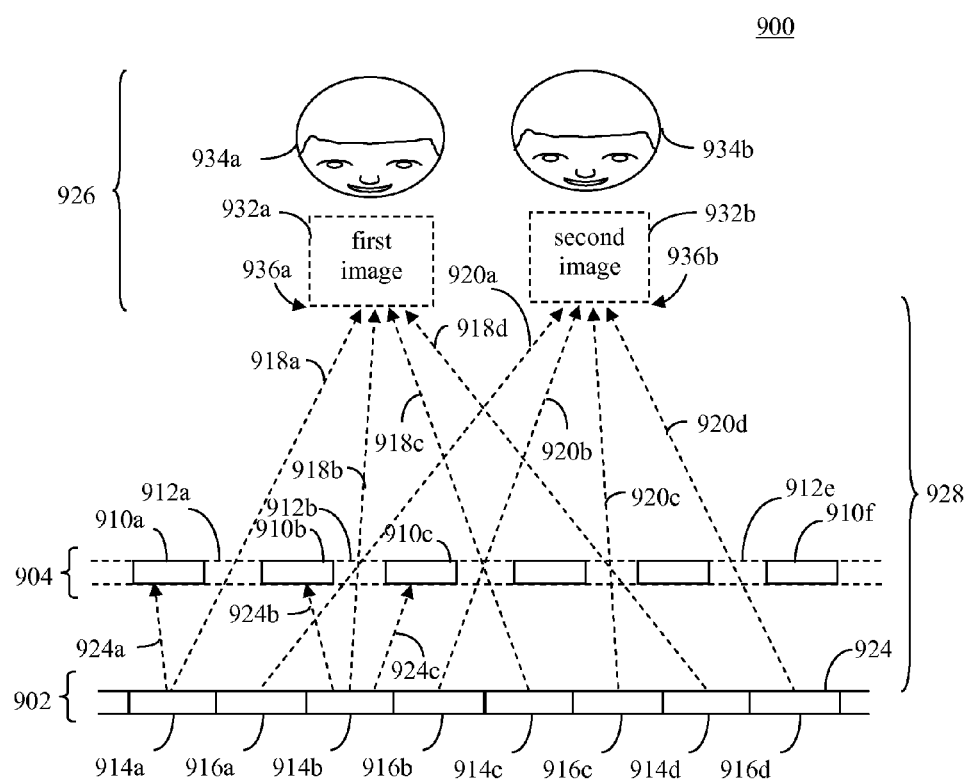
FIG. 9 shows a cross-sectional view of a display system configured to simultaneously deliver two different two-dimensional images to two different viewers, respectively, in accordance with an embodiment.

Display system 400 may be further configured to simultaneously generate multiple two-dimensional images or views for viewing by users in a viewing space. For example, FIG. 9 shows a display system 900 configured to simultaneously deliver two different two-dimensional images to two different viewers, respectively, in accordance with an embodiment. Display system 900 may comprise one implementation of display system 400 of FIG. 4. As shown in FIG. 9, display system 900 includes a pixel array 902 and a barrier element array 904. Pixel array 902 includes a plurality of pixels 914a-914d and 916a-916d. Pixels 914 alternate with pixels 916, such that pixels 914a-914d and 916a-916d are arranged in series in the order of pixels 914a, 916a, 914b, 916b, 914c, 916c, 914d, and 916d. Further pixels may be included in pixel array 902 that are not visible in FIG. 9, including further pixels along the width dimension of pixel array 902 (e.g., in the left-right directions) as well as pixels along a length dimension of pixel array 902 (not visible in FIG. 9). Each of pixels 914a-914d and 916a-916d emits light, which emanates from a display surface 924 of pixel array 902 (e.g., generally upward in FIG. 9) towards barrier element array 904. Some example indications of light emanating from pixels 914a-914d and 916a-916d are shown in FIG. 9 (as dotted lines), including light 924a and light 918a emanating from pixel 914a, light 924b, light 918b, and light 924c emanating from pixel 914b, etc.

Light emanating from pixel array 902 is filtered by barrier element array 904 to form a plurality of images in a viewing space 926, including a first image 932a at a first location 936a and a second image 932b at a second location 936b. A portion of the light emanating from pixel array 902 is blocked by blocking barrier elements 910, while another portion of the light emanating from pixel array 902 passes through non-blocking barrier elements 912, according to the filtering by barrier element array 904. For instance, light 924a from pixel 914a is blocked by blocking barrier element 910a, and light 924b and light 924c from pixel 914b are blocked by blocking barrier elements 910b and 910c, respectively. In contrast, light 918a from pixel 914a is passed by non-blocking barrier element 912a and light 918b from pixel 914b is passed by non-blocking barrier element 912b.

System 900 shown in FIG. 9 is configured to form first and second images 932a and 932b at locations 936a and 936b, respectively, which are positioned at a distance 928 from pixel array 902. As described above, pixel array 902 includes a first set of pixels 914a-914d and a second set of pixels 916a-916d. Pixels 914a-914d correspond to first image 932a and pixels 916a-916d correspond to second image 932b. Due to the spacing of pixels 914a-914d and 916a-916d in pixel array 902, and the geometry of non-blocking barrier elements 912 in barrier element array 904, first and second images 932a and 932b are formed at locations 936a and 936b, respectively. As shown in FIG. 9, light 918a-918d from the first set of pixels 914a-914d is focused at location 936a to form first image 9326a at location 936a. Light 920a-920d from the second set of pixels 916a-916d is focused at location 936b to form second image 932b at location 936b.

As shown in FIG. 9, a first viewer 934a receives first image 932a at first location 936a and a second viewer 934b receives second image 932b at second location 936b, according to an example embodiment. First and second images 932a and 932b may each comprise a different two-dimensional image that may be viewed independently from each other. For instance, first image 932a and second image 932b may be generated by display system 900 from first media content and second media content, respectively, that are independent of each other. First image 932a may be received by both eyes of first viewer 934a to be perceived by first viewer 934a as a first two-dimensional image, and second image 932b may be received by both eyes of second viewer 934b to be perceived by second viewer 934b as a second two-dimensional image. Thus, first and second images 932a and 932b may be generated to have a spacing that enables them to be separately viewed by first and second users 934a and 934b. Furthermore, first and second images 932a and 932b may be delivered to different viewer locations as determined by a configuration of display system 900, including a width and spacing of non-blocking slits in barrier element array 904 and by a spacing between pixel array 902 and barrier element array 904.

In accordance with the foregoing, display system 900 has a single viewing plane or surface (e.g., a plane or surface of pixel array 902, barrier element array 904, and/or display screen of display system 900) that supports multiple viewers with media content in the form of images or views. In the embodiment of FIG. 9, the single viewing plane of display system 900 may provide a first two-dimensional view based on first two-dimensional media content to first viewer 934a, and may provide a second two-dimensional view based on second two-dimensional media content to second viewer 934b. Barrier element array 904 causes the first media content to be presented to first viewer 934a via a first area of the single viewing plane, but not to second viewer 934b, while simultaneously causing the second media content to be presented to second viewer 934b via a second area of the single viewing plane, but not to first viewer 934a. Furthermore, the first area and second area of the single viewing plane that provide the first and second media content overlap each other at least in part, as barrier element array 904 enables both two-dimensional views to be provided from first set of pixels 914a-914d and second set of pixels 916a-916d, which are interleaved with each other. In accordance with certain configurations of display system 900, the first and second areas may be the same area and the area may encompass the entirety of the display screen or surface of display system 900 or only a region of the display screen or surface of display system 900.

Still further, the configuration of display system 900 in FIG. 9 may be used to deliver separate three-dimensional content to first and second viewers 934a and 934b. As such, display system 900 is capable of delivering multiple three-dimensional views to viewers. For example, in an embodiment, first and second viewers 934a and 934b may each wear a pair of 3D-enabled glasses, and the first and second media content associated with first and second images 932a and 932b, respectively, may be three-dimensional media content. In one embodiment, the 3D-enabled glasses may be color filtering glasses. The color filter lenses of the glasses worn by first viewer 934a may pass two-dimensional images (included in first image 932a) of differing perspective to the left and right eyes of first viewer 934a to be perceived by first viewer 934a as a first three dimensional image. Likewise, the color filter lenses of the glasses worn by second viewer 934b may pass two-dimensional images (included in second image 932b) of differing perspective to the left and right eyes of second viewer 934b to be perceived by second viewer 934b as a second three dimensional image. In another embodiment, the 3D-enabled glasses may be shutter lensed glasses. The shutter lenses of the glasses worn by first viewer 934a may be synchronized to pass two-dimensional images (included in first image 932a) of differing perspective to the left and right eyes of first viewer 934a to be perceived by first viewer 934a as a first three dimensional image. Likewise, the shutter lenses of the glasses worn by second viewer 934b may be synchronized to pass two-dimensional images (included in second image 932b) of differing perspective to the left and right eyes of second viewer 934b to be perceived by second viewer 932b as a second three dimensional image.

As such, display system 900 has a single viewing plane or surface (e.g., a plane or surface of pixel array 902 or barrier element array 904) that supports multiple viewers with media content in the form of three-dimensional images or views. The single viewing plane of display system 900 may provide a first three-dimensional view based on first three-dimensional media content to first viewer 934*a*, and may provide a second three-dimensional view based on second three-dimensional media content to second viewer 934*b*. Barrier element array 904 causes the first three-dimensional media content to be presented to first viewer 934*a* via a first area of the single viewing plane, but not to second viewer 934*b*, while simultaneously causing the second three-dimensional media content to be presented to second viewer 934*b* via a second area of the single viewing plane, but not to first viewer 934*a*. Furthermore, the first area and second area of the single viewing plane that provide the first and second media content overlap each other at least in part, as barrier element array 904 enables both three-dimensional views to be provided from first set of pixels 914*a*-914*d* and second set of pixels 916*a*-916*d*, which are interleaved with each other. In accordance with certain configurations of display system 900, the first and second areas may be the same area and the area may encompass the entirety of the display screen or surface of display system 900 or only a region of the display screen or surface of display system 900.

As such, display system 900 can be configured to deliver a single two-dimensional or three-dimensional view to a viewer, to deliver a pair of two-dimensional views to a pair of viewers, or to deliver a pair of three-dimensional views to a pair of viewers. Display system 900 can be configured to switch between delivering views to one and two viewers by turning off or turning on, respectively, the display of media content by pixel array 902 associated with one of the viewers (e.g., by turning off or on pixels 916 associated with second image 932*b*). Display system 900 can be configured to switch between delivering two-dimensional and three-dimensional views by providing the corresponding media content type at pixel array 902.

Display systems in accordance with further embodiments may include multiple layers of parallax barriers. Such display systems may enable multiple three-dimensional images to be displayed in a viewing space. The multiple parallax barrier layers may enable spatial separation of the images. For instance, in accordance with one embodiment, a display device that includes multiple parallax barrier layers may be configured to display a first three-dimensional image in a first region of a viewing space (e.g., a left-side area), a second three-dimensional image in a second region of the viewing space (e.g., a central area), a third three-dimensional image in a third region of the viewing space (e.g., a right-side area), etc. In fact, a display device that includes multiple parallax barrier layers may be configured to display any number of spatially separated three-dimensional images as desired for a particular application (e.g., according to a number and spacing of viewers in the viewing space, etc.).

Figure 10:
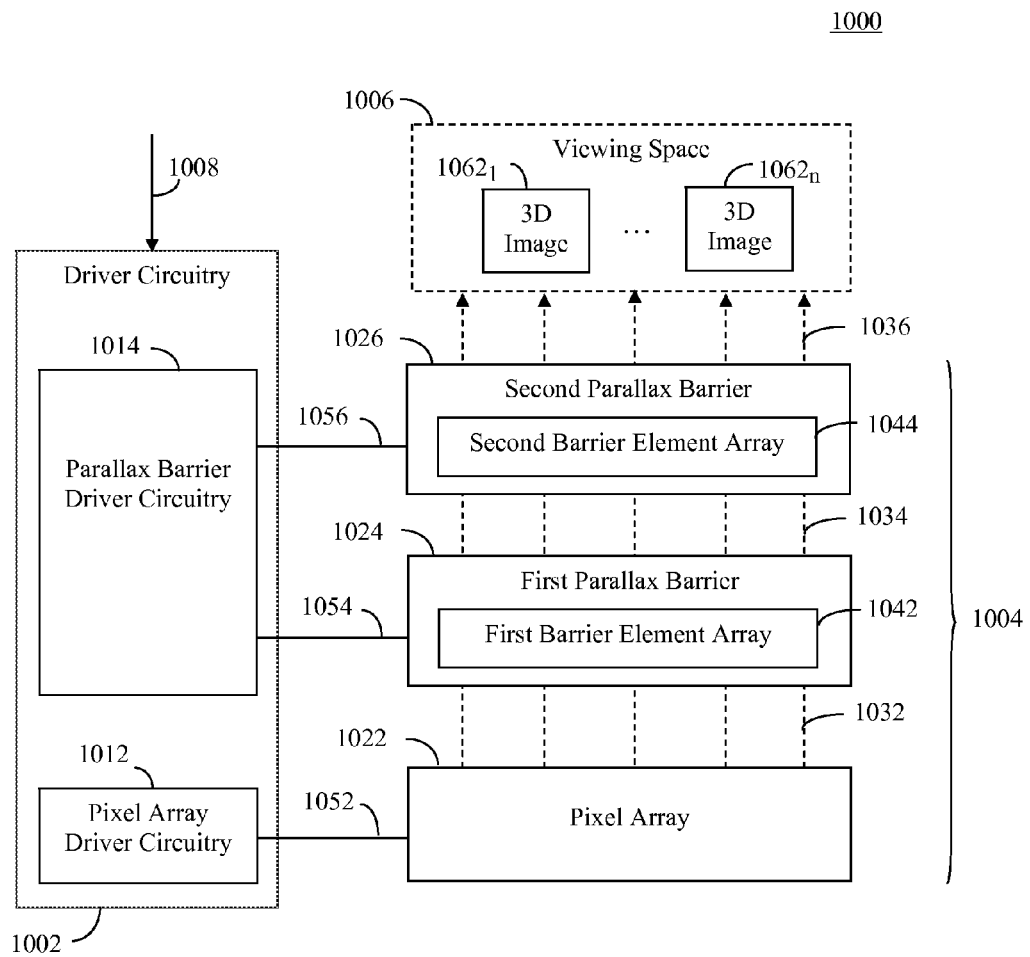
FIG. 10 is a block diagram of a display system that includes a screen assembly that utilizes multiple parallax barriers to support the simultaneous display of multiple simultaneous visual presentations in accordance with an embodiment.

FIG. 10 is a block diagram of a display system 1000 that includes multiple parallax barrier layers in accordance with an embodiment. As shown in FIG. 10, display system 1000 includes driver circuitry 1002 and a screen assembly 1004, wherein screen assembly 1004 includes a pixel array 1022, a first parallax barrier 1024 and a second parallax barrier 1026. As shown in FIG. 10, first parallax barrier 1024 includes a first barrier element array 1042 and second parallax barrier 1026 includes a second barrier element array 1044. Furthermore, as shown in FIG. 10, driver circuitry 1002 includes pixel array driver circuitry 1012 and parallax barrier driver circuitry 1014.

Light 1032 is received at first parallax barrier 1024 from pixel array 1022. Pixel array 1022 may comprise a self-illuminating or light-generating pixel array such that the pixels of pixel array 1022 each emit light included in light 1032. Alternatively, each pixel in pixel array 1022 may operate to selectively pass light emitted by a backlighting source (not shown in FIG. 10) to produce light 1032. Pixel array driver circuitry 1012 may generate drive signals 1052 based on a control signal 1008 received from control circuitry (not shown in FIG. 10) and pixel array 1022 may emit light 1032 in accordance with the received drive signals 1052. In an embodiment, pixel array driver circuitry 1012 may generate drive signals 1052 to cause pixel array 1022 to emit light 1032 containing a plurality of images corresponding to different sets of pixels.

First parallax barrier 1024 may be configured to filter light 1032 received from pixel array 1022. As shown in FIG. 10, first parallax barrier 1024 includes first barrier element array 1042 that filters light 1032 to generate filtered light 1034. First barrier element array 1042 may optionally be configurable to adjust the filtering performed by first parallax barrier 1024 in a similar manner to that described above in regard to adaptable parallax barrier 424 or in another manner. In an embodiment, parallax barrier driver circuitry 1014 may generate drive signals 1054 based on control signal 1008 received by driver circuitry 1002 to cause first barrier element array 1042 to filter light 1032 as desired.

Filtered light 1034 is received by second parallax barrier 1026 to generate filtered light 1036 that includes a plurality of three-dimensional images $1062_1$-$1062_n$ formed in a viewing space 1006. As shown in FIG. 10, second parallax barrier 1026 includes second barrier element array 1044 that filters filtered light 1034 to generate filtered light 1036. Second barrier element array 1044 may optionally be configurable to adjust the filtering performed by second parallax barrier 1026 in a similar manner to that described above in regard to adaptable parallax barrier 424 or in another manner. In an embodiment, light manipulator driver circuitry 1014 may generate drive signals 1056 based on control signal 1008 to cause barrier element array 1044 to filter filtered light 1034 to generate filtered light 1036 including three-dimensional images $1062_1$-$1062_n$ as desired.

As such, display system 1000 has a single viewing plane or surface (e.g., a plane or surface of pixel array 1022, first parallax barrier 1024, second parallax barrier 1026, or a display screen of display system 1000) that supports multiple viewers with media content in the form of three-dimensional images or views. The single viewing plane of display system 1000 may provide a first three-dimensional view based on first three-dimensional media content to a first viewer, a second three-dimensional view based on second three-dimensional media content to a second viewer, and optionally further three-dimensional views based on further three-dimensional media content to further viewers. First and second parallax barrier 1024 and 1026 cause each three-dimensional media content to be presented to a corresponding viewer via a corresponding area of the single viewing plane, with each viewer being enabled to view corresponding media content without viewing media content directed to other viewers. Furthermore, the areas of the single viewing plane that provide the various three-dimensional views of media content overlap each other at least in part. In the embodiment of FIG. 10, the areas may be the same area—an area of a display screen or surface of display system 1000. In accordance with certain configurations of display system 1000, the areas may be the same area and the area may encompass the entirety of the display screen or surface of display system 1000 or only a region of the display screen or surface of display system 1000.

Display system 1000 may be configured in various ways to generate multiple three-dimensional images in embodiments. Furthermore, as described below, embodiments of display system 1000 may be configured to generate two-dimensional views, as well as any combination of one or more two-dimensional views simultaneously with one or more three-dimensional views. Examples of such embodiments are provided in the following.

Figure 11:
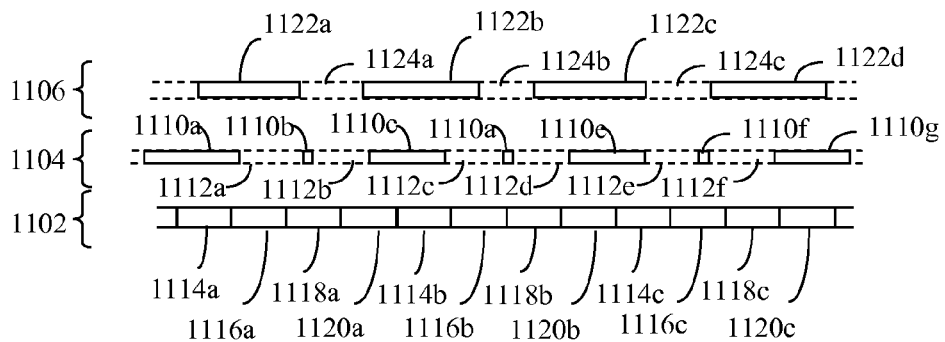
FIGS. 11 and 12 show cross-sectional views of a display system configured to simultaneously deliver two different three-dimensional images to two different viewers, respectively, in accordance with an embodiment.

FIG. 11 shows a cross-sectional view of a display system 1100, which is an example implementation of system 1000 shown in FIG. 10. As shown in FIG. 11, system 1100 includes a pixel array 1102, a first barrier element array 1104, and a second barrier element array 1106. System 1100 may also include display controller 1002 of FIG. 10, which is not shown in FIG. 11 for ease of illustration. System 1100 is described as follows.

As shown in the example of FIG. 11, pixel array 1102 includes a first set of pixels 1114a-1114c, a second set of pixels 1116a-1116c, a third set of pixels 1118a-1118c and a fourth set of pixels 1120a-1120c. Pixels of the four sets of pixels are alternated in pixel array 1102 in the order of pixel 1114a, pixel 1116a, pixel 1118a, pixel 1120a, pixel 1114b, pixel 1116b, etc. Further pixels may be included in each set of pixels in pixel array 1102 that are not visible in FIG. 11, including hundreds, thousands, or millions of pixels in each set of pixels.

Figure 12:
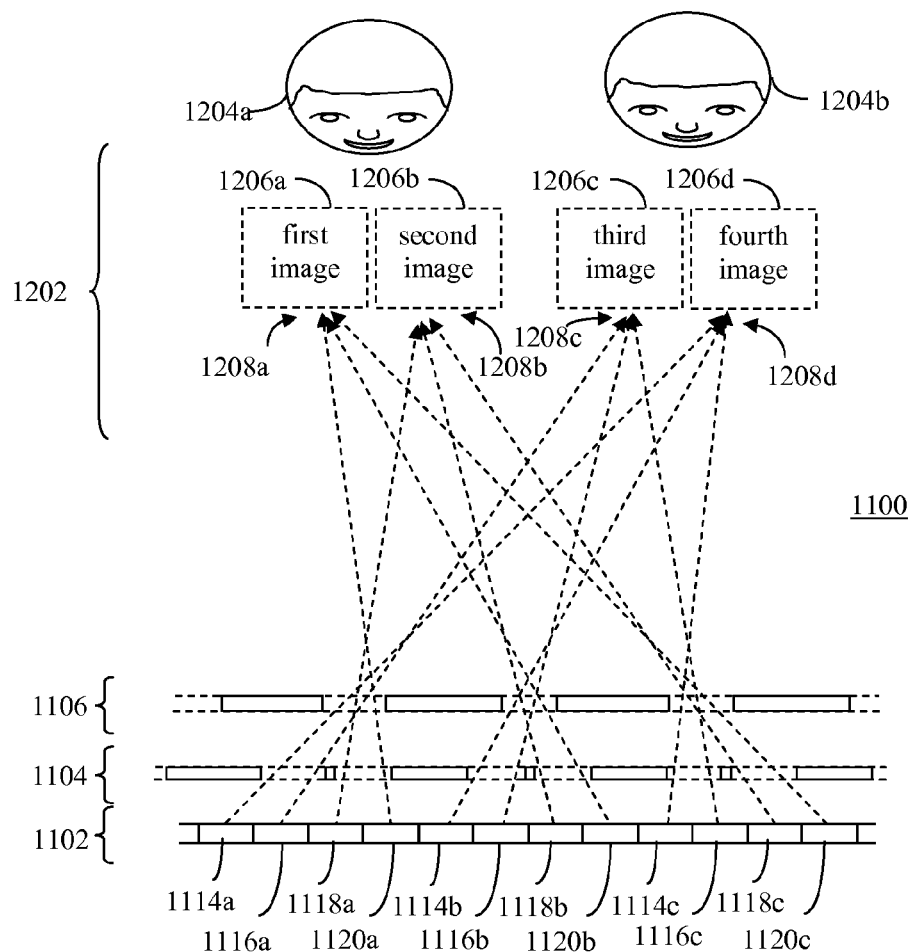

Each of pixels 1114a-1114c, 1116a-1116c, 1118a-1118c and 1120a-1120c is configured to emit light, which emanates from the surface of pixel array 1102 towards first barrier element array 1104. Each set of pixels is configured to generate a corresponding image. For example, FIG. 12 shows display system 1100, where pixels of pixel array 1102 emit light. Light from second set of pixels 1116a-1116c and first set of pixels 1114a-1114c is configured to generate third and fourth images 1206c and 1206d, respectively, which may be perceived together as a second three-dimensional image by a second viewer 1204b. Light from fourth set of pixels 1120a-1120c and third set of pixels 1118a-1118c is configured to generate first and second images 1206a and 1206b, respectively, which may be perceived together as a first three-dimensional image by a first viewer 1204a. The light emitted by the sets of pixels is filtered by first and second barrier element arrays 1104 and 1106 to generate the first and second three-dimensional images in respective desired regions of a viewing space 1202 adjacent to display system 1100.

For instance, in the example of FIG. 12, four images are formed in viewing space 1202, including first-fourth images 1206a-1206d. Pixels 1114a-1114c correspond to fourth image 1206d, pixels 1116a-1116c correspond to third image 1206c, pixels 1118a-1118c correspond to second image 1206b, and pixels 1120a-1120c correspond to first image 1206a. As shown in FIG. 12, light from the first set of pixels 1114a-1114c forms fourth image 1206d and light from the third set of pixels 1118a-1118c forms second image 1206b, due to the filtering of the non-blocking slits in first and second barrier element arrays 1104 and 1106. In a similar fashion, light from the second set of pixels 1116a-1116c forms third image 1206c and light from the fourth set of pixels 1120a-1120c forms first image 1206a.

In the embodiment of FIG. 12, first and second images 1206a and 1206b may be configured to be perceived by viewer 1204a as a first three-dimensional image, such that first image 1206a is received at a right eye location 1208a of viewer 1204a and second image 1206b is received at a left eye location 1208b of viewer 1204a (e.g., separated by an interocular distance). Furthermore, third and fourth images 1206c and 1206d may be configured to be perceived by viewer 1204b as a second three-dimensional image, such that third image 1206c is received at a right eye location 1208c of viewer 1204b and fourth image 1206d is received at a second eye location 1208d of viewer 1204b.

First-fourth images 1206a-1206d may be formed in viewing space 1202 at a distance from pixel array 1102 and at a lateral location of viewing space 1202 as determined by a configuration of display system 1100, including a width and spacing of non-blocking slits in first barrier element array 1104, by a width and positioning of non-blocking slits in second barrier element array 1106, by a spacing between pixel array 1102 and first barrier element array 1104, and a spacing between first and second barrier element arrays 1104 and 1106.

Furthermore, although shown in FIG. 12 as simultaneously delivering first and second three-dimensional views to viewers 1204a and 1204b, display system 1100 may deliver a two-dimensional view to one of viewers 1204a and 1204b, and may simultaneously deliver a three-dimensional view to the other of viewers 1204a and 1204b. For example, pixels 1114a-1114c and pixels 1116a-1116c may deliver the same images (e.g., may display the same media content), such that third and fourth images 1206c and 1206d are the same. As such, because second viewer 1204b receives the same view at each of right and left eye locations 1208c and 1208d, second viewer 1204b perceives third and fourth images 1206c and 1206d as a single two-dimensional view. In another embodiment, to provide a two-dimensional view to viewer 1204b, pixels 1114a-1114c may be turned off, and a width of slits 1112a, 1112c, and 1112e may be adjusted such that pixels 1116a-1116c deliver a same view to both right and left eye locations 1208c and 1208d of viewer 1204b (through slits 1124a-1124c). While second viewer 1204b is being delivered a two-dimensional view, first and second images 1206a and 1206b may be simultaneously delivered to first viewer 1204a as differing perspective images to be perceived as a three-dimensional view or as the same image to be perceived as a second two-dimensional view.

Still further, if it is desired for display system 1100 to deliver a single two-dimensional or three-dimensional view (e.g., one of viewers 1204a and 1204b is no longer participating), one or both of first barrier element array 1104 and second barrier element array 1106 may be "turned off." For instance, to deliver a two-dimensional view to a viewer 1204, first barrier element array 1104 and second barrier element array 1106 may each transition all of their corresponding barrier elements to the non-blocking state (be "turned off"), and pixel array 1102 may be configured to emit a single two-dimensional image. To deliver a three-dimensional view to a viewer 1204, one of first barrier element array 1104 and second barrier element array 1106 may transition all of its barrier elements to the non-blocking state, while the other of first barrier element array 1104 and second barrier element array 1106 may be configured to deliver a three-dimensional view.

Additional details concerning display systems that utilize adaptable light manipulators, such as adaptable parallax barriers, to support the simultaneous presentation of different two-dimensional and/or three-dimensional views to different viewers are provided in U.S. patent application Ser. No. 12/845,461, filed on Jul. 28, 2010, and entitled "Display Supporting Multiple Simultaneous 3D Views," the entirety of which is incorporated by reference herein.

As noted above, a configuration of adaptable parallax barrier 424 of display system 400 or a configuration of either of first and second parallax barrier 1024 and 1026 of display system 1000 can be dynamically modified to support a particular viewing configuration. To further support the viewing configuration, the pixel array of each system must also be controlled to support the same viewing configuration. This concept will now be further described with continued reference to display system 400 of FIG. 4, although persons skilled in the relevant art(s) will appreciate that the concept is equally applicable to display system 1000 of FIG. 10 and other display systems having adaptable light manipulators, such as adaptable parallax barriers.

When a configuration of adaptable parallax barrier 424 of display system 400 is modified to support a particular viewing configuration, pixel array 422 must also be controlled to support the same viewing configuration. In particular, the rendering of pixels of an image (also referred to herein as "image pixels") among the pixels of pixel array 422 (also referred to herein as "display pixels") must be handled in a manner that is consistent with a current configuration of adaptable parallax barrier 424. This may entail, for example, changing a number of display pixels that represents each image pixel (i.e., changing the resolution of a displayed image) and/or changing which display pixels or groups thereof correspond to the respective image pixels (i.e., changing the locations at which the image pixels are displayed), in response to modification of a configuration of adaptable parallax barrier 424. Such changes may be implemented by a controller (not shown in FIG. 4) via delivery of appropriate control signals 408 to pixel array driver circuitry 412.

For example, in one embodiment, when a configuration of adaptable parallax barrier 424 supports a first viewing configuration responsive to control signals 408, pixel array driver circuitry 412 sends drive signals 452 in conformance with control signals 408 such that the rendering of images to pixel array 422 occurs in a manner that also supports the first viewing configuration. Furthermore, when the configuration of adaptable parallax barrier 424 is modified to support a second viewing configuration responsive to control signals 408, pixel array driver circuitry 412 sends drive signals 452 in conformance with the control signals 408 such that the rendering of images to pixel array 422 occurs in a manner that also supports the second viewing configuration.

Figure 13:
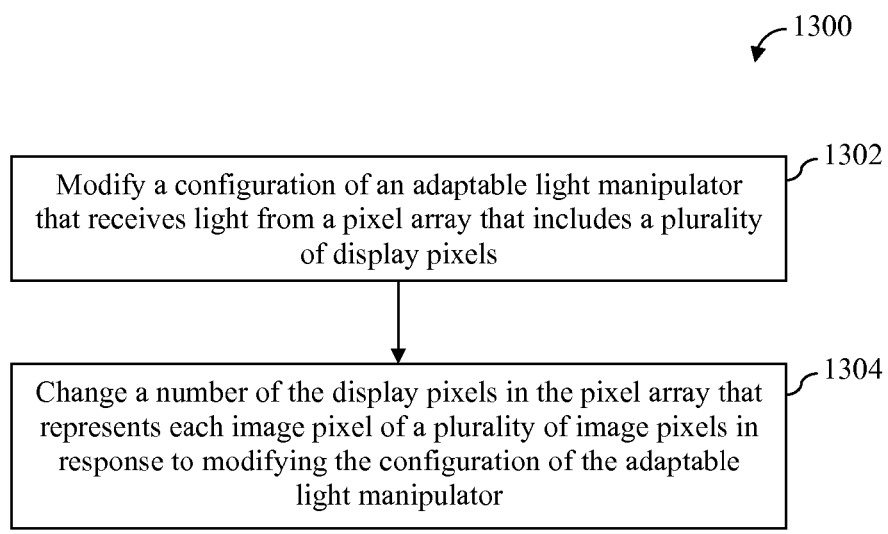
FIG. 13 depicts a flowchart of a method for controlling a pixel array to support a same viewing configuration as an adaptable light manipulator in accordance with an embodiment.

FIG. 13 depicts a flowchart 1300 of an example method for controlling a pixel array to support the same viewing configuration as an adaptable light manipulator (such as adaptable parallax barrier 424) in accordance with an embodiment. As shown in FIG. 13, the method of flowchart 1300 begins at step 1302. During step 1302, a configuration of an adaptable light manipulator, such as adaptable parallax barrier 424, is modified. At step 1304, a number of display pixels in a pixel array, such as pixel array 422, that represents each image pixel of a plurality of image pixels is changed in response to modifying the configuration of the adaptable light manipulator.

Figure 15:
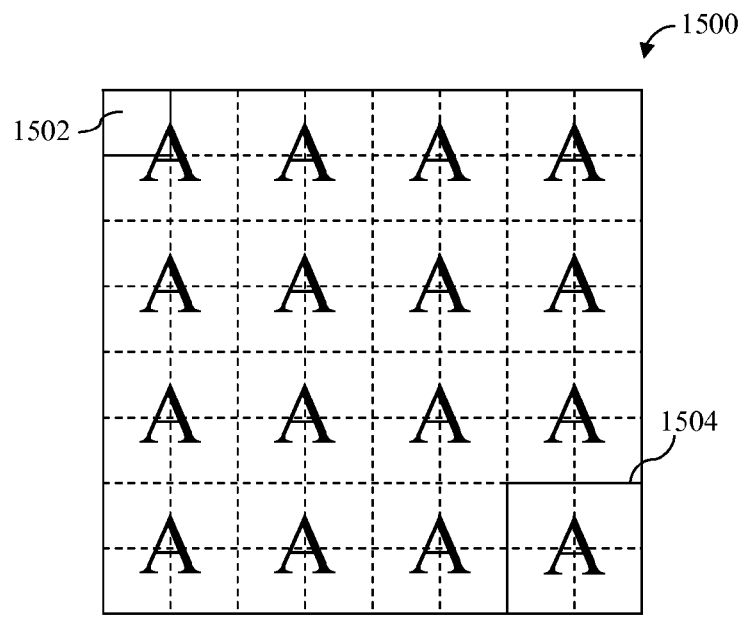
FIG. 15 illustrates a portion of a pixel array to which image pixels have been mapped to support a two-dimensional viewing configuration of an adaptable light manipulator in accordance with an embodiment.
Figure 16:
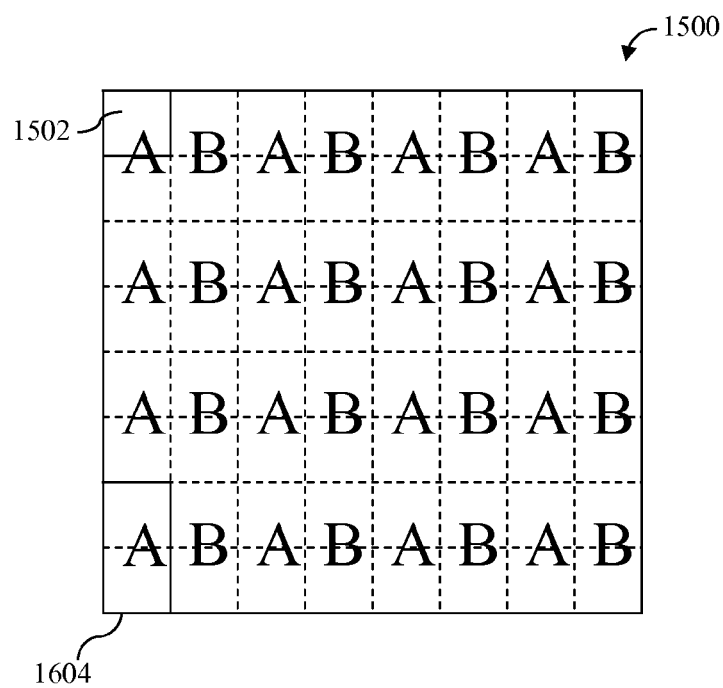
FIG. 16 illustrates how image pixels are mapped to the portion of the pixel array shown in FIG. 15 to support a first three-dimensional viewing configuration of an adaptable light manipulator in accordance with an embodiment.

FIGS. 15 and 16 provide a simple illustration of an application of the method of flowchart 13. As shown in FIG. 15, a portion of a pixel array 1500 includes a 16×16 array of display pixels. An example display pixel is shown as display pixel 1202. In one embodiment, each display pixel comprises a trio of red, green, and blue sub-pixels as discussed above. A first image comprising a 4×4 array of image pixels (each shown depicting the letter "A" to indicate that each is included in the same image) is mapped to the display pixels such that 4 display pixels are used to present each image pixel. An example of an image pixel is shown as image pixel 1504. In FIG. 15, the first image is intended to represent an image that is viewed when an adaptable light manipulator disposed proximate to the pixel array is configured to support a two-dimensional viewing configuration.

FIG. 16 is intended to represent the same portion of pixel array 1500 after the configuration of the adaptable light manipulator has been changed to support a three-dimensional viewing configuration. The three-dimensional viewing configuration requires the overlapping display of a first image and a second image across the same portion of pixel array 1500. This means that the first image must be represented with only half the display pixels. To achieve this, the pixel array is controlled such that 2 rather than 4 display pixels are used to present each image pixel of the first image (each still shown depicting the letter "A"). This corresponds to a decreased viewing resolution of the first image. The other half of the display pixels are now used to present each image pixel of a second image (each shown depicting the letter "B"). The image pixels associated with the different images are aligned with the adaptable light manipulator to achieve a desired three-dimensional viewing effect.

Figure 14:
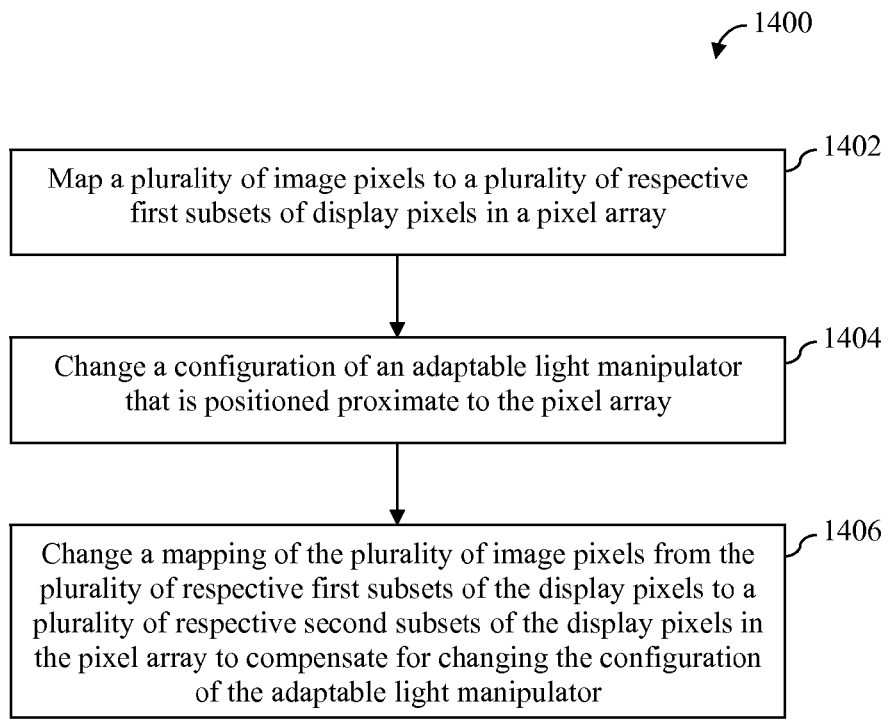
FIG. 14 depicts a flowchart of an alternate example method for controlling a pixel array to support a same viewing configuration as an adaptable light manipulator in accordance with an embodiment.

FIG. 14 depicts a flowchart 1400 of another example method for controlling a pixel array to support the same viewing configuration as an adaptable light manipulator (such as adaptable parallax barrier 424) in accordance with an embodiment. As shown in FIG. 14, the method of flowchart 1400 begins at step 1402. During step 1402, a plurality of image pixels is mapped to a plurality of respective first subsets of display pixels in a pixel array, such as pixel array 422. At step 1404, a configuration of an adaptable light manipulator that is positioned proximate to the pixel array is changed. For example, in an embodiment in which the adaptable light manipulator includes adaptable parallax barrier 424, a slit pattern, orientation, or the like, of adaptable parallax barrier 424 may be changed. At step 1406, a mapping of the plurality of image pixels is changed from the plurality of respective first subsets of the display pixels to a plurality of respective second subsets of the display pixels in the pixel array to compensate for changing the configuration of the adaptable light manipulator.

Figure 17:
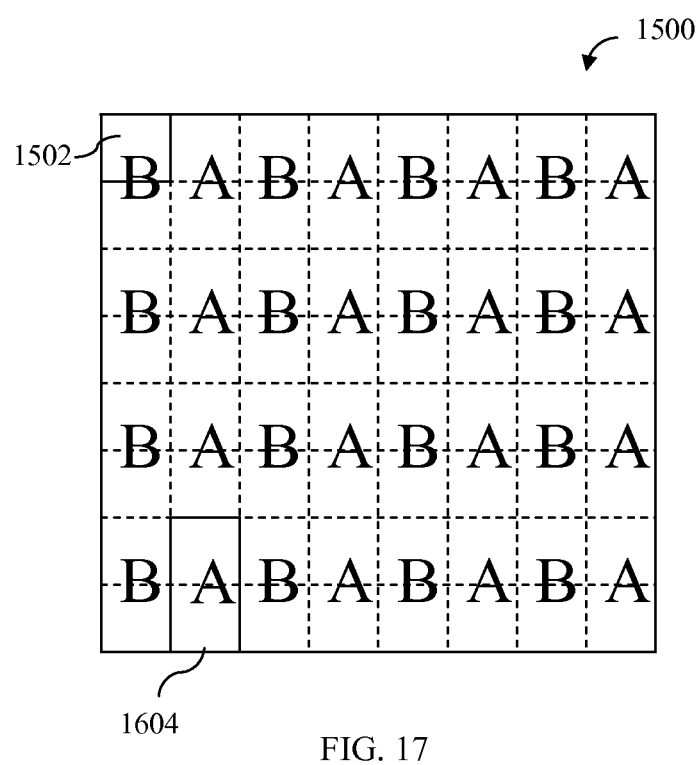
FIG. 17 illustrates how image pixels are mapped to the portion of the pixel array shown in FIGS. 15 and 16 to support a second three-dimensional viewing configuration of an adaptable light manipulator in accordance with an embodiment.

FIGS. 16 and 17 provide a simple illustration of an application of the method of flowchart 1400. As shown in FIG. 16, a portion of a pixel array 1500 is used to simultaneously display a first image comprising image pixels shown depicting the letter "A" and a second image comprising image pixels shown depicting the letter "B." As noted above, this display format is utilized to support a three-dimensional viewing configuration corresponding to a particular arrangement of an adaptable light manipulator disposed proximate to the pixel array. FIG. 17 is intended to represent the same portion of pixel array 1500 after the configuration of the adaptable light manipulator has been changed to support a modified three-dimensional viewing configuration (e.g., in response to a changed location of a viewer or some other factor). The modified three-dimensional viewing configuration requires the display location of the first image and the second image to be shifted, as shown in FIG. 17. Thus, for example, rather than rendering image pixel 1604 to the bottom-most two display pixels in the far-left column of array portion 1500, the same image pixel 1604 is now rendered to the bottom-most two display pixels in the second column from the left of array portion 1500.

Numerous other methods may be used to control the rendering of image pixels to display pixels in support of a desired two-dimensional and/or three-dimensional viewing configuration implemented by one or more adaptable parallax barriers or other adaptable light manipulator(s). Additional details concerning such control of a pixel array may be found in commonly-owned, co-pending U.S. patent application Ser. No. 12/774,225, filed on May 5, 2010 and entitled "Controlling a Pixel Array to Support an Adaptable Light Manipulator," the entirety of which is incorporated by reference herein."

Figure 18:
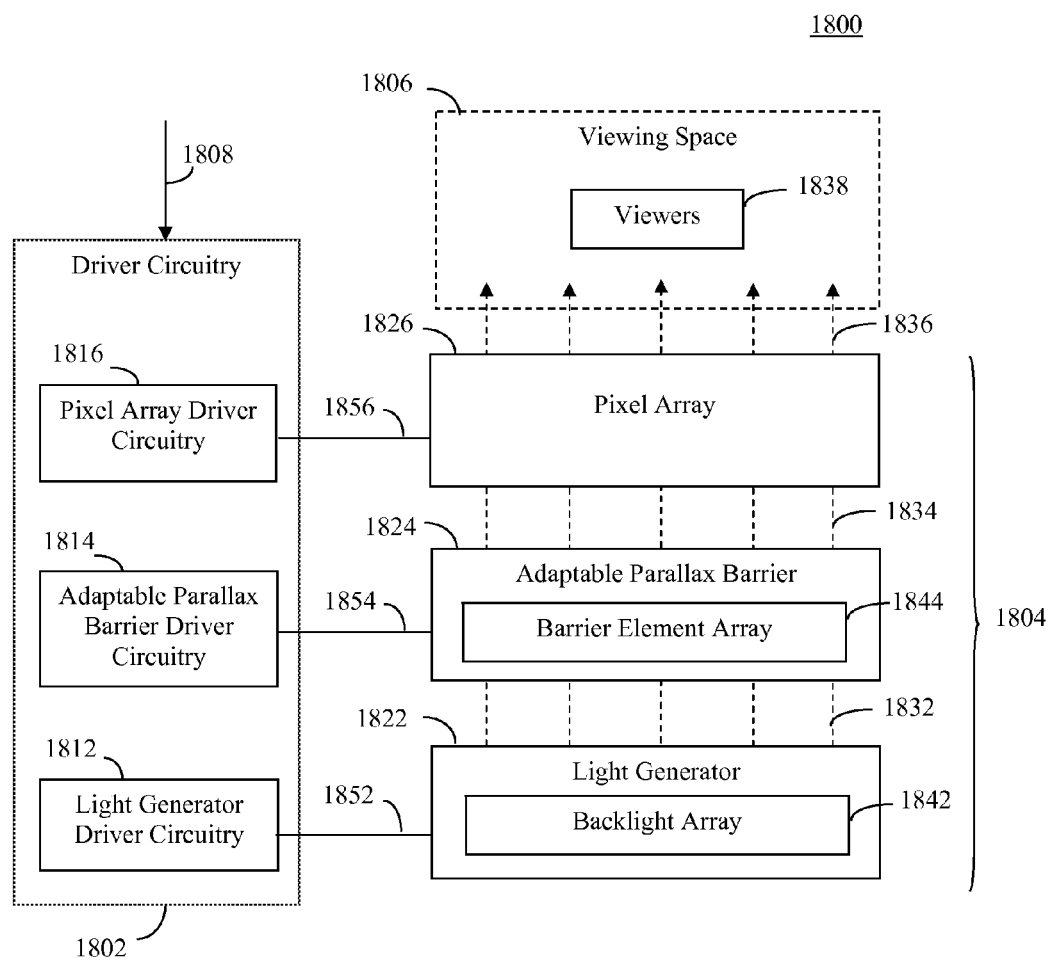
FIG. 18 is a block diagram of an example display system that utilizes an adaptable parallax barrier and a light generator to support multiple viewing configurations in accordance with an embodiment.

FIG. 18 shows a block diagram of yet another example display system 1800 that utilizes an adaptable parallax barrier to support multiple viewing configurations. As shown in FIG. 18, display system 1800 includes driver circuitry 1802 and a screen assembly 1804, wherein screen assembly 1804 include a light generator 1822, an adaptable parallax barrier 1824 and a pixel array 1826. As further shown in FIG. 18, driver circuitry 1802 includes light generator driver circuitry 1812, adaptable parallax barrier driver circuitry 1814 and pixel array driver circuitry 1816.

Light generator 1822 emits light 1832. Adaptable parallax barrier 1824 is positioned proximate to light generator 1822. Barrier element array 1844 is a layer of adaptable parallax barrier 1824 that includes a plurality of barrier elements or blocking regions arranged in an array. Each barrier element of the array is configured to be selectively opaque or transparent. Barrier element array 1844 filters light 1832 received from light generator 1822 to generate filtered light 1834. Filtered light 1834 is configured to enable a two-dimensional image, a three-dimensional image, or a pair of two-dimensional or three-dimensional images to be formed based on images subsequently imposed on filtered light 1834 by pixel array 1826.

Pixel array 1826 includes a two-dimensional array of pixels (e.g., arranged in a grid or other distribution) like pixel array 422 of FIG. 4. Pixel array 1826 is not self-illuminating and operates as a light filter that imposes images (e.g., in the form of color, grayscale, etc.) on filtered light 1834 from adaptable parallax barrier 1824 to generate filtered light 1836 to include one or more images. Each pixel of pixel array 1826 may be a separately addressable filter (e.g., a pixel of a plasma display, an LCD display, an LED display, or of other type of display). Each pixel of pixel array 1826 may be individually controllable to vary the color imposed on the corresponding light passing through, and/or to vary the intensity of the passed light in filtered light 1836. In an embodiment, each pixel of pixel array 1826 may include a plurality of sub-pixels that correspond to separate color channels, such as a trio of red, green, and blue sub-pixels included in each pixel.

Driver circuitry 1802 receives control signals 1808 from control circuitry (not shown in FIG. 18). Control signals 1808 cause driver circuitry 1802 to place screen 1804 in a selected one of a plurality of different viewing configurations. In particular, based on control signals 1808, adaptable parallax barrier driver circuitry 1814 transmits drive signals 1854 that cause barrier element array 1844 to be placed in a state that supports the selected viewing configuration. Likewise, based on control signals 1808, pixel array driver circuitry 1816 transmits drive signals 1856 to cause pixels of one or more images (also referred to herein as "image pixels") to be rendered among the pixels of pixel array 1826 (also referred to herein as "display pixels") in a manner that is consistent with a current configuration of adaptable parallax barrier 1824. The selected viewing configuration may be a particular two-dimensional viewing configuration, a particular three-dimensional viewing configuration, or a viewing configuration that supports the simultaneous display of different types of two-dimensional and/or three-dimensional content.

As discussed in commonly-owned, co-pending U.S. patent application Ser. No. 12/982,020, filed on even date herewith and entitled "Backlighting Array Supporting Adaptable Parallax Barrier," the entirety of which is incorporated by reference herein, conventional LCD displays typically include a backlight and a display panel that includes an array of LCD pixels. The backlight is designed to produce a sheet of light of uniform luminosity for illuminating the LCD pixels. When simultaneously displaying two-dimensional, three-dimensional and multi-view three-dimensional regions using an adaptable parallax barrier such as that described in the aforementioned, incorporated U.S. patent application Ser. No. 12/845,440, the use of a conventional backlight will result in a disparity in perceived brightness between the different simultaneously-displayed regions. This is because the number of visible pixels per unit area associated with a two-dimensional region will generally exceed the number of visible pixels per unit area associated with a particular three-dimensional or multi-view three-dimensional region (in which the pixels must be partitioned among different eyes/views).

To address this issue, light generator 1822 includes a backlight array 1842 which is a two-dimensional array of light sources. Such light sources may be arranged, for example, in a rectangular grid. Each light source in backlight array 1842 is individually addressable and controllable to select an amount of light emitted thereby. A single light source may comprise one or more light-emitting elements depending upon the implementation. In one embodiment, each light source in backlight array 1842 comprises a single light-emitting diode (LED) although this example is not intended to be limiting.

The amount of light emitted by the individual light sources that make up backlight array 1842 can selectively controlled by drive signals 1852 generated by light generator driver circuitry 1812 so that the brightness associated with each of a plurality of display regions of screen 1804 can also be controlled. This enables display system 1800 to provide a desired brightness level for each display region automatically and/or in response to user input. For example, backlight array 1842 can be controlled such that a uniform level of brightness is achieved across different simultaneously-displayed display regions, even though the number of perceptible pixels per unit area varies from display region to display region. As another example, backlight array 1842 can be controlled such that the level of brightness associated with a particular display region is increased or reduced without impacting (or without substantially impacting) the brightness of other simultaneously-displayed display regions.

To help illustrate this, FIG. 19 provides an exploded view of a display system 1900 that implements a controllable backlight array as described immediately above. Display system 1900 comprises one implementation of display system 1800. As shown in FIG. 19, display system 1900 includes a light generator 1902 that includes a backlight array 1912, an adaptable parallax barrier 1904 that includes a barrier element array 1922 and a display panel 1906 that includes a pixel array 1932. These elements may be aligned with and positioned proximate to each other to create an integrated screen assembly.

In accordance with the example configuration shown in FIG. 19, a first portion 1934 of pixel array 1932 and a first portion 1924 of barrier element array 1922 have been manipulated to create a first display region that displays multi-view three-dimensional content, a second portion 1936 of pixel array 1932 and a second portion 1926 of barrier element array 1922 have been manipulated to create a second display region that displays a three-dimensional image, and a third portion of 1938 of pixel array 1932 and a third portion 1928 of barrier element array 1922 have been manipulated to create a third display region that displays a two-dimensional image. To independently control the brightness of each of the first, second and third display regions, the amount of light emitted by light sources included within a first portion 1914, a second portion 1916 and a third portion 1918 of backlight array 1912 can respectively be controlled. For example, the light sources within first portion 1914 may be controlled to provide greater luminosity than the light sources within second portion 1916 and third portion 1918 as the number of perceivable pixels per unit area will be smallest in the first display region with which first portion 1914 is aligned. In further accordance with this example, the light sources within second portion 1916 may be controlled to provide greater luminosity than the light sources within third portion 1918 since the number of perceivable pixels per unit area will be smaller in the second display region with which second portion 1916 is aligned than the third display region with which third portion 1918 is aligned. Of course, if uniform luminosity is not desired across the various display regions then other control schemes may be used.

Of course, the arrangement shown in FIG. 19 provides only a single teaching example. It should be noted that a display system in accordance with an embodiment can dynamically manipulate pixel array 1932 and barrier element array 1922 in a coordinated fashion to dynamically and simultaneously create any number of display regions of different sizes and in different locations, wherein each of the created display regions can display one of two-dimensional, three-dimensional or multi-view three-dimensional content. To accommodate this, backlight array 1912 can also be dynamically manipulated in a coordinated fashion with pixel array 1932 and barrier element array 1922 to ensure that each display region is perceived at a desired level of brightness.

In the arrangement shown in FIG. 19, there is a one-to-one correspondence between each light source in backlight array 1912 and every display pixel in pixel array 1932. However, this need not be the case to achieve regional brightness control. For example, in certain embodiments, the number of light sources provided in backlight array 1912 is less than the number of pixels provided in pixel array 1932. For instance, in one embodiment, a single light source may be provided in backlight array 1912 for every N pixels provided in pixel array 1932, wherein N is an integer greater than 1. In an embodiment in which the number of light sources in backlight array 1912 is less than the number of pixels in pixel array 1932, each light source may be arranged so that it provides backlighting for a particular group of pixels in pixel array 1932, although this is only an example. In alternate embodiments, the number of light sources provided in backlight array 1912 is greater than the number of pixels provided in pixel array 1932.

Also, in the examples described above, light sources in backlight array 1912 are described as being individually controllable. However, in alternate embodiments, light sources in backlight array 1912 may only be controllable in groups. This may facilitate a reduction in the complexity of the control infrastructure associated with backlight array 1912. In still further embodiments, light sources in backlight array 1912 may be controllable both individually and in groups.

It is also noted that although FIGS. 18 and 19 show display system configurations in which a barrier element array of an adaptable parallax barrier is disposed between a backlight array of individually addressable and controllable light sources and a pixel array, in alternate implementations the pixel array may be disposed between the backlight array and the barrier element array. Such an alternate implementation is shown in FIG. 20. In particular, FIG. 20 is a block diagram of a display system 2000 that includes a pixel array 2024 disposed between a light generator 2022 that includes a backlight array 2042 and an adaptable parallax barrier 2026 that includes a barrier element array 2044 to support the generation of two-dimensional and/or three-dimensional images perceivable in a viewing space 2006. In such alternate implementations, selective control of the luminosity of groups or individual ones of the light sources in backlight array 2042 may also be used to vary the backlighting luminosity associated with different display regions created by the interaction of backlight array 2042, pixel array 2024 and barrier element array 2044.

Other example display system implementations that utilize a backlight array of independently-controllable light sources are described in the aforementioned, incorporated U.S. patent application Ser. No. 12/982,020, filed on even date herewith and entitled "Backlighting Array Supporting Adaptable Parallax Barrier." That application also describes other approaches for controlling the brightness of different simultaneously-displayed display regions of a display system. Some of these approaches will be described below.

For example, to achieve independent region-by-region brightness control in a display system that includes a conventional backlight panel designed to produce a sheet of light of uniform luminosity, the amount of light passed by the individual pixels that make up a pixel array can be selectively controlled so that the brightness associated with each of a plurality of display regions can also be controlled. To help illustrate this, FIG. 21 provides an exploded view of a display system 2100 that implements a regional brightness control scheme based on pixel intensity as described immediately above. As shown in FIG. 21, display system 2100 includes a display panel 2102 and an adaptable parallax barrier 2104. Display system 2100 also includes a backlight panel, although this element is not shown in FIG. 21. These elements may be aligned with and positioned proximate to each other to create an integrated display screen.

As further shown in FIG. 21, display panel 2102 includes a pixel array 2112. Each of the pixels in a first portion 2114 of pixel array 2112 is individually controlled by pixel array driver circuitry to pass a selected amount of light produced by a backlight panel (not shown in FIG. 21), thereby producing display-generated light representative of a single two-dimensional image. Each of the pixels in a second portion 2116 of pixel array 2112 is individually controlled by the pixel array driver circuitry to pass a selected amount of light produced by the backlight panel, thereby producing display-generated light representative of two two-dimensional images that, when combined by the brain of a viewer positioned in an appropriate location relative to display system 2100, will be perceived as a single three-dimensional image.

Adaptable parallax barrier 2104 includes barrier element array 2122 that includes a first portion 2124 and a second portion 2126. Barrier element array 2122 is aligned with pixel array 2114 such that first portion 2124 of blocking region array 2122 overlays first portion 2114 of pixel array 2112 and second portion 2126 of blocking region array 2122 overlays second portion 2116 of pixel array 2112. Adaptable parallax barrier driver circuitry causes all the barrier elements within first portion 2124 of barrier element array 2122 to be transparent. Thus, the two-dimensional image generated by the pixels of first portion 2114 of pixel array 2112 will simply be passed through to a viewer in a viewing space in front of display system 2100. Furthermore, the adaptable parallax barrier driver circuitry manipulates the barrier elements within second portion 2126 of blocking region array 2122 to form a plurality of parallel transparent strips alternated with parallel opaque strips, thereby creating a parallax effect that enables the two two-dimensional images generated by the pixels of second portion 2116 of pixel array 2112 to be perceived as a three-dimensional image by a viewer in the viewing space in front of display system 2100.

Assume that a viewer is positioned such that he/she can perceive both the two-dimensional image passed by first portion 2124 of barrier element array 2122 and the three-dimensional image formed through parallax by second portion 2126 of barrier element 2122. As discussed above, the pixels per unit area perceived by this viewer with respect to the two-dimensional image will be greater than the pixels per unit area perceived by this viewer with respect to the three-dimensional image. Thus, the two-dimensional image will appear brighter to the viewer than the three dimensional image when backlighting of constant luminosity is provided behind pixel array 2112.

To address this issue, drive signals may be transmitted to display panel 2102 that selectively cause the pixels included in first portion 2114 of pixel array 2112 to pass less light from the backlight panel (i.e., become less intense), thereby reducing the brightness of the two-dimensional image produced from the pixels in first portion 2114 of pixel array 2112. Alternatively or additionally, drive signals may be transmitted to display panel 2102 that selectively cause the pixels included in second portion 2116 of pixel array 2112 to pass more light from the backlight panel (i.e., become more intense), thereby increasing the brightness of the three-dimensional image produced from the pixels in second portion 2116 of pixel array 2112. By controlling the intensity of the pixels in portions 2114 and 2116 of pixel array 2112 in this manner, the brightness of the two-dimensional image produced from the pixels in first portion 2114 of pixel array 2112 and the brightness of the three-dimensional image produced from the pixels in second portion 2116 of pixel array 2112 can be kept consistent. Additionally, by providing independent control over the intensity of the pixels in portions 2114 and 2116 of pixel array 2112, independent control over the brightness of the two-dimensional and three-dimensional images generated therefrom can also be achieved.

Of course, the arrangement shown in FIG. 21 provides only a single teaching example. It should be noted that a display system in accordance with an embodiment can dynamically manipulate pixel array 2112 and blocking element array 2122 in a coordinated fashion to dynamically and simultaneously create any number of display regions of different sizes and in different locations, wherein each of the created display regions can display one of two-dimensional, three-dimensional or multi-view three-dimensional content. To accommodate this, the intensity of the pixels in pixel array 2112 can also be dynamically manipulated in a coordinated fashion to ensure that each display region is perceived at a desired level of brightness.

In one embodiment, a regional brightness control scheme combines the use of a backlight array of independently-controllable light sources as previously described with regional pixel intensity control. The advantages of such a control scheme will now be described with reference to FIG. 22. FIG. 22 illustrates a front perspective view of a display panel 2200. Display panel 2200 includes a pixel array 2202 that includes a first portion 2204 and a second portion 2206, wherein each of first portion 2204 and second portion 2206 includes a different subset of the pixels in pixel array 2202. It is to be assumed that first portion 2204 of pixel array 2202 is illuminated by backlighting provided by an aligned first portion of a backlight array (not shown in FIG. 22), wherein the backlight array is similar to backlight array 1842 described above in reference to FIG. 18. Second portion 2206 of pixel array 2202 is illuminated by backlighting provided by an aligned second portion of the backlight array. In one example the amount of light emitted by each light source in the second portion of the backlight array to illuminate second portion 2206 of pixel array 2202 is controlled such that it is greater than the amount of light emitted by each light source in the first portion of the backlight array to illuminate first portion 2204 of pixel array 2202. This control scheme may be applied, for example, to cause a three-dimensional image formed by interaction between the pixels in second portion 2206 of pixel array 2202 and an adaptable parallax barrier to appear to have a uniform brightness level with respect to a two-dimensional image formed by interaction between the pixels in first portion 2204 of pixel array 2202 and the adaptable parallax barrier.

However, the difference in the amount of light emitted by each light source in the first and second portions of the backlight array to illuminate corresponding first and second portions 2204 and 2206 of pixel array 2202 may also give rise to undesired visual artifacts. In particular, the difference may cause pixels in boundary areas immediately outside of second portion 2206 of pixel array 2202 to appear brighter than desired in relation to other pixels in first portion 2204 of pixel array 2202. For example, as shown in FIG. 22, the pixels in boundary area 2212 immediately outside of second portion 2206 of pixel array 2202 may appear brighter than desired in relation to other pixels in first portion 2204 of pixel array 2202. This may be due to the fact that the increased luminosity provided by the light sources in the second portion of the backlight array has "spilled over" to impact the pixels in boundary area 2212, causing those pixels to be brighter than desired. Conversely, the difference may cause pixels in boundary areas immediately inside of second portion 2206 of pixel array 2202 to appear dimmer than desired in relation to other pixels in second portion 2206 of pixel array 2202. For example, as shown in FIG. 22, the pixels in boundary area 2214 immediately inside of second portion 2206 of pixel array 2202 may appear dimmer than desired in relation to other pixels in second portion 2206 of pixel array 2202. This may be due to the fact that the reduced luminosity of the light sources in the first portion of the backlight array has "spilled over" to impact the pixels in boundary area 2214, causing those pixels to be dimmer than desired.

To address this issue, an embodiment may selectively control the amount of light passed by the pixels located in boundary region 2212 and/or boundary region 2214 to compensate for the undesired visual effects. For example, driver circuitry associated with pixel array 2202 may selectively cause the pixels included in boundary area 2212 of pixel array 2202 to pass less light from the backlight panel (i.e., become less intense), thereby reducing the brightness of the pixels in boundary area 2212, thus compensating for an undesired increase in brightness due to "spill over" from light sources in the second portion of the backlight array. Alternatively or additionally, driver circuitry associated with pixel array 2202 may selectively cause the pixels included in boundary area 2214 of pixel array 2202 to pass more light from the backlight panel (i.e., become more intense), thereby increasing the brightness of the pixels in boundary area 2214, thus compensating for an undesired reduction in brightness due to "spill over" from light sources in the first portion of the backlight array. By controlling the intensity of the pixels in boundary areas 2212 and/or 2214 in this manner, the undesired visual effects described above that can arise from the use of a backlight array to provide regional brightness control can be mitigated or avoided entirely.

The illustration provided in FIG. 22 provides only one example of undesired visual effects that can arise from the use of a backlight array to provide regional brightness control. Persons skilled in the relevant art(s) will appreciate that many different display regions having many different brightness characteristics can be simultaneously generated by a display system in accordance with embodiments, thereby giving rise to different undesired visual effects relating to the brightness of boundary areas inside and outside of the different display regions. In each case, the intensity of pixels located in such boundaries areas can be selectively increased or reduced to mitigate or avoid such undesired visual effects.

In additional embodiments, a regional brightness control scheme is implemented in a display system that does not include a backlight panel at all, but instead utilizes a display panel comprising an array of organic light emitting diodes (OLEDs) or polymer light emitting diodes (PLEDs) which function as display pixels and also provide their own illumination. Display system 400 described above in reference to FIG. 4 may be representative of such a system, provided that pixel array 422 comprises an array of OLEDs or PLEDs. In accordance with such an implementation, the amount of light emitted by the individual OLED/PLED pixels that make up the OLED/PLED pixel array can be selectively controlled so that the brightness associated with each of a plurality of display regions of display system 400 can also be controlled. This enables display system 400 to provide a desired brightness level for each display region automatically and/or in response to user input. For example, the OLED/PLED pixel array can be controlled such that a uniform level of brightness is achieved across different simultaneously-displayed display regions, even though the number of perceptible pixels per unit area varies from display region to display region. As another example, the OLED/PLED pixel array can be controlled such that the level of brightness associated with a particular display region is increased or reduced without impacting (or without substantially impacting) the brightness of other simultaneously-displayed display regions.

Where OLED/PLED pixel regions such as those described above are adjacent to each other, it is possible that the brightness characteristics of one pixel region can impact the perceived brightness of an adjacent pixel region having different brightness characteristics, creating an undesired visual effect. For example, a first OLED/PLED pixel region having a relatively high level of brightness to support the viewing of multi-view three-dimensional content may be adjacent to a second OLED/PLED pixel region having a relatively low level of brightness to support the viewing of two-dimensional content. In this scenario, light from pixels in a perimeter area of the first OLED/PLED pixel region that are close to the boundary between the two pixel regions may "spill over" into a perimeter area of the second OLED/PLED pixel region. This may cause pixels in the perimeter area of the second OLED/PLED pixel region to appear brighter than desired in relation to other pixels in the second OLED/PLED pixel region. Conversely, pixels in the perimeter area of the first OLED/PLED pixel array may appear dimmer than desired in relation to other pixels in the first OLED/PLED pixel region because of the adjacency to the second OLED/PLED pixel region. To address this issue, it is possible to selectively increase or reduce the brightness of one or more OLED/PLED pixels in either perimeter area to reduce the "spill over" effect arising from the different brightness characteristics between the regions.

In still further embodiments, a regional brightness control scheme is implemented in a display system that includes an adaptable parallax barrier that also supports brightness regulation via an "overlay" approach. Such an approach involves the use of a brightness regulation overlay that is either independent of or integrated with an adaptable parallax barrier. The brightness regulation overlay is used to help achieve the aforementioned goals of maintaining standard brightness across various regional screen configurations and compensating for or minimizing backlighting dispersion.

The brightness regulation overlay comprises an element that allows regional dimming through various tones of "grey" pixels. In one example embodiment, an adaptable parallax barrier and the brightness regulation overlay are implemented as a non-color (i.e., black, white and grayscale) LCD sandwich, although other implementations may be used. The combined adaptable parallax barrier and brightness regulation overlay provide full transparent or opaque states for each pixel, as well as a grayscale alternative that can be used to "balance out" brightness variations caused by the parallax barrier its elf.

Control over the individual barrier elements of the parallax barrier and the individual grayscale pixels of the brightness regulation overlay may be provided by using coordinated driver circuitry signaling. Such coordinate signaling may cause the pixels of the adaptable parallax barrier and the brightness regulation overlay (collectively referred to below as the manipulator pixels) to create opaque and transparent barrier elements associated with a particular parallax barrier configuration and a grayscale support there between to allow creation of overlays.

FIG. 23 illustrates two exemplary configurations of an adaptable light manipulator 2300 that includes an adaptable parallax barrier and a brightness regulation overlay implemented as a light manipulating LCD sandwich with manipulator grayscale pixels. In FIG. 23, the grayscale pixels map to the display pixels on a one-to-one basis, but that need not be the case.

A first exemplary configuration of adaptable light manipulator 2300 is shown above the section line denoted with reference numeral 2302. In accordance with the first exemplary configuration, a three-dimensional region 2304 is created with fully transparent or fully opaque manipulator pixels that provide parallax barrier functionality and a two-dimensional region 2306 is created having continuous medium gray manipulator pixels. The medium gray manipulator pixels operate to reduce the perceived brightness of two-dimensional region 2306 to better match that of three-dimensional region 2304. It is noted that in other example configurations, two-dimensional region 2306 could instead comprise a three-dimensional region having a number of views that is different than three-dimensional region 2304, thus also requiring brightness regulation.

In the first exemplary configuration, no boundary region compensation is performed. In the second exemplary configuration, which is shown below section line 2302, boundary region compensation is performed. For example, a boundary region 2310 within two-dimensional region 2306 may be "lightened" to a light gray to compensate for any diminution of light that might occur near the boundary with three-dimensional region 2304. In contrast, the grayscale level of an inner portion 2308 of two-dimensional region 2306 is maintained at the same medium gray level as in the portion of two-dimensional region 2306 above section line 2302. As a further example, a first boundary region 2312 and a second boundary region 2314 within three-dimensional region 2304 comprise darker and lighter gray transitional areas, respectively, to account for light dispersion from two-dimensional region 2306. In contrast, an inner portion 2316 of three-dimensional region 2304 includes only fully transparent or fully opaque manipulator pixels consistent with a parallax barrier configuration and no brightness regulation.

In one embodiment, the configuration of adaptable light manipulator 2300 is achieved by first creating a white through various grayscale areas that correspond to the regions and boundary areas to be formed. Once established, the manipulator pixels in these areas that comprise the opaque portions of the parallax barrier are overwritten to turn them black. Of course this two-stage approach is conceptual only and no "overwriting" need be performed.

In certain embodiments, adaptable light manipulator 2300 comprises the only component used in a display system for performing brightness regulation and/or boundary region compensation. In alternate embodiments, the display system further utilizes any one or more of the following aforementioned techniques for performing brightness regulation and/or boundary region compensation: a backlight array with independently-controllable light sources, and/or a pixel array and associated control logic for selectively increasing or decreasing the intensity of display pixels (e.g., either LCD pixels or OLED/PLED pixels). Note that in certain embodiments (such as the one described above in reference to FIG. 23), adaptable light manipulator 2300 is implemented as an integrated adaptable parallax barrier and brightness regulation overlay. However, in alternate embodiments, adaptable light manipulator 2300 is implemented using an adaptable parallax barrier panel and an independent brightness regulation overlay panel.

It is noted that any of the non-uniform light generation schemes described above may also be used in conjunction with a display system that includes multiple parallax barriers, such as display system 1000 of FIG. 10, to support simultaneous presentation of regional two-dimensional, three-dimensional and multi-view three dimensional views. Furthermore, each region supported by such non-uniform light generation may comprise a region that simultaneously presents multiple different two-dimensional and/or three-dimensional views to multiple respective viewers.

B. Example Screen Assemblies Including Adaptable Lenticular Lenses

In display systems in accordance with further embodiments, rather than using an adaptable parallax barrier to perform light manipulation in support of multiple viewing configurations, an adaptable lenticular lens may be used. For example, with respect to example display system 400 of FIG. 4, adaptable parallax barrier 424 may be replaced with an adaptable lenticular lens. Likewise, with respect to example display system 1000 of FIG. 10, either of first parallax barrier 1024 or second parallax barrier 1026 may be replaced with a lenticular lens, such as an adaptable lenticular lens.

FIG. 24 shows a perspective view of an adaptable lenticular lens 2400 in accordance with an embodiment. As shown in FIG. 24, adaptable lenticular lens 2400 includes a sub-lens array 2402. Sub-lens array 2402 includes a plurality of sub-lenses 2404 arranged in a two-dimensional array (e.g., arranged side-by-side in a row). Each sub-lens 2404 is shown in FIG. 24 as generally cylindrical in shape and having a substantially semi-circular cross-section, but in other embodiments may have other shapes. In FIG. 24, sub-lens array 2402 is shown to include eight sub-lenses for illustrative purposes and is not intended to be limiting. For instance, sub-lens array 2402 may include any number (e.g., hundreds, thousands, etc.) of sub-lenses 2404. FIG. 25 shows a side view of adaptable lenticular lens 2400. In FIG. 25, light may be passed through adaptable lenticular lens 2400 in the direction of dotted arrow 2502 to be diverted. Adaptable lenticular lens 2400 is adaptable in that it can be modified to manipulate light in different ways in order to accommodate different viewing configurations. For example, in one embodiment, adaptable lenticular lens is made from an elastic material and can be stretched or shrunk in one or more directions in response to generated drive signals.

Further description regarding the use of an adaptable lenticular lens to deliver three-dimensional views is provided in commonly-owned, co-pending U.S. patent application Ser. No. 12/774,307, titled "Display with Elastic Light Manipulator," which is incorporated by reference herein in its entirety.

C. Example Display System with Adaptable Screen Assembly

FIG. 26 is a block diagram of an example implementation of a display system 2600 that includes an adaptable screen assembly that supports the simultaneous display of multiple visual presentations in accordance with an embodiment. As shown in FIG. 26, display system 2600 generally comprises control circuitry 2602, driver circuitry 2604 and an adaptable screen assembly 2606.

As shown in FIG. 26, control circuitry 2602 includes a processing unit 2614, which may comprise one or more general-purpose or special-purpose processors or one or more processing cores. Processing unit 2614 is connected to a communication infrastructure 2612, such as a communication bus. Control circuitry 2602 may also include a primary or main memory (not shown in FIG. 26), such as random access memory (RAM), that is connected to communication infrastructure 2612. The main memory may have control logic stored thereon for execution by processing unit 2614 as well as data stored thereon that may be input to or output by processing unit 2614 during execution of such control logic.

Control circuitry 2602 may also include one or more secondary storage devices (not shown in FIG. 26) that are connected to communication infrastructure 2612, including but not limited to a hard disk drive, a removable storage drive (such as an optical disk drive, a floppy disk drive, a magnetic tape drive, or the like), or an interface for communicating with a removable storage unit such as an interface for communicating with a memory card, memory stick or the like. Each of these secondary storage devices provide an additional means for storing control logic for execution by processing unit 2614 as well as data that may be input to or output by processing unit 2614 during execution of such control logic.

Control circuitry 2602 further includes a remote control interface 2618 that is connected to communication infrastructure 2612. Remote control interface 2618 is configured to receive remote control signals from one or more of a plurality of remote control devices. Processing unit 2614 or other processing circuitry within control circuitry 2602 may be configured to interpret such remote control signals and to perform certain operations based on the interpreted remote control signals. As will be discussed herein, such actions may include, for example, modifying a particular visual presentation being displayed by adaptable screen assembly 2606 or obtaining media content for presentation via a particular view supported by adaptable screen assembly 2606. In one embodiment, remote control signals received by remote control interface 2618 from each of a plurality of remote control devices are interpreted in accordance with a common remote control application programming interface (API). Control circuitry 2602 may include other interfaces other than remote control interface 2618 for receiving input from user.

Control circuitry 2602 also includes a viewer tracking unit 2616. Viewer tracking unit 2616 is intended to generally represent any type of functionality for determining or estimating a location of one or more viewers of display system 2600 relative to adaptable screen assembly 2606, a head orientation of one or more viewers of display system 2600 and/or a point of gaze of one or more viewers of display system 2600. Viewer tracking unit 2616 may perform such functions using different types of sensors (e.g., cameras, motion sensors, microphones or the like) or by using tracking systems such as those that wirelessly track an object (e.g., headset, remote control, or the like) currently being held or worn by a viewer.

Media interface 2620 is intended to represent any type of interface that is capable of receiving media content such as video content or image content. In certain implementations, media interface 2620 may comprise an interface for receiving media content from a remote source such as a broadcast media server, an on-demand media server, or the like. In such implementations, media interface 2620 may comprise, for example and without limitation, a wired or wireless internet or intranet connection, a satellite interface, a fiber interface, a coaxial cable interface, or a fiber-coaxial cable interface. Media interface 2620 may also comprise an interface for receiving media content from a local source such as a DVD or Blu-Ray disc player, a personal computer, a personal media player, smart phone, or the like. Media interface 2620 may be capable of retrieving video content from multiple sources.

Control circuitry 2602 further includes a communication interface 2622. Communication interface 2622 enables control circuitry 2602 to send control signals via a communication medium 2652 to another communication interface 2630 within driver circuitry 2604, thereby enabling control circuitry 2602 to control the operation of driver circuitry 2604. Communication medium 2652 may comprise any kind of wired or wireless communication medium suitable for transmitting such control signals.

As shown in FIG. 26, driver circuitry 2604 includes the aforementioned communication interface 2630 as well as pixel array driver circuitry 2632 and adaptable light manipulator(s) driver circuitry 2634. Driver circuitry also optionally includes light generator driver circuitry 2636. Each of these driver circuitry elements is configured to receive control signals from control circuitry 2602 (via the link between communication interface 2622 and communication interface 2630) and, responsive thereto, to send selected drive signals to a corresponding hardware element within adaptable screen assembly 2606, the drive signals causing the corresponding hardware element to operate in a particular manner. In particular, pixel array driver circuitry 2632 is configured to send selected drive signals to a pixel array 2642 within adaptable screen assembly 2606, adaptable light manipulator(s) driver circuitry 2634 is configured to send selected drive signals to one or more adaptable light manipulators 2644 within adaptable screen assembly 2606, and optional light generator driver circuitry 2636 is configured to send selected drive signals to an optional light generator 2646 within adaptable screen assembly 2606.

In one example mode of operation, processing unit 2614 operates pursuant to control logic to receive media content via media interface 2620 and to generate control signals necessary to cause driver circuitry 2604 to render such media content to screen 2606 in accordance with a selected viewing configuration. For example, processing unit 2614 may operate pursuant to control logic to receive first and second media content via media interface 2620 and present the first and media content via first and second simultaneously-displayed views of adaptable screen assembly 2606 to corresponding first and second viewers, wherein at least the first view is observable by the first viewer but not the second viewer. The control logic that is executed by processing unit 2614 may be retrieved, for example, from a primary memory or a secondary storage device connected to processing unit 2614 via communication infrastructure 2612 as discussed above. The control logic may also be retrieved from some other local or remote source. Where the control logic is stored on a computer readable medium, that computer readable medium may be referred to herein as a computer program product.

Among other features, driver circuitry 2604 may be controlled to send coordinated drive signals necessary for simultaneously displaying two-dimensional images, three-dimensional images and multi-view three-dimensional content via adaptable screen assembly 2606. A manner by which pixel array 2642, adaptable light manipulator 2644 (e.g., an adaptable parallax barrier), and light generator 2646 may be manipulated in a coordinated fashion to perform this function is described in commonly-owned, co-pending U.S. patent application Ser. No. 12/982,031, filed on even date herewith and entitled "Coordinated Driving of Adaptable Light Manipulator, Backlighting and Pixel Array in Support of Adaptable 2D and 3D Displays," the entirety of which is incorporated by reference herein. Note that in accordance with certain implementations (e.g., implementations in which pixel array comprises a OLED/PLED pixel array), adaptable screen assembly 2606 need not include light generator 2646.

In one embodiment, at least part of the function of generating control signals necessary to cause pixel array 2642, adaptable light manipulator 2644 and light generator 2646 to render media content to screen 2606 in accordance with a selected viewing configuration is performed by drive signal processing circuitry 2638 which is integrated within driver circuitry 2604. Such circuitry may operate, for example, in conjunction with and/or under the control of processing unit 2614 to generate the necessary control signals.

In certain implementations, control circuitry 2602, driver circuitry 2604 and adaptable screen assembly 2606 are all included within a single housing. For example and without limitation, all these elements may exist within a television, a laptop computer, a tablet computer, or a telephone. In accordance with such an implementation, the link 2650 formed between communication interfaces 2622 and 2630 may be replaced by a direction connection between driver circuitry 2604 and communication infrastructure 2612. In an alternate implementation, control circuitry 2602 is disposed within a first housing, such as set top box or personal computer, and driver circuitry 2604 and adaptable screen assembly 2606 are disposed within a second housing, such as a television or computer monitor. The set top box may be any type of set top box including but not limited to fiber, Internet, cable, satellite, or terrestrial digital.

III. Example Remote Control Devices and Display Systems including Same

Remote control devices that can be used to independently modify multiple visual presentations that are simultaneously displayed by a screen assembly will now be described, as well as display systems that include such remote control devices and methods of operating the same. For example, FIG. 27 depicts an exemplary display system 2700 that includes such remote control devices.

In particular, as shown in FIG. 27, display system 2700 includes a screen assembly 2704 having screen interface circuitry 2702 communicatively connected thereto, a first remote control device 2722 and a second remote control device 2724. Screen assembly 2704 is intended to represent a screen assembly that is configurable to simultaneously present multiple different two-dimensional or three-dimensional views to multiple different viewers, respectively. For example, screen assembly 2704 may represent adaptable screen assembly 2706 described above in reference to FIG. 26. In this regard, screen assembly 2704 may include a pixel array and one or more adaptable light manipulators that manipulate light passed to or from the pixel array to facilitate the presentation of different two-dimensional or three-dimensional views to different viewers. Particular examples of such simultaneously delivery of different views was discussed above in reference to FIGS. 9 and 12. In further accordance with such an embodiment, screen assembly 2704 may also include a non-uniform light generation element to support the simultaneous delivery of different types of views via different screen regions.

Screen interface circuitry 2702 comprises circuitry configured to perform operations necessary to obtain media content, such as video content and image content, from one or more local and/or remote sources and to cause such media content to be presented to a viewer or viewers via screen assembly 2704. Screen interface circuitry 2702 includes a remote control interface 2732 that is configured to receive first remote control signals 2726 from first remote control device 2722 and second remote control signals 2728 from second remote control device 2724. Screen interface circuitry 2702 is configured to interpret such remote control signals and to perform certain operations based on the interpreted remote control signals. As will be discussed herein, such actions may include, for example and without limitation, modifying a particular two-dimensional or three-dimensional view being displayed by screen assembly 2704, obtaining particular media content for presentation via a particular view supported by screen assembly 2704, and controlling the manner in which such obtained media content is delivered to screen assembly 2704. In one embodiment, remote control signals received by remote control interface 2732 from first remote control device 2722 and second remote control device 2724 are interpreted in accordance with a common remote control application programming interface (API).

Screen interface circuitry 2702 may be disposed in a housing that also houses screen assembly 2704 or may be disposed in a different housing that is connected thereto. Furthermore, elements of screen interface circuitry 2702 may be distributed among multiple interconnected housings. In one embodiment, screen interface circuitry 2702 comprises control circuitry 2702 and driver circuitry 2704 of FIG. 27, which may be disposed in a single housing or distributed among different housings as described above in reference to that figure. In a further embodiment, screen interface circuitry 2702 may also comprise set-top box circuitry such as that described in commonly-owned, co-pending U.S. patent application Ser. No. 12/982,062, filed on even date herewith and entitled "Set-top Box Circuitry Supporting 2D and 3D Content Reductions to Accommodate Viewing Environment Constraints," the entirety of which is incorporated by reference herein.

As shown in FIG. 27, screen assembly 2704 is operating to simultaneously present a first view 2712 to a first viewer 2716 and a second view 2714 to a second viewer 2718, wherein each view comprises a presentation of different media content. Such views may also be referred to herein as "visual presentations." In accordance with the teachings provided above in Section II, each of first view 2712 and second view 2714 may comprise a two-dimensional view. Alternatively, each of first view 2712 and second view 2714 may comprise a three-dimensional view. Still further, first view 2712 may comprise a two-dimensional view and second view 2714 may comprise a three-dimensional view or first view 2712 may comprise a three-dimensional view and second view 2714 may comprise a two-dimensional view. A three-dimensional view may comprise a single three-dimensional view (comprising two different perspective views of the same subject matter) or multiple different three-dimensional views (comprising some multiple of two different perspective views of the same subject matter), wherein the three-dimensional view that is currently being perceived by a viewer will depend on the location of the viewer relative to screen assembly 2704. It is to be understood that screen assembly 2704 may be configurable to present more than two views to more than two viewers, respectively.

In further accordance with the teachings provided above in Section II, due to the configuration of one or more adaptable light manipulators included within screen assembly 2704, first view 2712 may be observable only by first viewer 2716 and second view 2714 may be observable only by second viewer 2718.

As will be described herein, first remote control device 2722 may advantageously be used by first viewer 2716 to independently control first view 2712. For example, first remote control device 2722 may be used by first viewer 2716 to make modifications to first view 2712 that will not also be made to second view 2714, even though both views emanate from the same screen assembly. Such modifications may include but are not limited to a modification of any of the following aspects of first view 2712: a size, shape or screen location of first view 2712, a resolution of the pixels observable via first view 2712, a colorization of the pixels observable via first view 2712, a contrast associated with the pixels observable via first view 2712, a brightness associated with the pixels observable via first view 2712, a number of perspective views provided via the pixels observable via first view 2712 and a three-dimensional intensity associated with images displayed via the observable pixels of first view 2712. First remote control device 2722 may also be used by first viewer 2716 to select the media content that is to be presented via first view 2712 or to modify the manner in which such media content is presented via first view 2712.

In a like manner, second remote control device 2724 may advantageously be used by second viewer 2718 to independently control second view 2714. For example, second remote control device 2724 may be used by second viewer 2718 to make modifications to second view 2714 that will not also be made to first view 2712, even though both views emanate from the same screen assembly. Such modifications may include any of those listed in the preceding paragraph with respect to first view 2712. Second remote control device 2724 may also be used by second viewer 2718 to select the media content that is to be presented via second view 2714 or to modify the manner in which such media content is presented via second view 2714.

In an embodiment, first view 2712 is supported by a first set of pixels of a pixel array within screen assembly 2704 and second view 2714 is supported by a second set of pixels within the same pixel array. The first and second sets of pixels may generally occupy the same area of the pixel array but be arranged in an overlapping or interleaved fashion. Alternatively, the first and second set of pixels may occupy entirely different areas of the pixel array. Still further, the first and second sets of pixels may be only partly overlapping.

FIG. 28 depicts first view 2712 and second view 2714 in accordance with a different configuration of screen assembly 2704. As shown in FIG. 28, first view 2712 and second view 2714 each include a shared view 2802, which comprises a visual presentation of the same media content. In accordance with one embodiment, shared view 2802 may be presented to each of first viewer 2716 and second viewer 2718 by "turning off" certain light manipulator elements of screen assembly 2704 associated with a corresponding portion of a pixel array of screen assembly 2704 used to present such a view. Alternatively, shared view 2802 may be presented to each of first viewer 2716 and second viewer 2718 by using one or more light manipulators of screen assembly 2704 to deliver identical versions of the same media content to both viewers.

In accordance with the latter approach, first viewer 2716 may utilize remote control device 2722 to apply modifications to his or her version of shared view 2802 that will not be applied to the version of shared view 2802 received by second viewer 2718 (e.g., modifications to size, shape, screen location, resolution, colorization, contrast, brightness, number of perspective views and three-dimensional intensity as discussed above). In further accordance with the latter approach, first viewer 2716 may utilize remote control device 2722 to modify the manner in which the media content that supports shared view 2802 is delivered to his or her version of shared view 2802 (e.g., to pause, rewind, fast forward or perform other operations with respect to the delivery of such media content to his or her version of shared view 2804). Likewise, second viewer 2718 may utilize remote control device 2724 to apply modifications to his or her version of shared view 2802 that will not be applied to the version of shared view 2802 received by first viewer 2716 or to modify the manner in which the media content that supports shared view 2802 is delivered to his or version of shared view 2802.

As further shown in FIG. 28, first view 2712 includes a third view 2810 that is observable by first viewer 2716 but not by second viewer 2718. In an embodiment, third view 2810 is presented to first viewer 2716 but not to second viewer 2718 by using one or more adaptable light manipulators of screen assembly 2704 to deliver certain pixels in a region of a pixel array corresponding to third view 2810 to first viewer 2716 but not to second viewer 2718 and to deliver certain other pixels in the region of the pixel array corresponding to third view 2810 to second viewer 2718 but not to first viewer 2716.

Third view 2810 comprises a presentation of media content that is different than the media content used to support shared view 2802. For example, third view 2810 may comprise a "picture-in-picture" display of such other media content. For example, in accordance with one configuration, shared view 2802 comprises a visual presentation of first video content while third view 2810 comprises a picture-in-picture visual presentation of second video content. However, this is only an example, and third view 2810 may comprise a visual presentation of other types of media content as well.

In accordance with the configuration shown in FIG. 28, first viewer 2716 can use first remote control 2722 to apply modifications to third view 2810, select media content for presentation via third view 2810 and control the manner of delivery of such media content to third view 2810. Since second viewer 2718 cannot see third view 2810, the results of such operations will not be observable by second viewer 2718.

As also shown in FIG. 28, second view 2714 includes a fourth view 2804, a fifth view 2806 and a sixth view 2808 that are observable to second viewer 2718 but not to first viewer 2716. In an embodiment, these views are presented to second viewer 2718 but not to first viewer 2716 by using one or more adaptable light manipulators of screen assembly 2704 to deliver certain pixels in regions of a pixel array corresponding to these views to second viewer 2718 but not to first viewer 2716 and to deliver certain other pixels in the regions of the pixel array corresponding to these views to first viewer 2718 but not to second viewer 2716.

Each of fourth view 2804, fifth view 2806 and sixth view 2808 comprises a presentation of media content that is different than the media content used to support shared view 2802. For example, in one embodiment, each of fourth view 2804, fifth view 2806 and sixth view 2808 may comprise a visual presentation of a different interactive graphical element or "widget" that appears overlaid upon shared view 2802. However, this is only an example, and each of these views may comprise visual presentations of other types of media content as well.

In accordance with the configuration shown in FIG. 28, second viewer 2718 can use second remote control 2724 to apply modifications to any of fourth view 2804, fifth view 2806 and sixth view 2808, select media content for presentation via fourth view 2804, fifth view 2806 and sixth view 2808, and control the manner of delivery of such media content to fourth view 2804, fifth view 2806 and sixth view 2808. In an embodiment in which any of fourth view 2804, fifth view 2806 and sixth view 2808 delivers interactive media content, second viewer 2718 can use second remote control 2724 to interact with such media content. Since first viewer 2716 cannot see fourth view 2804, fifth view 2806 or sixth view 2808, the results of such operations will not be observable by first viewer 2716.

Various additional techniques by which an adaptable screen assembly may be used to support independent viewer modification of a shared view such as shared view 2802 shown in FIG. 28 are described in commonly-owned, co-pending U.S. patent application Ser. No. 12/982,362, filed on even date herewith and entitled "Independent Viewer Tailoring of Same Media Source Content via a Common 2D-3D Display," the entirety of which is incorporated by reference herein.

FIG. 29 is a block diagram of an example remote control device 2900 that can be used to independently control one of multiple visual presentations simultaneously displayed by a screen assembly in accordance with an embodiment. Remote control device 2900 may represent, for example, either of remote control device 2722 or remote control device 2724 described above in reference to FIGS. 27 and 28. As shown in FIG. 29, remote control device includes at least a user interface 2902, processing circuitry 2904, and a transmitter 2906.

The elements of remote control device 2900 may be disposed within a single housing. For example, the elements of remote control device 2900 may be disposed within a single housing designed for portability and/or handheld operation. In an alternate embodiment, the elements of remote control device 2900 are distributed among multiple housings (e.g., an embodiment in which remote control device 2900 is implemented using a personal computer comprising a number of input/output devices, a case that houses processing circuitry, and a display).

Remote control device 2900 may be designed for exclusive use with a particular display system or screen assembly, such as with display system 2700 or screen assembly 2704. Alternatively, remote control device 2900 may be designed for providing control functionality across a variety of display systems, screen assemblies, media sources, or the like. Furthermore, the elements of remote control device 2900 may also comprise part of a device or system that is capable of performing functions in addition to controlling elements of a display system. Such devices or systems may include, for example and without limitation, a phone, a game controller or console, a personal media player, a personal digital assistant (PDA), a tablet computer, an electronic book reader, a tablet computer, a laptop computer, a desktop computer, or the like. For example, in an embodiment in which remote control device 2900 comprises a phone, phone circuitry (i.e., circuitry configured to perform telephony operations) may be disposed within a same housing as remote control circuitry (i.e., circuitry configured to perform any of the remote control operations described herein).

User interface 2902 comprises one or more elements that enable a viewer to provide input to remote control 2900 and, in some implementations, receive output therefrom. User interface 2902 may comprise any number of user interface elements that allow a user to provide input including, but not limited to, buttons, keys, a keypad, a scroll pad, a thumb wheel, a pointing device, a roller ball, a stick pointer, a joystick, a thumb pad, a touch sensitive display, a voice recognition system, a haptic interface and/or the like. In an embodiment in which remote control device 2900 comprises part of a personal computer, user interface 2902 may further comprise a keyboard, mouse, or other conventional input device typically used with a personal computer. User interface 2902 may also comprise any number of user interface elements that present output to a user including but not limited to one or more displays, speakers, or the like.

Processing circuitry 2904 is configured to receive user input provided via user interface 2902 and to selectively perform certain functions in response to same. Such functions include generating remote control signals for transmission to screen interface circuitry connected to a screen assembly, such as screen interface circuitry 2702 connected to screen assembly 2704. The signals so generated by processing circuitry 2904 are suitable to cause the screen interface circuitry to perform various operations with respect to the screen assembly, such as but not limited to controlling one or more visual presentations of the screen assembly, obtaining or selecting media content for delivery to one or more viewers via a visual presentation of the screen assembly, or controlling the manner in which media content is delivered via a visual presentation. Various exemplary operations that may be performed by screen interface circuitry responsive to the receipt of such remote control signals will be described below.

In one embodiment, processing circuitry 2904 is configured to generate remote control signals in accordance with a remote control API supported by the screen interface circuitry, thereby ensuring that the screen interface circuitry will be able to properly interpret such remote control signals. For example, the remote control API may specify a list of command codes that can be used to execute control operations with respect to a display system, screen assembly, and/or media source. In accordance with such an embodiment, the remote control signals generated by processing circuitry 2904 will represent one or more such command codes.

Transmitter 2906 comprises circuitry that is configured to transmit the remote control signals generated by processing circuitry 2904 to screen interface circuitry connected to a screen assembly, such as screen interface circuitry 2702 connected to screen assembly 2704. Transmitter 2906 may be configured to transmit such remote control signals in a wireless or wired fashion. For example, with respect to wireless transmission, transmitter 2906 may be configured to transmit line-of-sight infrared (IR) signals or radio frequency (RF) signals to the screen interface circuitry. Where IR signaling is used, the signaling may be carried out in accordance with the well-known Infrared Data Association (IrDA) specifications. Where RF signaling is used, the signaling may be carried out, for example, over an IEEE 802.11 wireless channel or a Bluetooth™ link. Still other wireless channels and protocols may be used. With respect to wired transmission, transmitter 2906 may be configured to transmit signals over a wired serial link, a wired Internet Protocol (IP) link, or other wired communication medium.

Various example operations that may be performed by screen interface circuitry, such as screen interface circuitry 2702, responsive to the receipt of appropriate remote control signals from remote control device 2900 will now be described. The operations described herein are provided by way of example only and are not intended to be limiting. Persons skilled in the relevant art(s) will appreciate that operations other than those described herein may be performed by screen interface circuitry responsive to the receipt of remote control signals from remote control 2900.

The screen interface circuitry may cause a screen assembly attached thereto to create or set up one or more views responsive to the receipt of remote control signals from remote control device 2900. For example, with continued reference to FIGS. 27 and 28, screen interface circuitry 2702 may cause screen assembly to set up any of views 2712, 2714, 2802, 2804, 2806, 2808 and 2810. Remote control device 2900 may be used to set up a view observable only to a viewer operating remote control device 2900, a view observable only to a viewer other than the viewer operating remote control device 2900, or to set up a view observable to both viewers. Setting up a view may comprise one or more of setting a size of the view, a shape of the view, a screen location of the view, a resolution associated with the view, a colorization associated with the view, a contrast associated with the view, a brightness associated with the view, a number of perspective views provided by the view, and a three-dimensional intensity of the view, as well as selecting locations at which a view should be observable or viewers that should be able to observe the view.

The screen interface circuitry may cause a screen assembly attached thereto to modify an existing view responsive to the receipt of remote control signals from remote control device 2900. For example, with continued reference to FIGS. 27 and 28, screen interface circuitry 2702 may cause screen assembly to modify any of views 2712, 2714, 2802, 2804, 2806, 2808 and 2810. Remote control device 2900 may be used to modify a view observable only to a viewer operating remote control device 2900, a view observable only to a viewer other than the viewer operating remote control device 2900, or to modify a view observable to both viewers. Modifying a view may comprise one or more of modifying a size of the view, a shape of the view, a screen location of the view, a resolution associated with the view, a colorization associated with the view, a contrast associated with the view, a brightness associated with the view, a number of perspective views provided by the view, and a three-dimensional intensity of the view, as well as modifying the locations at which a view is observable or modifying which viewers should be able to observe the view. With respect to modifying which viewers should be able to observe a view, remote control device 2900 may be used by a viewer to switch between various views.

The screen interface circuitry may obtain media content from one or more media content sources for delivery to a view supported by a screen assembly attached thereto responsive to the receipt of remote control signals from remote control device 2900. Such media content sources may include, for example and without limitation, local media content sources and remote media content sources. Local media content sources may include, for example, a computer (e.g., a laptop computer, a tablet computer, a desktop computer), a Digital Versatile Disc (DVD) player, a Blu-ray™ disc player, a game console, a personal media player, a telephone, or a PDA. Remote media content sources may include, for example, any of a variety of media sources that can deliver media content via a satellite infrastructure, a fiber/cable infrastructure, an IP network, or via terrestrial broadcast.

In one embodiment, a viewer may operate remote control 2900 to cause different media content to be presented via different views that may be observable or non-observable with respect to the viewer. For example, the viewer may operate remote control 2900 to cause first media content to be displayed via a view that is observable to the viewer and to cause second media content to be displayed via a view that is not observable to the viewer. The first and second media content may originate from the same media source or from different media sources. The viewer may also operate remote control 2900 to cause different media content to be presented to a single view that may be observable or non-observable with respect to the viewer. Again, the different media content may originate from the same media source or from different media sources. In accordance with this example, a viewer may operate remote control 2900 to cause certain "supplemental" media content to be overlaid upon or otherwise displayed in conjunction with other media content that is being presented via a particular view. A set-top box that is capable of retrieving such supplemental media content and delivering it to a screen assembly was described in the aforementioned, incorporated U.S. patent application Ser. No. 12/982,062, filed on even date herewith and entitled "Set-top Box Circuitry Supporting 2D and 3D Content Reductions to Accommodate Viewing Environment Constraints."

The screen interface circuitry may alter the manner in which media content is delivered from one or more media content sources to a view supported by a screen assembly attached thereto responsive to the receipt of remote control signals from remote control device 2900. For example, where the media content comprises video content, the screen interface circuitry may pause, rewind, or fast forward the video content.

FIG. 30 is a block diagram of an example remote control device 3000 that can be used to independently control one of multiple visual presentations simultaneously displayed by a screen assembly in accordance with a further embodiment. Remote control device 3000 may represent, for example, either of remote control device 2722 or remote control device 2724 described above in reference to FIGS. 27 and 28. As shown in FIG. 30, remote control device includes at least a user interface 3002, processing circuitry 3004, a transmitter 3006, viewer tracking circuitry 3008, one or more cameras and microphones 3010 and a receiver 3012. Like remote control device 2900, remote control device 3000 may include elements disposed in a single housing or elements distributed among multiple housings, may be designed for exclusive use with a particular display system or screen assembly or for use with multiple display systems and screen assemblies, and may comprise a dedicated remote control device or a multi-function device such as a phone or computing device.

User interface 3002 comprises one or more elements that enable a viewer to provide input to remote control 3000 and receive output therefrom. User interface 3002 may comprise any of the user interface elements described above in reference to user interface 2902 of FIG. 29 as well as other user interface elements. As shown in FIG. 30, user interface includes at least one output element in the form of a display 3014.

Processing circuitry 3004 is configured to receive user input provided via user interface 3002 and to selectively perform certain functions in response to same. Such functions include generating remote control signals for transmission to screen interface circuitry connected to a screen assembly, such as screen interface circuitry 2702 connected to screen assembly 2704. The signals so generated by processing circuitry 3004 are suitable to cause the screen interface circuitry to perform various operations with respect to the screen assembly, such as but not limited to controlling one or more visual presentations of the screen assembly, obtaining or selecting media content for delivery to one or more viewers via a visual presentation of the screen assembly, or controlling the manner in which media content is delivered via a visual presentation. Various exemplary operations that may be performed by screen interface circuitry responsive to the receipt of such remote control signals were described above.

Transmitter 3006 comprises circuitry that is configured to transmit the remote control signals generated by processing circuitry 3004 to screen interface circuitry connected to a screen assembly, such as screen interface circuitry 2702 connected to screen assembly 2704. Like transmitter 2906 described above in reference to FIG. 29, transmitter 3006 may be configured to transmit such remote control signals in a wireless or wired fashion.

Viewer tracking circuitry 3008 comprises circuitry that determines or generates information useful for determining a current viewing reference of a viewer, such as a viewer holding remote control 3000. The viewing reference of the viewer may comprise, for example, a position or location of the viewer relative to a screen assembly, a head orientation of the viewer (e.g., tilt and/or rotation) and a point of gaze of the viewer. Such viewing reference information may be used by screen interface circuitry, such as screen interface circuitry 2702, to configure a screen assembly, such as screen assembly 2704, to deliver a view in accordance with such viewing reference. For example, such viewing reference information may be used by screen interface circuitry to cause a screen assembly to deliver a particular view to a particular viewer location or eye location. Examples of remote control devices and other viewer-located circuitry that can be used to generate such viewing reference information are described in commonly-owned, co-pending U.S. patent application Ser. No. 12/982,069, filed on even date herewith and entitled "Three-Dimensional Display System With Adaptation Based on Viewing Reference of Viewer(s)," the entirety of which is incorporated by reference herein.

Camera(s) and microphone(s) 3010 may be used to capture image and audio information, respectively, which can be used for a variety of purposes. For example, such image and audio information may be used by viewer tracking circuitry 3008 to determine a current location of a viewer operating remote control device 3000. Additionally, such image and audio information may be used to provide feedback to a display system concerning a current viewing or listening experience of an operator of remote control device 3000. Such feedback information can then be used to adaptively adjust a manner of operation of a screen assembly or a speaker system to provide an improved viewing or listening experience, respectively. Microphone(s) 3010 can also be used to enable a viewer to utilize voice commands to invoke control functionality of remote control device 3000.

Receiver 3012 comprises a receiver configured to receive signals over a wired or wireless communication channel. In one embodiment, receiver 3012 is configured to receive media content from a local or remote media source or information about such media content for display on display 3014. Such functionality enables a viewer to use remote control device 3000 to obtain information about desired media content and even preview such media content on display 3014 before viewing such media content on a screen assembly controlled by remote control device 3000. In an embodiment in which multiple remote control devices are used, each remote control device can be used by a different viewer to simultaneously obtain information about and preview different media content. In one embodiment, a viewer can use remote control device 3000 to cause media content currently being rendered to display 3014 to also be rendered to a screen assembly.

FIG. 31 depicts an example remote control device 3100 that provides such preview functionality. As shown in FIG. 31, remote control device 3100 includes a display 3102 that enables a viewer to preview or otherwise watch certain media content via a view 3104 provided by display 3102. In one embodiment, by interacting with remote control device 3100, the viewer can cause the media content being display via view 3104 to be displayed via a screen assembly controlled by remote control device 3100. The media content may be routed from remote control device 3100 to screen interface circuitry connected to the screen assembly or may be obtained by the screen interface circuitry from a different source.

FIG. 32 depicts a flowchart 3200 of a method for modifying visual presentations simultaneously displayed by a screen assembly in accordance with an embodiment. The method of flowchart 3200 may be implemented, for example, in a viewer interface system that supports a first viewer and a second viewer and that interacts with a screen assembly (such as screen assembly 2704 of FIG. 27). In an embodiment, the viewer interface system comprises screen interface circuitry (such as screen interface circuitry 2702 of FIG. 27) and first and second remote control devices (such as first and second remote control devices 2722 and 2724 of FIG. 27). First visual content and second visual content are delivered through the screen interface circuitry to the screen assembly to produce a corresponding, simultaneous display of both a first visual presentation and a second visual presentation. The first visual presentation and the second visual presentation may overlap at least in part in the display area of the screen assembly. The first visual presentation may be observable by the first viewer and not by the second viewer. The second visual presentation may be observable by the second viewer and not by the first viewer.

As shown in FIG. 32, the method of flowchart 3200 begins at step 3202 in which first input is received from a first viewer via a first input interface of the first remote control device. At step 3204, first remote control circuitry within the first remote control device responds to the first input by sending a first remote control signal via the screen interface circuitry to modify the first visual presentation. Various ways in which the first visual presentation may be modified were described extensively above. At step 3206, second input is received from a second viewer via a second input interface of the second remote control device. At step 3208, second remote control circuitry within the second remote control device responds to the second input by sending a second remote control signal via the screen interface circuitry to modify the second visual presentation. Various ways in which the second visual presentation may be modified were described extensively above.

FIG. 33 depicts a flowchart 3300 of a method of operation of a display system that includes a screen assembly operable to simultaneously present first media content via a first screen region and second media content via a second screen region in accordance with an embodiment. The method of flowchart 3300 may be implemented by display system 2700 of FIG. 27 although that is only an example. As shown in FIG. 33, the method of flowchart 3300 begins at step 3302 in which a first visual presentation is caused in the first screen region based on the first media content. The first visual presentation may be viewable by a first viewer but not by a second viewer. At step 3304, a second visual presentation is caused in the second screen region based on the second media content. At step 3306, a first remote control signal is received from a first remote control. At step 3308, in response to at least the receipt of the first remote control signal, a modification is caused to the first visual presentation without causing a modification to the second visual presentation.

FIG. 34 depicts a flowchart 3400 of a method of operation of a remote control unit in accordance with an embodiment. The remote control unit is used with a screen assembly (such as screen assembly 2704 of FIG. 27) having a display area that is simultaneously viewed by a first viewer and a second viewer and that supports a first visual presentation and a second visual presentation via the display area. The first visual presentation is based on first media content and the second visual presentation is based on second media content.

As shown in FIG. 34, the method of flowchart 3400 begins at step 3402 in which first user input is received from a first user. Such first user input may be received, for example, from the first user via a user interface, such as user interface 2902 of remote control device 2900. At step 3404, the first user input is responded to by producing a first remote control signal that is suitable to cause a first visual presentation to be observable by a first viewer but not by a second viewer. Such first remote control signal may be produced, for example, by processing circuitry 2904 of remote control device 2900. At step 3406, the first remote control signal produced during step 3404 is delivered to screen interface circuitry. For example, transmitter 2906 of remote control device 2900 may operate to deliver the first remote control signal to the screen interface circuitry.

FIG. 35 depicts a flowchart 3500 of a method of operation of a display system, such as display system 2700 of FIG. 27, that includes a screen assembly operable to simultaneously present multiple views and at least one remote control in accordance with an embodiment. As shown in FIG. 35, the method begins at step 3502 in which the screen assembly operates to simultaneously present the first view and the second view. The first view may be observable by the first viewer but not by the second viewer. At step 3504, control circuitry communicatively connected to the screen assembly receives a first remote control signal. At step 3506, responsive to the receipt of the first remote control signal during step 3504, the control circuitry causes at least first media content to be presented via the first view but not via the second view.

IV. Conclusion

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A viewer interface system supporting a first viewer and a second viewer, the viewer interface system interacting with a screen assembly having a display area, the viewer interface system comprising:
   screen interface circuitry through which first visual content and second visual content are delivered to the screen assembly to produce a corresponding, simultaneous display of both a first visual presentation and a second visual presentation, the first visual presentation and the second visual presentation overlapping at least in part in the display area of the screen assembly, the first visual presentation being observable by the first viewer and not by the second viewer, while the second visual presentation being observable by the second viewer and not by the first viewer;

a first input interface that receives first input from the first viewer;

first remote control circuitry that responds to the first input by sending a first control signal via the screen interface circuitry to modify the first visual presentation;

a second input interface that receives second input from the second viewer; and second remote control circuitry that responds to the second input by sending a second control signal via the screen interface circuitry to modify the second visual presentation.

2. The viewer interface system of claim 1, wherein the first visual presentation comprises a three-dimensional presentation.

3. The viewer interface system of claim 1, further comprising:

a first housing;

a second housing;

the first remote control circuitry being disposed in the first housing; and the second remote control circuitry being disposed in the second housing.

4. The viewer interface system of claim 3, further comprising phone circuitry, and the phone circuitry being disposed in the first housing.

5. The viewer interface system of claim 3, further comprising computing device circuitry, and the computing device circuitry being disposed in the first housing.

6. A display system supporting a first viewer and a second viewer, the display system comprising:

a screen assembly having a display area, the screen assembly operable to deliver both a first visual presentation and a second visual presentation, the first visual presentation overlapping at least in part with the second visual presentation in the display area of the screen assembly, the first visual presentation being observable to the first viewer but not the second viewer;

a first remote control unit operable to generate a first remote control signal responsive to user input received from the first viewer; and control circuitry communicatively connected to the first remote control unit and to the screen assembly, the control circuitry operable to receive the first remote control signal and, responsive thereto, to modify the first visual presentation.

7. The display system of claim 6, further comprising:

a second remote control unit operable to generate a second remote control signal responsive to user input received from the second viewer; and the control circuitry is also communicatively connected to the second remote control unit and is further operable to receive the second remote control signal and, responsive thereto, to modify the second visual presentation.

8. The display system of claim 7, wherein the first remote control unit and the second remote control unit communicate with the control circuitry via a common application programming interface.

9. The display system of claim 6, wherein the first visual presentation comprises a visual overlay over the second visual presentation.

10. A method of operation of a display system that includes a screen assembly operable to simultaneously present first content via a first screen region and second content via a second screen region, the method comprising:

causing a first visual presentation in the first screen region based on the first content, the first visual presentation being viewable by a first viewer but not by a second viewer;

causing a second visual presentation in the second screen region based on the second content;

receiving a first remote control signal from a first remote control; and causing, in response to at least the receipt of the first remote control signal, a modification to the first visual presentation without causing a modification to the second visual presentation.

11. The method of claim 10, wherein the first content comprises three-dimensional content.

12. The method of claim 10, wherein the second visual presentation being viewable by the second viewer but not by the first viewer.

13. The method of claim 10, wherein the modification comprising one or more of:

a brightness modification associated with the first screen region;

a contrast modification associated with the first screen region;

a colorization modification associated with the first screen region;

a number of perspective views modification associated with the first screen region;

a resolution modification associated with the first screen region; and a three-dimensional intensity modification associated with the first screen region.

14. The method of claim 10, further comprising:

receiving a second remote control signal from a second remote control; and causing, in response to at least the receipt of the second remote control signal, a modification to the second visual presentation without causing a modification to the first visual presentation.

15. The method of claim 10, further comprising:

interpreting the first remote control signal in accordance with a common application programming interface.

16. A remote control unit used with a screen assembly having a display area that is simultaneously viewed by a first viewer and a second viewer, the screen assembly simultaneously supporting a first visual presentation and a second visual presentation via the display area, the first visual presentation being based on first content and the second visual presentation being based on second content, the remote control unit comprising:

a user interface operable to receive first user input from the first viewer;

processing circuitry that responds to the first user input by producing a first remote control signal, the first remote control signal being suitable to cause the first visual presentation to be observable by the first viewer but not by the second viewer; and a transmitter that delivers the first remote control signal.

17. The remote control unit of claim 16, wherein the user interface is further operable to receive second user input from the first viewer; and the processing circuitry is further operable to process the second user input to generate a second remote control signal, the second remote control signal being suitable to cause a modification in the first visual presentation.

18. A display system supporting a first viewer and a second viewer, the display system comprising:
- a screen assembly operable to simultaneously present a first view and a second view, the first view being observable by the first viewer but not by the second viewer; and
- control circuitry communicatively connected to the screen assembly, the control circuitry operable to receive a first remote control signal from a first remote control and, responsive thereto, to cause at least first media content to be presented via the first view but not via the second view.

19. The display system of claim 18, wherein the first view is an overlay on the second view.

20. The display system of claim 18, wherein the second view being observable by the second viewer but not the first viewer.

21. The display system of claim 18, wherein the control circuitry is also operable to receive a second remote control signal from a second remote control and, responsive thereto, to cause a modification to the second view.

22. The display system of claim 18, further comprising eyewear that assists in making the first view observable by the first viewer.

23. The display system of claim 18, wherein the screen assembly further comprises a light manipulator, and the light manipulator assists in making the first view observable by the first viewer.

\* \* \* \* \*